US010428197B2

(12) United States Patent
Anzelmo et al.

(10) Patent No.: US 10,428,197 B2
(45) Date of Patent: Oct. 1, 2019

(54) CARBON AND ELASTOMER INTEGRATION

(71) Applicant: Lyten, Inc., Sunnyvale, CA (US)

(72) Inventors: Bryce H. Anzelmo, Mountain View, CA (US); Daniel Cook, Woodside, CA (US)

(73) Assignee: Lyten, Inc., Sunnyvale, CA (US)

(*) Notice: Subject to any disclaimer, the term of this patent is extended or adjusted under 35 U.S.C. 154(b) by 0 days.

(21) Appl. No.: 15/918,422

(22) Filed: Mar. 12, 2018

(65) Prior Publication Data

US 2018/0265666 A1 Sep. 20, 2018

Related U.S. Application Data

(60) Provisional application No. 62/630,179, filed on Feb. 13, 2018, provisional application No. 62/581,533, (Continued)

(51) Int. Cl.
*C08K 3/04* (2006.01)
*C08K 7/18* (2006.01)
(Continued)

(52) U.S. Cl.
CPC ............. *C08K 3/042* (2017.05); *B60C 1/00* (2013.01); *B60C 1/0016* (2013.01); *B60C 1/0025* (2013.01); *C08J 3/203* (2013.01); *C08K 3/04* (2013.01); *C08K 3/045* (2017.05); *C08K 7/18* (2013.01); *C08K 9/02* (2013.01); *C08K 9/04* (2013.01); *C08L 9/06* (2013.01); *C08J 2309/06* (2013.01); *C08J 2321/00* (2013.01);
(Continued)

(58) Field of Classification Search
CPC .. C08K 3/04; C08K 3/042; C08K 9/04; B60C 1/0008; B82Y 30/00; C09D 5/24
USPC ............................ 524/13, 495, 575; 423/448
See application file for complete search history.

(56) References Cited

U.S. PATENT DOCUMENTS 3,217,056 A 11/1965 Kurt et al.
3,409,695 A 11/1968 Kurt et al.
(Continued)

FOREIGN PATENT DOCUMENTS

CN 1112086 A 11/1995
CN 1207189 C 6/2005
(Continued)

OTHER PUBLICATIONS

Jasinski et al., "Hydrogen Production via Methane Reforming Using Various Microwave Plasma Sources", Chem. Listy 102, s1332-s1337, Jan. 2008.
(Continued)

*Primary Examiner* — Khanh T Nguyen
(74) *Attorney, Agent, or Firm* — MLO, a professional corp.

(57) ABSTRACT

Compounds having an elastomer material, a filler material, at least one additive material, and at least one accelerant material are disclosed. In various embodiments, the filler material comprises a graphene-based carbon material. In various embodiments, the graphene-based carbon material comprises graphene comprising up to 15 layers, carbon aggregates having a median size from 1 to 50 microns, a surface area of the carbon aggregates at least 50 m²/g, when measured via a Brunauer-Emmett-Teller (BET) method with nitrogen as the adsorbate, and no seed particles.

30 Claims, 26 Drawing Sheets

Related U.S. Application Data filed on Nov. 3, 2017, provisional application No. 62/472,058, filed on Mar. 16, 2017.

(51) Int. Cl.

| | | |
|---|---|---|
| *C08L 9/06* | (2006.01) | |
| *C08K 9/02* | (2006.01) | |
| *C08K 9/04* | (2006.01) | |
| *C08J 3/20* | (2006.01) | |
| *B60C 1/00* | (2006.01) | |
| C08K 3/36 | (2006.01) | |
| C08K 5/47 | (2006.01) | |
| C08K 5/31 | (2006.01) | |
| C08K 3/22 | (2006.01) | |

(52) U.S. Cl.
CPC .......... C08K 3/36 (2013.01); C08K 5/31 (2013.01); C08K 5/47 (2013.01); C08K 2003/2241 (2013.01); C08K 2003/2296 (2013.01); C08K 2201/001 (2013.01); C08K 2201/003 (2013.01); C08K 2201/005 (2013.01); C08K 2201/006 (2013.01); C08L 2203/20 (2013.01); C08L 2205/025 (2013.01)

(56) References Cited

U.S. PATENT DOCUMENTS

| | | |
|---|---|---|
| 3,706,445 A | 12/1972 | Gentry |
| 4,701,317 A | 10/1987 | Arakawa et al. |
| 5,143,709 A | 9/1992 | Labes |
| 5,211,923 A | 5/1993 | Harkness et al. |
| 5,321,177 A | 6/1994 | Nakamura et al. |
| 5,321,191 A | 6/1994 | Alagy et al. |
| 5,324,553 A | 6/1994 | Ovshinsky et al. |
| 5,515,011 A | 5/1996 | Pasco |
| 5,556,475 A | 9/1996 | Besen et al. |
| 5,572,866 A | 11/1996 | Loving |
| 5,693,173 A | 12/1997 | Colombo et al. |
| 5,874,705 A | 2/1999 | Duan |
| 5,985,232 A | 11/1999 | Howard et al. |
| 6,120,741 A | 9/2000 | Jacquault et al. |
| 6,156,114 A | 12/2000 | Bell et al. |
| 6,224,736 B1 | 5/2001 | Miyamoto |
| 6,340,912 B1 | 1/2002 | Gerstenberg et al. |
| 6,383,301 B1 | 5/2002 | Bell et al. |
| 6,582,778 B2 | 6/2003 | Namiki et al. |
| 6,599,492 B2 | 7/2003 | Iwamura et al. |
| 6,692,718 B1 | 2/2004 | Osawa |
| 6,805,779 B2 | 10/2004 | Chistyakov |
| 6,884,405 B2 | 4/2005 | Ryzhkov |
| 6,914,556 B1 | 7/2005 | Nyswander |
| 6,916,400 B2 | 7/2005 | Moisan et al. |
| 7,022,149 B2 | 4/2006 | Krause et al. |
| 7,102,110 B2 | 9/2006 | Shinohara |
| 7,608,798 B2 | 10/2009 | Kumar et al. |
| 7,739,029 B2 | 6/2010 | Ishikawa et al. |
| 7,745,528 B2 | 6/2010 | Prud'Homme et al. |
| 7,790,243 B2 | 9/2010 | Radhakrishnan et al. |
| 7,799,119 B2 | 9/2010 | Zakrzewski et al. |
| 7,875,322 B2 | 1/2011 | Kobayashi et al. |
| 7,981,396 B2 | 7/2011 | Harutyunyan |
| 8,034,321 B2 | 10/2011 | Mauthner et al. |
| 8,075,869 B2 | 12/2011 | Zhu et al. |
| 8,110,026 B2 | 2/2012 | Prud'Homme et al. |
| 8,114,375 B2 | 2/2012 | Jang et al. |
| 8,147,765 B2 | 4/2012 | Muradov et al. |
| 8,222,579 B2 | 7/2012 | Taguchi et al. |
| 8,337,764 B2 | 12/2012 | Yang et al. |
| 8,475,760 B2 | 7/2013 | Rajala et al. |
| 8,603,402 B2 | 12/2013 | Chang et al. |
| 8,636,960 B2 | 1/2014 | Spitzl et al. |
| 8,808,507 B2 | 8/2014 | Kasin |
| 8,821,745 B2 | 9/2014 | Luo et al. |
| 8,933,629 B2 | 1/2015 | Heil et al. |
| 8,968,588 B2 | 3/2015 | Zhao et al. |
| 8,992,880 B2 | 3/2015 | Terayama et al. |
| 9,051,185 B2 | 6/2015 | Levendis et al. |
| 9,090,756 B2 | 7/2015 | Du et al. |
| 9,090,757 B2 | 7/2015 | Mruk et al. |
| 9,156,699 B2 | 10/2015 | Yamada et al. |
| 9,162,530 B2 | 10/2015 | Du et al. |
| 9,171,679 B2 | 10/2015 | Gogotsi et al. |
| 9,293,302 B2 | 3/2016 | Risby et al. |
| 9,518,157 B2 | 12/2016 | Zhao et al. |
| 9,576,694 B2 | 2/2017 | Gogotsi et al. |
| 9,757,983 B1 | 9/2017 | Du et al. |
| 9,767,992 B1 | 9/2017 | Stowell |
| 9,862,602 B1 | 1/2018 | Riso et al. |
| 9,862,606 B1 | 1/2018 | Cook et al. |
| 2002/0050323 A1 | 5/2002 | Moisan et al. |
| 2003/0024806 A1 | 2/2003 | Foret |
| 2003/0086859 A1 | 5/2003 | Kawakami et al. |
| 2003/0138365 A1 | 7/2003 | Obidniak et al. |
| 2004/0029339 A1 | 2/2004 | Yamamoto et al. |
| 2004/0245088 A1 | 12/2004 | Gardner |
| 2004/0261617 A1 | 12/2004 | Stewart |
| 2004/0265211 A1 | 12/2004 | Dillon et al. |
| 2005/0003247 A1 | 1/2005 | Pham |
| 2005/0089684 A1 | 4/2005 | Barron et al. |
| 2005/0121309 A1 | 6/2005 | Chhowalla et al. |
| 2005/0123467 A1 | 6/2005 | Harutyunyan |
| 2005/0163696 A1 | 7/2005 | Uhm et al. |
| 2005/0253529 A1 | 11/2005 | Kumar et al. |
| 2006/0078488 A1 | 4/2006 | Suemura et al. |
| 2007/0186470 A1 | 8/2007 | Ennis |
| 2007/0212254 A1 | 9/2007 | Nagatsu |
| 2007/0274893 A1 | 11/2007 | Wright et al. |
| 2008/0029030 A1 | 2/2008 | Goto et al. |
| 2009/0060805 A1 | 3/2009 | Muradov et al. |
| 2009/0194528 A1 | 8/2009 | Kotzian et al. |
| 2009/0196801 A1 | 8/2009 | Mills |
| 2009/0220767 A1 | 9/2009 | Schlogl et al. |
| 2010/0036023 A1* | 2/2010 | Weng .................. B60C 1/0008 524/13 |
| 2010/0056819 A1 | 3/2010 | Jang et al. |
| 2010/0233366 A1 | 9/2010 | Fukushima et al. |
| 2011/0033639 A1 | 2/2011 | Coll et al. |
| 2011/0036014 A1 | 2/2011 | Tsangaris et al. |
| 2011/0059006 A1 | 3/2011 | Donnet et al. |
| 2011/0206946 A1 | 8/2011 | Schmidt et al. |
| 2012/0034137 A1 | 2/2012 | Risby |
| 2012/0058397 A1 | 3/2012 | Zhamu et al. |
| 2012/0094175 A1 | 4/2012 | Sheem et al. |
| 2012/0107525 A1 | 5/2012 | Ohmae |
| 2012/0189530 A1 | 7/2012 | Marmaro et al. |
| 2012/0258374 A1 | 10/2012 | Raston et al. |
| 2013/0136684 A1* | 5/2013 | Wu ..................... B82Y 30/00 423/448 |
| 2013/0150516 A1 | 6/2013 | Lettow |
| 2013/0248773 A1 | 9/2013 | Chang et al. |
| 2013/0270110 A1 | 10/2013 | Sasai et al. |
| 2013/0296479 A1 | 11/2013 | Martin et al. |
| 2013/0310495 A1 | 11/2013 | Kim et al. |
| 2014/0030181 A1 | 1/2014 | Liu et al. |
| 2014/0159572 A1 | 6/2014 | Risby et al. |
| 2014/0208638 A1 | 7/2014 | Thorre et al. |
| 2014/0238842 A1 | 8/2014 | Gokhale et al. |
| 2014/0251955 A1 | 9/2014 | Itoh et al. |
| 2014/0263202 A1 | 9/2014 | Partridge |
| 2014/0313636 A1 | 10/2014 | Tour et al. |
| 2014/0353207 A1 | 12/2014 | Strohm et al. |
| 2015/0023858 A1 | 1/2015 | Tour et al. |
| 2015/0044565 A1 | 2/2015 | Wang et al. |
| 2015/0073072 A1 | 3/2015 | Kim et al. |
| 2015/0179294 A1 | 6/2015 | Kim et al. |
| 2015/0246813 A1 | 9/2015 | Koveal et al. |
| 2015/0267063 A1 | 9/2015 | Drewer et al. |
| 2015/0299437 A1 | 10/2015 | Mruk et al. |
| 2016/0032062 A1 | 2/2016 | Clauss et al. |
| 2016/0043384 A1 | 2/2016 | Zhamu et al. |
| 2016/0045841 A1 | 2/2016 | Kaplan et al. |
| 2016/0059197 A1 | 3/2016 | Stevanovic et al. |
| 2016/0137506 A1 | 5/2016 | Arnault et al. |

(56) References Cited

U.S. PATENT DOCUMENTS

| | | | |
|---|---|---|---|
| 2016/0141114 A1 | 5/2016 | Shelke et al. | |
| 2016/0172123 A1 | 6/2016 | Yang et al. | |
| 2016/0185603 A1 | 6/2016 | Bozalina et al. | |
| 2016/0243518 A1 | 8/2016 | Spitzl | |
| 2016/0276055 A1* | 9/2016 | Choi | H05K 9/0079 |
| 2016/0340495 A1 | 11/2016 | Pan et al. | |
| 2017/0073522 A1 | 3/2017 | Hardman et al. | |
| 2017/0096341 A1 | 4/2017 | Chen et al. | |
| 2017/0113935 A1 | 4/2017 | Pennington et al. | |
| 2017/0174520 A1 | 6/2017 | Walters et al. | |
| 2018/0022925 A1 | 1/2018 | Hardman et al. | |
| 2018/0099871 A1 | 4/2018 | Tanner et al. | |
| 2018/0327611 A1* | 11/2018 | Scheffer | C09D 5/24 |

FOREIGN PATENT DOCUMENTS

| | | |
|---|---|---|
| CN | 100368080 | 2/2008 |
| CN | 101580241 A | 11/2009 |
| CN | 101885481 A | 11/2010 |
| CN | 101993060 A | 3/2011 |
| CN | 101997120 A | 3/2011 |
| CN | 201789030 U | 4/2011 |
| CN | 101905881 B | 5/2013 |
| CN | 102502597 B | 6/2013 |
| CN | 102757038 B | 2/2014 |
| CN | 103935989 A | 7/2014 |
| CN | 104058396 A | 9/2014 |
| CN | 103382025 B | 1/2015 |
| CN | 102674321 B | 2/2015 |
| CN | 104528690 B | 8/2016 |
| CN | 105833797 A | 8/2016 |
| CN | 105870419 A | 8/2016 |
| CN | 106098944 A | 11/2016 |
| CN | 106398802 A | 2/2017 |
| EP | 0184475 B1 | 5/1989 |
| EP | 0808682 A3 | 3/2000 |
| EP | 1469941 B1 | 10/2007 |
| EP | 1502486 B1 | 11/2011 |
| EP | 2702839 B1 | 3/2015 |
| JP | H0290939 A | 3/1990 |
| JP | H05208805 A | 8/1993 |
| JP | 2000150195 A | 5/2000 |
| JP | 2001122690 A | 5/2001 |
| JP | 2001220114 A | 8/2001 |
| JP | 2003212502 | 7/2003 |
| JP | 3437066 B2 | 8/2003 |
| JP | 3544267 B2 | 7/2004 |
| JP | 2004323345 A | 11/2004 |
| JP | 2004346385 A | 12/2004 |
| JP | 4411039 B2 | 2/2010 |
| JP | 2012059462 A | 3/2012 |
| JP | 5162061 B2 | 3/2013 |
| JP | 2003206102 | 7/2013 |
| JP | 5298309 B2 | 9/2013 |
| JP | 5375197 B2 | 12/2013 |
| JP | 5649186 B2 | 1/2015 |
| JP | 6044934 B2 | 12/2016 |
| KR | 100583500 B1 | 5/2006 |
| WO | 1999012184 A2 | 3/1999 |
| WO | 2000014518 A1 | 3/2000 |
| WO | 2001009031 A1 | 2/2001 |
| WO | 2004092058 A2 | 10/2004 |
| WO | 2007001412 A2 | 1/2007 |
| WO | 2010094969 A1 | 8/2010 |
| WO | 2014090992 A3 | 8/2014 |
| WO | 2015157280 A1 | 10/2015 |
| WO | 2015189643 A1 | 12/2015 |
| WO | 2015193155 A1 | 12/2015 |
| WO | 2015193267 A1 | 12/2015 |
| WO | 2016001476 A1 | 1/2016 |
| WO | 2016040948 A1 | 3/2016 |
| WO | 2016126599 A1 | 8/2016 |
| WO | 2016135328 A1 | 9/2016 |

OTHER PUBLICATIONS

Jiang et al., Structure and electromagnetic properties of both regular and defective onion-like carbon nanoparticles, Carbon, vol. 95, Dec. 2015, pp. 910-918.

Kaito and Hirata, Synthesis of Numerous Onion-like Fullerenes and Its Application to Solid Lubricant, Japan Society for Precision Engineering, vol. 67, No. 7, 2001, pp. 1175-1179, Released Apr. 2009.

Ko et al., Inherently-Forced Tensile Strain in Nanodiamond-Derived Onion-like Carbon: Consequences in Defect-Induced Electrochemical Activation, Scientific Reports, Apr. 2016, 10 pages.

Kobayashi, Formation of Carbon Onion from Heavily Shocked SiC, Chemistry of Materials, 15 (14), Jun. 2003, pp. 2681-2683.

Kogo and Hirata, Study on applicability of carbon onions as nano-abrasives, Japan Society for Precision Engineering, vol. 77, No. 3, Sep. 2011, pp. 311-315.

Konno et al, Direct Preparation of Hydrogen and Carbon Nanotubes by Microwave Plasma Decomposition of Methane over Fe/Si Activated by Biased Hydrogen Plasma, Green and Sustainable Chemistry, 2013, 3, 19-25, http://dx.doi.org/10.4236/gsc.2013.31004 Published Online Feb. 2013 (http://www.scirp.org/journal/gsc).

Konno et al., "Direct Preparation of Hydrogen and Carbon Nanotubes by Microwave Plasma Decomposition of Methane over Fe/Si Activated by Biased Hydrogen Plasma", Green and Sustainable Chemistry, Nov. 2012, 3, p. 19-25.

Krishnamurthy, Formation of onion-like carbon from the evaporation of ultra-dispersed nanodiamonds, Carbon, vol. 52, Feb. 2013, pp. 145-149.

Kromka et al., Investigation of Carburisation of Tungsten-Carbide Formation by Hot-Filament CVD Technique, Acta Physica Slovaca, 51(6), 359-368, Dec. 2001.

Kuznetsov et al., Onion-like carbon from ultra-disperse diamond, Chemical Physics Letters, vol. 222, Issue 4, May 1994, pp. 343-348.

Kwan, Hot-Filament Chemical Vapor Deposition of Selectively Deposited Diamond and Silicone Thin Films, Submitted to the Department of Chemical Engineering, Massachusetts Institute of Technology, Jul. 15, 1997, 183 pages.

Macutkevic et al., Dielectric Properties of Onion-Like Carbon and Detonation Nanodiamond/Polydimethysiloxane Composites, Polymer Composits, vol. 36, Issue 11, Nov. 2015, pp. 2084-2092.

Merijs-Meri et al., Carbon Nanotubes and Carbon Onions for Modification of Styrene—Acrylate Copolymer Nanocomposites, Polymer Composites, vol. 36, Issue 6, Jun. 2015, pp. 1048-1054.

MGC Series Thermal Gas Cracker, Mantis Deposition LTD, Accessed on Feb. 10, 2017, 2 pages.

Moustakas, The Role of the Tungsten Filament in the Growth of Polycrystalline Diamond Films by Filament-assisted CVD of Hydrocarbons, Solid State Ionics, vols. 32-33, Part 2, Feb.-Mar. 1989, pp. 861-868.

Muradov et al., Autothermal catalytic pyrolysis of methane as a new route to hydrogen production with reduced CO2 emissions, Catalysis Today 116, Jun. 2006, 281-288.

Namiki and Hirata, Low-temperature catalytic synthesis of carbon onions and evaluation of its solid lubricant property, Japan Society for Precision Engineering, vol. 2004S, 2004, pp. 723-724, Released May 2005.

Nos et al., Real-time monitoring of the silicidation process of tungsten filaments at high temperature used as catalysers for silane decomposition, Materials Chemistry and Physics vol. 143(2), Jan. 2014, pp. 881-888.

Notice of Allowance dated Jul. 19, 2017 for U.S. Appl. No. 15/351,858.

Notice of Allowance dated Jul. 28, 2017 for U.S. Appl. No. 15/594,032.

Notice of Allowance dated May 24, 2017 for U.S. Appl. No. 15/428,474.

Notice of Allowance dated Nov. 17, 2017 for U.S. Appl. No. 15/594,032.

Notice of Allowance dated Nov. 29, 2017 for U.S. Appl. No. 15/470,450.

(56) References Cited

OTHER PUBLICATIONS

Obraztsova, et al., Raman Identification of Onion-Like Carbon, Carbon 1998; 36(5-6): 821-826.
Office Action dated Dec. 28, 2017 for U.S. Appl. No. 15/725,928.
Office Action dated Mar. 23, 2017 for U.S. Appl. No. 15/428,474.
Office Action dated May 26, 2017 for U.S. Appl. No. 15/470,450.
Office Action dated Nov. 29, 2017 for U.S. Appl. No. 15/711,620.
Office Action dated Oct. 24, 2017 for U.S. Appl. No. 15/470,450.
Office Action dated Sep. 7, 2017 for U.S. Appl. No. 15/470,450.
Okoli et al., Influence of the Filament Material on Low-Presure Hot-Filament CVD Diamond Deposition, Journal Physique IV (Proceedings) 02(C2), Sep. 1991, 8 pages.
Onoue et al., Fine structure analysis of spherical carbon particles produced in a methane plasma, Diamond and Related Materials, vol. 27, Jul.-Aug. 2012, pp. 10-13.
Osawa et al., Revival of Carbon Nano-Onions : Towards Alternatives of the Arc Discharge Method for the Production of Fullerenes, Japan Society of Plasma Science and Nuclear Fusion Research, vol. 75, No. 8, 1999, pp. 914-920, Released Dec. 2000.
Ozawa and Osawa, Carbon Blacks as the Source Materials for Carbon Nanotechnology, 'Carbon Nanotechnology', Dai, L. (Ed.), Chapt. 6, p. 127-151, Elsevier: Dordrecht, Apr. 2006.
Pech et al., Ultrahigh-power micrometre-sized supercapacitors based on onion-like carbon, Nature Nanotechnology, vol. 5, Aug. 2010, pp. 651-654.
Plonska-Brzezinska and Echegoyen, Carbon nano-onions for supercapacitor electrodes: recent developments and applications, Journal of Materials Chemistry A, Issue 44, Nov. 2013, 11 pages.
Plonska-Brzezinska et al., The synthesis and characterization of carbon nano-onions produced by solution ozonolysis, Carbon, vol. 49, Issue 15, Dec. 2011, pp. 5079-5089.
Portet et al., Electrochemical performance of carbon onions, nanodiamonds, carbon black and multiwalled nanotubes in electrical double layer capacitors, Carbon, vol. 45, Issue 13, Nov. 2007, pp. 2511-2518.
Qiao et al., Structural evolution and Raman study of nanocarbons from diamond nanoparticles, Chemical Physics Letters, vol. 429, Issue 4, Oct. 2006, pp. 479-482.
Rodat et al., Characterisation of carbon blacks produced by solar thermal dissociation of methane, Carbon, vol. 49, Issue 9, May 2011, pp. 3084-3091.
Scientific Background on the Nobel Prize in Physics 2010, Graphene compiled by the Class for Physics of the RoyalSwedish Academy of Sciences, pp. 1-1 (2010).
Shen and Lua, A facile method for the large-scale continuous synthesis of graphene sheets using a novel catalyst, Scientific Reports, 3, 3037, Oct. 2013, pp. 1-6.
Studart et al., Arrested Coalescence of Particle-coated Droplets into Nonspherical Supracolloidal Structures, J. Phys. Chem. B, vol. 113 (12), Jan. 2009, pp. 3914-3919.
Sun et al., Preparation of carbon black via arc discharge plasma enhanced by thermal pyrolysis, Diamond and Related Materials, vol. 61, Jan. 2016, pp. 21-31.
Szerencsi and Radnoczi, The mechanism of growth and decay of carbon nano-onions formed by ordering of amorphous particles, Vacuum, vol. 84, Issue 1, Aug. 2009, pp. 197-201.
Tapia et al., Carbon nano-allotropes produced by ultrasonication of few-layer graphene and fullerene, Carbon, vol. 99, Apr. 2016, pp. 541-546.
Thermal Gas Cracker TGC-H, SPECS GmbH, Components for Surface Analysis, www.specs.de, Access on Feb. 10, 2017, 2 pages.
Thune et al., Nucleation and growth of carbon onions synthesized by ion-implantation: a transmission electron microscopy study, Materials Letters, vol. 54, Issue 2, May 2002, pp. 222-228.
Tikhomirov et al., The chemical vapor infiltration of exfoliated graphite to produce carbon/carbon composites, Carbon, vol. 49, Issue 1, Jan. 2011, pp. 147-153.
International Search Report dated Aug. 23, 2018 for PCT Patent Application No. PCT/US2018/015674.

International Search Report dated Jul. 9, 2018 for PCT Patent Application No. PCT/US2018/022420.
Notice of Allowance dated Mar. 16, 2018 for U.S. Appl. No. 15/711,620.
Tomita et al., Structure and electronic properties of carbon onions, Journal of Chemical Physics, vol. 114, No. 17 May 2001, pp. 7477-7482.
Ugarte, Curling and closure of graphitic networks under electron-beam irradiation, Letters to Nature, vol. 359, Oct. 1992, 707-709.
Ugarte, Graphitic Nanoparticles, MRS Bulletin, vol. 19, Issue 11 Nov. 1994, pp. 39-42.
Universal Thermal Cracker for Surface Science, Oxford Applied Research, www.oaresearch.co.uk, Accessed on Feb. 10, 2017, 2 pages.
Weingarth et al., Graphitization as a Universal Tool to Tailor the Potential-Dependent Capacitance of Carbon Supercapacitors. Adv. Energy Mater., May 4, 2014, 13 pages.
Wu et al., Synthesis of Graphene Sheets with High Electrical Conductivity and Good Thermal Stability by Hydrogen Arc Discharge Exfoliation, ACS Nano, Feb. 2009, vol. 3 (2), pp. 411-417.
Xu, Prospects and research progress in nano onion-like fullerenes, New Carbon Materials, vol. 23, Issue 4, Mar. 2008, pp. 289-301.
Yamada et al., Concentric shell carbon: curling process of graphitic layers, Carbon, vol. 35, Issue 12, Oct. 1997, pp. 1844-1846.
Yamada, Shock synthesis of concentric shell fullerene dimers and trimers, Carbon 42, Jun. 2004, pp. 3003-3042.
Yang et al., Synthesis of nano onion-like fullerenes by chemical vapor deposition using an iron catalyst supported on sodium chloride, J Nanopart Res, May 13, 2011, pp. 1979-1986.
Yeheskel and Epstein, Thermolysis of methane in a solar reactor for mass-production of hydrogen and carbon nano-materials, Carbon vol. 49, Issue 14, Nov. 2011, pp. 4695-4703.
Yuan et al., "Low-temperature plasma preparation and application of carbon black nanoparticles", Chemical Engineering Journal, vol. 253, May 2014, pp. 107-120, ISSN 1385-8947.
Zeiger et al., Review: carbon onions for electrochemical energy storage, Journal of Materials Chemistry A, Issue 6, Mar. 2016, pp. 3172-3196.
Zeiger et al., Understanding structure and porosity of nanodiamond-derived carbon onions, Carbon, vol. 84, Apr. 2015, pp. 584-598.
Zeiger et al., Vacuum or flowing argon: What is the best synthesis atmosphere for nanodiamond-derived carbon onions for supercapacitor electrodes?, Carbon, vol. 94, Nov. 2015, pp. 507-517.
Zhang et al., Graphene-based materials as supercapacitor electrodes, Journal of Materials Chemistry, Issue 29, Aug. 2010, pp. 5983-5992.
Zhang et al., Methane Catalytic Cracking to Make Hydrogen and Graphitic Nano Carbons (Nanotubes, Microfibers, Microballs, Onions) with Zero Emission, Synthesis and Reactivity in Inorganic, Metal-Organic, and Nano-Metal Chemistry vol. 44 , Iss. 8, 2014, pp. 1116-1174, published online: Dec. 17, 2013.
Zhang et al., Microstructure and adsorption property of nanocarbide-derived carbon (CDC) synthesized at ambient temperature, Materials Letters, vol. 130, Sep. 2014, pp. 188-191.
Zheng et al., Development on the Preparation and Application of Onion-like Carbon, Journal of Inorganic Materials, vol. 30 No. 8, Aug. 2015, pp. 793-801.
International Search Report dated Jun. 25, 2018 for PCT Patent Application No. PCT/US2018/022072.
International Search Report dated Jun. 27, 2018 for PCT Patent Application No. PCT/US2018/015671.
International Search Report dated Jun. 28, 2018 for PCT Patent Application No. PCT/US2018/020963.
Notice of Allowance dated Jun. 29, 2018 for U.S. Appl. No. 15/794,965.
Office Action dated Jun. 26, 2018 for U.S. Appl. No. 15/727,533.
Office Action dated Jul. 10, 2018 for U.S. Appl. No. 15/725,928.
"Pyrolytic Carbon," Biomedical Engineering Desk Reference, Oxford, UK: Elsevier, 2009, pp. iii-vi and 267.
Abanades et al., Experimental analysis of direct thermal methane cracking, International Journal of Hydrogen Energy, vol. 36, Issue 20, Oct. 2011, pp. 12877-12886.

(56) References Cited

OTHER PUBLICATIONS

Abbas and Wan Daud, Hydrogen production by methane decomposition: A review, International Journal of Hydrogen Energy, vol. 35, Issue 3, Feb. 2010, pp. 1160-1190.
Ahmed et al., Decomposition of hydrocarbons to hydrogen and carbon, Applied Catalysis A: General vol. 359, Issues 1-2, May 2009, pp. 1-24.
Alexandrou et al., Structure of carbon onions and nanotubes formed by arc in liquids, Journal of Chemical Physics, vol. 120, No. 2, Jan. 2004, pp. 1055-1058.
Asokan et al., Microwave irradiation on carbon black: Studies on the transformation of particles into nano-balls, nano-sticks and nano-onion like structures, Journal of Physics and Chemistry of Solids, vol. 99, Dec. 2016, pp. 173-181.
Beguin et al., Carbons and Electrolytes for Advanced Supercapacitors. Adv. Mater., 26, Feb. 2014, pp. 2219-2251.
Berezkin, Fullerenes as nuclei of carbon black particles, Physics of the Solid State, vol. 42, No. 3, Mar. 2000, p. 580-585.
Berezkin, Nucleation and Growth of Closed Many-Layer Carbon Particles, Phys. Stat. Sol. (b), 226, Jul. 2001, pp. 271-284.
Biomedical Engineering Desk Reference. Oxford: Academic Press, 2009, pp. iii-vi, 267, Print.
Bu, Synthesis of graphitic carbon nano-onions for dye sensitized solar cells, Solar Energy, vol. 105, Jul. 2014, pp. 236-242.
Buchholz et al., Mechanism for the growth of multiwalled carbon-nanotubes from carbon black, Carbon, vol. 41, Issue 8, Mar. 2003, pp. 1625-1634.
Bushueva et al., Double layer supercapacitor properties of onion-like carbon materials, Phys. Status Solidi B, vol. 245, No. 10, Oct. 2008, pp. 2296-2299.
Bystrzejewski et al., "Catalyst-free synthesis of onion-like carbon nanoparticles," New Carbon Materials, vol. 25, No. 1, Feb. 2010, p. 1-8.
Bystrzejewski et al., Catalyst-free synthesis of onion-like carbon nanoparticles, New Carbon Materials, vol. 25, Issue 1, Feb. 2010, pp. 1-8.
Cabioch et al., Fourier transform infra-red characterization of carbon onions produced by carbon-ion implantation, Chemical Physics Letters 285(3), Mar. 1998, pp. 216-220.
Cadez et al., "Influence of Hydrocarbons on Vibrational Excitation of H2 Molecules", Nuclear Engineering and Design, vol. 241, Apr. 2011, p. 1267-1271.
Cadez et al., Influence of hydrocarbons on vibrational excitation of H2 molecules, Nuclear Engineering and Design 241, Apr. 2011, 1267-1271.
Chen et al., New method of carbon onion growth by radio-frequency plasma-enhanced chemical vapor deposition, Chemical Physics Letters 336, Mar. 2001, pp. 201-204.
Cho et al., Conversion of natural gas to hydrogen and carbon black by plasma and application of plasma carbon black, Catalysis Today, vol. 98, Issue 4, Nov. 2004, pp. 633-638.
Choucair and Stride, The gram-scale synthesis of carbon onions, Carbon, vol. 50, Issue 3, Mar. 2012, pp. 1109-1115.
Chung et al., Flame synthesis of carbon nano-onions enhanced by acoustic modulation, Nanotechnology, vol. 21, No. 43, Oct. 2010, 11 pages.
Das et al., Formation of onion-like fullerene and chemically converted graphene-like nanosheets from low-quality coals: application in photocatalytic degradation of 2-nitrophenol, RSC Advances, Issue 42, Apr. 2016, 41 pages.
Definition of coat, accessed online at https://www.merriam-webster.com/dictionary/coat on Jul. 24, 2017.
Definition of coating, accessed on line at https://www.merriam-webster.com/dictionary/coating on Jul. 24, 2017.
Deshmukh et al., Carbon spheres, Materials Science and Engineering: R: Reports, vol. 70, Issues 1-2, Sep. 20, 2010, pp. 1-28.
Dhand et al., Flame synthesis of carbon nano onions using liquefied petroleum gas without catalyst, Materials Science and Engineering: C, vol. 33, Issue 2, Mar. 2013, pp. 758-762.
Dorobantu et al., Pulse Laser Ablation System for Carbon Nano-Onions Fabrication, Surface Engineering and Applied Electrochemistry, vol. 50, Issue 5, Sep. 2014, pp. 19-23.
Dresselhaus, et al., Science of Fullerenes and Carbon Nanotubes, pp. 60-79 (Academic Press 1996).
Fan et al., The production of onion-like carbon nanoparticles by heating carbon in a liquid alcohol, Journal of Materials Chemistry, 22, Issue 19, May 2012, pp. 9794-9797.
Fu et al, Synthesis of Nano-structured Onion-like Fullerenes by MW Plasma, Journal of Inorganic Materials, vol. 21, No. 3, May 2006, 576-582.
Gao et al., Chemical activation of carbon nano-onions for high-rate supercapacitor electrodes, Carbon, vol. 51, Jan. 2013, pp. 52-58.
Gao et al., Growth of Carbon Nano-Onions in the Open Air by Laser Resonant Excitation of Precursor Molecules, Jan. 2010, 5 pages.
Gao et al., Resonant excitation of precursor molecules in improving the particle crystallinity, growth rate and optical limiting performance of carbon nano-onions, Nanotechnology, Apr. 22, 2011, 6 pages.
Geng et al., Preparation of graphite nanoplatelets and graphene sheets, Journal of Colloid and Interface Science 336, Apr. 2009, pp. 592-598.
Gicquel et al., "New Driving Parameters for Diamond Deposition Reactors: Pulsed Mode versus Continuous Mode", Materials Research, vol. 6, No. 1, p. 25-37, Sep. 2002.
Grieco et al., Fullerenic carbon in combustion-generated soot, Carbon, vol. 38, Issue 4, Dec. 2000, pp. 597-614.
Gubarevich et al., Onion-like carbon deposition by plasma spraying of nanodiamonds, Carbon, vol. 41, Issue 13, Jul. 2003, pp. 2601-2606.
Guo and Jayatissa, Growth of Carbon Nanotubes on Metallic Catalyst by CVD, Proceedings of IMECE2006, 2006 ASME International Mechanical Engineering Congress and Exposition, Nov. 5-10, 2006, Chicago, Illinois, USA, 5 pages.
He et al., Effect of annealing on the structure of carbon onions and the annealed carbon coated Ni nanoparticles fabricated by chemical vapor deposition, Journal of Alloys and Compounds, vol. 472, Issue 1, Mar. 2009, pp. 230-233.
He et al., TEM investigation on the initial stage growth of carbon onions synthesized by CVD, Journal of Alloys and Compounds, vol. 452, Issue 2, Mar. 2008, pp. 258-262.
Hirata and Igarashi, Solid Lubricant Properties of Carbon Onions Prepared by Heat Treatment of Diamond Fine Particles, Journal of the Japan Society for Precision Engineering, vol. 69, No. 5, 2003 pp. 683-687, Released Apr. 10, 2009.
Hof et al., Conductive inks of graphitic nanoparticles from a sustainable carbon feedstock, Carbon 111, Jan. 2017, pp. 142-149.
Hou et al., High-yield synthesis of carbon nano-onions in counterflow diffusion flames, Carbon, vol. 47, Issue 4, Apr. 2009, pp. 938-947.
Hydrogen Atom Beam Source HABS, MBE Komponenten, Dr. Eberl, www.mbe-components.com, Accessed on Feb. 10, 2017, 2 pages.
Iijima, Direct observation of the tetrahedral bonding in graphitized carbon black by high resolution electron microscopy, Journal of Crystal Growth, vol. 50, Issue 3, Nov. 1980, pp. 675-683.
Inaba and Hirata, Lubrication Property of Carbon Onions on Silicon Surface with Fine Patterns, Journal of the Japan Society for Precision Engineering, vol. 76, No. 1, Jul. 2010 p. 59-63.
International Search Report and Written Opinion dated Feb. 9, 2018 for PCT Application No. PCT/US2017/057892.
International Search Report dated Jan. 24, 2018 for PCT Patent Application No. PCT/US/2017/055337.
Jackel et al., Comparison of carbon onions and carbon blacks as conductive additives for carbon supercapacitors in organic electrolytes, Journal of Power Sources, vol. 272, Dec. 25, 2014, pp. 1122-1133.
Notice of Allowance dated Feb. 15, 2019 for U.S. Appl. No. 15/727,533.
Notice of Allowance dated Jan. 11, 2019 for U.S. Appl. No. 16/003,680.
Notice of Allowance dated Oct. 11, 2018 for U.S. Appl. No. 15/725,928.
Office Action dated Sep. 20, 2018 for U.S. Appl. No. 16/003,680.

(56) References Cited

OTHER PUBLICATIONS

Baldissarelli, Vanessa et al., "Plasma-Assisted Production of Carbon Black and Carbon Nanotubes from Methane by Thermal Plasma Reform," J. Braz., Chem. Soc., vol. 25, No. 1, 126-132, 2014, pub. online: Nov. 26, 2013.
Non-Final Office Action dated Mar. 21, 2019 for U.S. Appl. No. 15/710,679.

* cited by examiner

ASTM CLASSIFICATION: CARBON BLACK PROPERTIES
| ASTM CLASSIFICATION | TARGET VALUES A | | TYPICAL DESCRIPTIVE VALUES A | | | |
|---|---|---|---|---|---|---|
| | IODINE ABSORPTION NO. B D 1510, g/kg | OIL ABSORPTION NO. D 2414, 10⁻⁵ m³/kg | OIL ABSORPTION NO. COMPRESSED SAMPLE, D 3493, 10⁻⁵ m³/kg | NSA MULTIPOINT D 6556, 10³ m²/kg (m²/g) | STSA D 6556, 10³ m²/kg (m²/g) | TINT STRENGTH, D 3265 |
| N110 | 145 | 113 | 97 | 127 | 115 | 123 |
| N125 | 117 | 104 | 89 | 122 | 121 | 125 |
| N219 | 118 | 78 | 75 | ... | ... | 123 |
| N234 | 120 | 125 | 102 | 119 | 112 | 123 |
| N299 | 108 | 124 | 104 | 104 | 97 | 113 |
| N339 | 90 | 120 | 99 | 91 | 88 | 111 |
| N660 | 36 | 90 | 74 | 35 | 34 | ... |
| N762 | 27 | 65 | 59 | 29 | 28 | ... |
| N772 | 30 | 65 | 59 | 32 | 30 | ... |
| N774 | 29 | 72 | 63 | 30 | 29 | ... |
*FIG. 2*
*(PRIOR ART)*
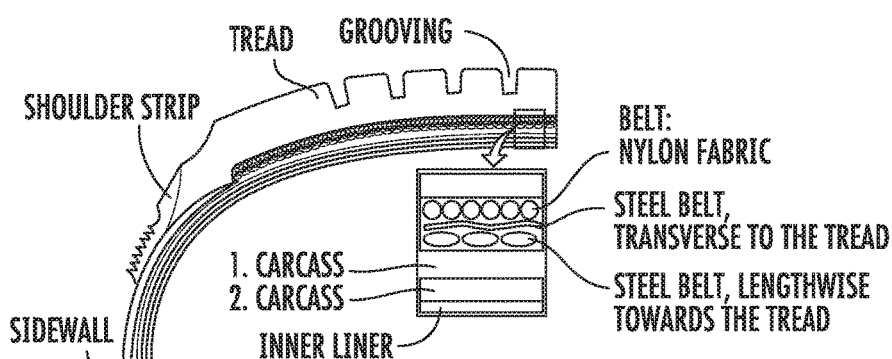
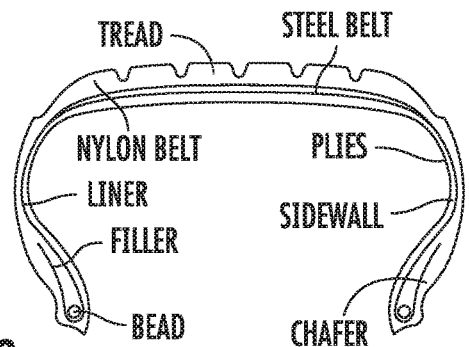
*FIG. 3*

| CARBON PROPERTY | N115 | N330 | N650 | N110 | N770 | N339 | TC |
|---|---|---|---|---|---|---|---|
| IODINE ABSORPTION [mg/g] | 160 | 82 | 36 | 145 | 29 | 90 | 46 |
| OIL ABSORPTION [ml/100g] | 113 | 102 | 122 | 113 | 73 | 120 | 75 |
| SPECIFIC SURFACE AREA, BET (NSA) [m²/g] | 143 | 79 | 37 | 145 | 32 | 94 | 45 |
| TINT INDEX [%] | 123 | 103 | --- | 123 | --- | 109 | 44 |

| COMPOUND NO. → INGREDIENT ↓ | CONTROL | TIRE BLACK SAMPLE |
|---|---|---|
| SBR 1500 | 100.00 | 100.00 |
| ZnO | 3.0 | 3.0 |
| SULFUR | 1.75 | 1.75 |
| STEARIC ACID | 1.0 | 1.0 |
| IRB#8 | 50.0 | -- |
| TIRE BLACK SAMPLE | -- | 50.0 |
| TBBS | 1.0 | 1.0 |
| TOTAL | 156.75 | 156.75 |

*FIG. 6*

|  | CONTROL | TIRE BLACK SAMPLE |
|---|---|---|
| ULTIMATE ELONGATION, % | 432 | 512 |
| 100% MODULUS, PSI | 463 | 356 |
| 200% MODULUS, PSI | 1161 | 826 |
| 300% MODULUS, PSI | 2113 | 1413 |
| TENSILE STRENGTH, PSI | 3278 | 2503 |
| DUROMETER, SHORE A | 67 | 64 |

*FIG. 7*

|  | CONTROL | TIRE BLACK (1-110G) |
|---|---|---|
| DUROMETER A, PTS | 70 | 63 |
| TEMPERATURE RISE; °F | 51 | 42 |
|  |  |  |
| DEFLECTION, % |  |  |
| STATIC | 15.1 | 17.0 |
| DYNAMIC | 6.3 | 10.0 |
| SET, % | 6.9 | 6.8 |

*FIG. 8*

FORMULATIONS:

| | N339 CARBON BLACK | BM CARBON |
|---|---|---|
| MASTERBATCH - 1ST PASS | | |
| BUNA 4525-0 S-SBR | 70.00 | 70.00 |
| BUDENE 1207 OR 1208 BR | 30.00 | 30.00 |
| POST-PROCESSED CARBON | | 55.00 |
| N339 CARBON BLACK | 55.00 | |
| TDAE OIL, PLASTICIZER | 20.00 | 20.00 |
| ZINC OXIDE, ACTIVATOR | 3.00 | 3.00 |
| STEARIC ACID, ACTIVATOR | 1.50 | 1.50 |
| 6PPD, ANTIDEGRADANT | 2.00 | 2.00 |
| NOCHEK 4729A WAX | 1.00 | 1.00 |
| TMQ, ANTIDEGRADANT | 0.50 | 0.50 |
| MASTERBATCH TOTAL phr | 183.00 | 183.00 |
| FINAL PASS | | |
| MASTER BATCH - 1ST PASS | 183.00 | 183.00 |
| TBBS, ACCELERATOR | 1.00 | 1.00 |
| DPG, ACCELERATOR | 0.40 | 0.40 |
| SULFUR | 1.80 | 1.80 |
| FINAL PASS TOTAL phr | 186.20 | 186.20 |

FIG. 9

| | 1. N339 CARBON BLACK | 2. BM CARBON |
|---|---|---|
| MAXIMUM TORQUE, $M_H$, N-m | 0.17 | 0.11 |
| MINIMUM TORQUE, $M_L$, N-m | 1.53 | 1.30 |
| CURE TIME, $t_{50}$, MINUTES | 3.34 | 3.85 |
| CURE TIME, $t_{90}$, MINUTES | 4.84 | 5.14 |
| SCORCH TIME, $T_S2$, MINUTES | 2.64 | 3.30 |

FIG. 10

ORIGINAL PHYSICAL PROPERTIES, ASTM D412-16, D2240-15
DIE C DUMBBELLS TESTED AT 20 in/min.

|  | 1. N339 CARBON BLACK | 2. BM CARBON |
|---|---|---|
| SHORE A DUROMETER, POINTS | | |
| SAMPLE 1 | 56 | 48 |
| SAMPLE 2 | 56 | 48 |
| SAMPLE 3 | 56 | 48 |
| SAMPLE 4 | 56 | 48 |
| SAMPLE 5 | 56 | 48 |
| MEDIAN | 56 | 48 |
| AVERAGE | 56 | 48 |
| STANDARD DEVIATION | 0 | 0 |
| PEAK STRESS (TENSILE), MPa | | |
| MEDIAN | 21.04 | 9.09 |
| AVERAGE | 21.06 | 8.98 |
| STANDARD DEVIATION | 0.36 | 0.24 |
| PEAK STRAIN (ELONGATION), % | | |
| MEDIAN | 566 | 523 |
| AVERAGE | 571 | 516 |
| STANDARD DEVIATION | 10 | 17 |
| MODULUS AT 50% STRAIN, MPa | | |
| MEDIAN | 1.11 | 0.88 |
| AVERAGE | 1.11 | 0.88 |
| STANDARD DEVIATION | 0.02 | 0.01 |
| MODULUS AT 100% STRAIN, MPa | | |
| MEDIAN | 1.80 | 1.34 |
| AVERAGE | 1.82 | 1.34 |
| STANDARD DEVIATION | 0.04 | 0.03 |
| MODULUS AT 200% STRAIN, MPa | | |
| MEDIAN | 4.65 | 2.77 |
| AVERAGE | 4.73 | 2.80 |
| STANDARD DEVIATION | 0.16 | 0.06 |
| MODULUS AT 300% STRAIN, MPa | | |
| MEDIAN | 9.05 | 4.80 |
| AVERAGE | 9.18 | 4.81 |
| STANDARD DEVIATION | 0.22 | 0.03 |

FIG. 11

HEAT-AGED PROPERTIES, AIR-OVEN, ASTM D 573-04 (2015)
AGED 168 hrs. @ 70° C (158°F) AIR OVEN

|  | 1. N339 CARBON BLACK | 2. BM CARBON |
|---|---|---|
| SHORE A DUROMETER, POINTS |  |  |
| SAMPLE 1 | 55 | 62 |
| SAMPLE 2 | 55 | 62 |
| SAMPLE 3 | 55 | 63 |
| SAMPLE 4 | 55 | 63 |
| SAMPLE 5 | 55 | 63 |
| MEDIAN | 55 | 63 |
| AVERAGE | 55 | 63 |
| STANDARD DEVIATION | 0 | 0.5 |
| PEAK STRESS (TENSILE), MPa |  |  |
| MEDIAN | 7.96 | 19.79 |
| AVERAGE | 7.95 | 19.68 |
| STANDARD DEVIATION | 0.74 | 1.32 |
| PEAK STRAIN (ELONGATION), % |  |  |
| MEDIAN | 389 | 482 |
| AVERAGE | 401 | 466 |
| STANDARD DEVIATION | 47 | 29 |
| MODULUS AT 50% STRAIN, MPa |  |  |
| MEDIAN | 1.06 | 1.43 |
| AVERAGE | 1.06 | 1.45 |
| STANDARD DEVIATION | 0.02 | 0.06 |
| MODULUS AT 100% STRAIN, MPa |  |  |
| MEDIAN | 1.69 | 2.51 |
| AVERAGE | 1.72 | 2.58 |
| STANDARD DEVIATION | 0.05 | 0.15 |
| MODULUS AT 200% STRAIN, MPa |  |  |
| MEDIAN | 3.64 | 6.59 |
| AVERAGE | 3.65 | 6.74 |
| STANDARD DEVIATION | 0.1 | 0.33 |
| MODULUS AT 300% STRAIN, MPa |  |  |
| MEDIAN | 5.93 | 11.76 |
| AVERAGE | 5.95 | 11.91 |
| STANDARD DEVIATION | 0.14 | 0.42 |
| CHANGE IN PROPERTIES |  |  |
| SHORE A DUROMETER, POINTS | -1 | 15 |
| TENSILE, % | -62 | 118 |
| ELONGATION, % | -31 | -8 |

FIG. 12

TIRE PERFORMANCE PREDICTORS:

| DMA TIRE PERFORMANCE PREDICTORS | 1<br>CONTROL N339 | 2<br>BM CARBON |
|---|---|---|
| G', STORAGE MODULUS AT -15C (Pa)<br>WINTER TRACTION (LOWER BETTER) | 3.16E+06 | 1.63E+06 |
| TAN DELTA AT -10°C<br>ICE TRACTION (HIGER BETTER) | 0.282 | 0.145 |
| TAN DELTA AT 0°C<br>WET TRACTION (HIGHER BETTER) | 0.257 | 0.131 |
| TAN DELTA AT 30°C<br>ROLLING RESISTANCE (LOWER BETTER) | 0.210 | 0.115 |
| G', STORAGE MODULUS AT 30°C (Pa)<br>DRY HANDLING (HIGHER BETTER) | 1.93E+06 | 1.21E+06 |
| J", LOSS COMPLIANCE AT 30°C (1/Pa)<br>DRY TRACTION (HIGHER BETTER) | 1.04E-07 | 9.41E-08 |
| TAN DELTA AT 60°C<br>ROLLING RESISTANCE (LOWER BETTER) | 0.180 | 0.098 |
| G', STORAGE MODULUS AT 60°C (Pa)<br>DRY HANDLING (HIGHER BETTER) | 1.59E+06 | 1.10E+06 |
| J", LOSS COMPLIANCE AT 60°C (1/Pa)<br>DRY TRACTION (HIGHER BETTER) | 1.10E-07 | 8.88E-08 |
| DIN ABRASION LOSS (mm3)<br>TREAD LIFE (LOWER BETTER) | 72 | 154 |

FIG. 13

TIRE PERFORMANCE PREDICTORS - INDEXED TO #1 N339 CONTROL COMPOUND:

| INDEXED SO HIGHER NUMBER EQUAL BETTER FORMANCE, PERFORMANCE INDICATORS WHERE LOWER NUMBERS = BETTER PERFORMANCE, FOR EXAMPLE ROLLING RESISTANCE WAS REVERSED | COMMENTS | GRAPH ID | 1 CONTROL N339 | 2 BM CARBON |
|---|---|---|---|---|
| G', STORAGE MODULUS AT -15C (Pa) WINTER TRACTION | REVERSED | WINTER TRACTION | 100 | 149 |
| TAN DELTA AT -10°C ICE TRACTION | AS IS | ICE TRACTION | 100 | 51 |
| TAN DELTA AT 0°C WET TRACTION | AS IS | WET TRACTION | 100 | 51 |
| TAN DELTA AT 30°C ROLLING RESISTANCE | REVERSED | FUEL ECONOMY 30C | 100 | 145 |
| G', STORAGE MODULUS AT 30°C (Pa) DRY HANDLING | AS IS | DRY HANDLING 30C | 100 | 63 |
| J", LOSS COMPLIANCE AT 30°C (1/Pa) DRY TRACTION | AS IS | DRY TRACTION 30C | 100 | 90 |
| TAN DELTA AT 60°C ROLLING RESISTANCE | REVERSED | FUEL ECONOMY 60C | 100 | 145 |
| G', STORAGE MODULUS AT 60°C (Pa) DRY HANDLING | AS IS | DRY HANDLING 60C | 100 | 69 |
| J", LOSS COMPLIANCE AT 60°C (1/Pa) DRY TRACTION (HIGHER BETTER) | AS IS | DRY TRACTION 60C | 100 | 81 |
| DIN ABRASION LOSS (mm3) TREAD LIFE (LOWER BETTER) | REVERSED | TREAD-LIFE | 100 | -14 |
| TOTAL INDEX | | | 1000 | 830 |
| AVERAGE INDEX | | | 100 | 83 |

*FIG. 14*

FORMULATIONS:

| FORMULATION | A N339 | B LF FIL | C LF CYC | LF CYC C6+ |
|---|---|---|---|---|
| SBR 1500 | 100.00 | 100.00 | 100.00 | 100.00 |
| ZINC OXIDE | 3.00 | 3.00 | 3.00 | 3.00 |
| SULFUR | 1.75 | 1.75 | 1.75 | 1.75 |
| N339 | 50.00 | | | |
| LF FIL CARBON | | 50.00 | | |
| LF CYC CARBON | | | 50.00 | |
| LF CYC C6+ CARBON | | | | 50.00 |
| TBBS | 1.00 | 1.00 | 1.00 | 1.00 |
| STEARIC ACID | 1.00 | 1.00 | 1.00 | 1.00 |
| TOTAL PHR | 156.75 | 156.75 | 156.75 | 156.75 |

FIG. 16

MIXING PARAMETERS AND OBSERVATIONS:

| COMPOUND A: N339 | |
|---|---|
| SPEED | 60 rpm |
| MINUTES | ACTION |
| 0 | ADD RUBBER @ 58.3°C |
| 1 | ADD FILLER AND CARBON @ 75.9°C |
| 1.48 | ALL IN @ 96.7°C |
| 2.48 | SWEEP @ 107.6°C (15s) |
| 9 | DUMP @ 125°C |
| OBSERVATIONS | |
| SMOOTH, SHINNY APPEARANCE | |
| BLACK DISPERSERSED WELL | |

| COMPOUND C: LF CYC | |
|---|---|
| SPEED | 60 rpm |
| MINUTES | ACTION |
| 0 | ADD RUBBER @ 60.4°C |
| 1 | ADD CARBON @ 79.4°C |
| 3.19 | ALL IN @ 124.0°C |
| 8.19 | SWEEP @ 126°C (14s) |
| 9 | DUMP @ 127.6°C |
| OBSERVATIONS | |
| CARBON WOULD NOT FEED EASY | |
| BLACK DISPERSERSED WELL BUT TOOK LONGER THAN A | |

| COMPOUND B: LF FIL | |
|---|---|
| SPEED | 60 rpm |
| MINUTES | ACTION |
| 0 | ADD RUBBER @ 61.6°C |
| 1 | ADD CARBON @ 75.3°C |
| 3.19 | ALL IN @ 127.8°C |
| 8.19 | SWEEP @ 118.6°C (14s) |
| 9 | DUMP @ 127.4°C |
| OBSERVATIONS | |
| SMOOTH BUT DULL APPEARANCE | |
| BLACK DISPERSERED WELL BUT TOOK LONGER THAN A | |

| COMPOUND D: LF CYC C6+ | |
|---|---|
| SPEED | 60 rpm |
| MINUTES | ACTION |
| 0 | ADD RUBBER @ 59.5°C |
| 1 | ADD CARBON @ 79.0°C |
| 3.19 | ALL IN @ 124.0°C |
| 8.19 | SWEEP @ 122.3°C (14s) |
| 9 | DUMP @ 127°C |
| OBSERVATIONS | |
| CARBON WOULD NOT FEED EASY | |
| BLACK DISPERSERED WELL BUT TOOK LONGER THAN A | |

FIG. 17

|  | A<br>N339 | B<br>LF FIL | C<br>LF CYC | LF CYC<br>C6+ |
|---|---|---|---|---|
| MAXIMUM TORQUE, $M_H$, N-m | 2.06 | 2.39 | 3.07 | 3.23 |
| MAXIMUM TORQUE, $M_L$, N-m | 0.23 | 0.57 | 0.69 | 0.55 |
| CURE TIME, $t_{50}$, MINUTES | 5.64 | 4.03 | 5.41 | 4.04 |
| CURE TIME, $t_{90}$, MINUTES | 10.02 | 7.85 | 9.45 | 7.33 |
| SCORCH TIME, $T_s2$, MINUTES | 3.5 | 2.41 | 3.23 | 2.21 |

FIG. 18

ORIGINAL PHYSICAL PROPERTIES, ASTM D412-16, D2240-15
MICRO SAMPLES 0.290

|  | A<br>N339 | B<br>LF FIL | C<br>LF CYC | LF CYC<br>C6+ |
|---|---|---|---|---|
| SHORE A DUROMETER HARDNESS, POINTS |  |  |  |  |
| MEDIAN | 72 | 76 | 77 | 79 |
| AVERAGE | 72 | 76 | 77 | 79 |
| STANDARD DEVIATION | 0.5 | 0.8 | 0.4 | 0.5 |
| TENSILE, PSI |  |  |  |  |
| MEDIAN | 27.66 | 24.99 | 14.34 | 14.59 |
| AVERAGE | 27.92 | 25.02 | 14.15 | 14.93 |
| STANDARD DEVIATION | 0.63 | 0.99 | 1.01 | 1.44 |
| ELONATION AT BREAK, % |  |  |  |  |
| MEDIAN | 486 | 460 | 317 | 287 |
| AVERAGE | 478 | 468 | 317 | 303 |
| STANDARD DEVIATION | 18 | 38 | 9 | 36 |
| 50% MODULUS, PSI |  |  |  |  |
| MEDIAN | 1.63 | 2.08 | 2.60 | 2.63 |
| AVERAGE | 1.65 | 2.14 | 2.69 | 2.72 |
| STANDARD DEVIATION | 0.09 | 0.17 | 0.25 | 0.18 |
| 100% MODULUS, PSI |  |  |  |  |
| MEDIAN | 2.78 | 3.54 | 4.62 | 4.95 |
| AVERAGE | 2.92 | 3.70 | 4.72 | 5.05 |
| STANDARD DEVIATION | 0.25 | 0.40 | 0.46 | 0.26 |
| 200% MODULUS, PSI |  |  |  |  |
| MEDIAN | 7.98 | 8.45 | 9.26 | 9.99 |
| AVERAGE | 8.44 | 8.73 | 9.23 | 10.10 |
| STANDARD DEVIATION | 0.88 | 0.95 | 0.74 | 0.46 |
| 300% MODULUS, PSI |  |  |  |  |
| MEDIAN | 15.55 | 14.44 | 13.71 | - |
| AVERAGE | 16.04 | 14.86 | 13.55 | - |
| STANDARD DEVIATION | 1.28 | 1.47 | 1.07 | - |

FIG. 19

FORMULATIONS:

| FORMULATION | A<br>N339 | B<br>LF FIL | E<br>N234 | F<br>N110 |
|---|---|---|---|---|
| SBR 1500 | 100.00 | 100.00 | 100.00 | 100.00 |
| ZINC OXIDE | 3.00 | 3.00 | 3.00 | 3.00 |
| SULFUR | 1.75 | 1.75 | 1.75 | 1.75 |
| N339 | 50.00 | | | |
| N234 | | | 50.00 | |
| N110 | | | | 50.00 |
| LF FIL CARBON | | 50.00 | | |
| TBBS | 1.00 | 1.00 | 1.00 | 1.00 |
| STEARIC ACID | 1.00 | 1.00 | 1.00 | 1.00 |
| TOTAL PHR | 156.75 | 156.75 | 156.75 | 156.75 |

FIG. 20

| COMPOUND A: N339 | |
|---|---|
| SPEED | 60 RPM |
| MINUTES | ACTION |
| 0 | ADD RUBBER @ 58.3°C |
| 1 | ADD FILLER AND CARBON @ 75.9°C |
| 1.48 | ALL IN @ 96.7°C |
| 2.48 | SWEEP @ 107.6°C (15s) |
| 9 | DUMP @ 125°C |
| OBSERVATIONS | |
| SMOOTH, SHINNY APPEARANCE | |
| BLACK DISPERSERED WELL | |
| | |
| COMPOUND B: LF FIL | |
| SPEED | 60 RPM |
| MINUTES | ACTION |
| 0 | ADD RUBBER @ 61.6°C |
| 1 | ADD CARBON @ 75.3°C |
| 3.19 | ALL IN @ 127.8°C |
| 8.19 | SWEEP @ 118.6°C (14s) |
| 9 | DUMP @ 127.4°C |
| OBSERVATIONS | |
| SMOOTH BUT DULL APPEARANCE | |
| BLACK DISPERSERSED WELL BUT TOOK LONGER THAN A | |

FIG. 21

MDR RHEOMETER DATA: ASTM D5289-12
TECH PRO rheoTECH MDR, TEMPERATURE 160°C (320°F) 0.5° arc

| FORMULATION | A N339 | B LF FIL | E N234 | F N110 |
|---|---|---|---|---|
| MAXIMUM TORQUE, $M_H$, N-m | 2.06 | 2.39 | 2.40 | 2.15 |
| MAXIMUM TORQUE, $M_L$, N-m | 0.23 | 0.57 | 0.32 | 0.37 |
| CURE TIME, $t_{50}$, MINUTES | 5.64 | 4.03 | 5.78 | 7.68 |
| CURE TIME, $t_{90}$, MINUTES | 10.02 | 7.85 | 10.68 | 13.95 |
| SCORCH TIME, $T_S 2$, MINUTES | 3.5 | 2.41 | 3.34 | 4.74 |

| FORMULATION | A<br>N339 | B<br>LF FIL | E<br>N234 | F<br>N110 |
|---|---|---|---|---|
| SHORE A DUROMETER HARDNESS, POINTS | | | | |
| MEDIAN | 72 | 76 | 72 | 68 |
| AVERAGE | 72 | 76 | 72 | 68 |
| STANDARD DEVIATION | 0.5 | 0.8 | 0.5 | 0.0 |
| TENSILE, MPa | | | | |
| MEDIAN | 27.66 | 24.99 | 27.79 | 27.82 |
| AVERAGE | 27.92 | 25.02 | 27.90 | 27.69 |
| STANDARD DEVIATION | 0.63 | 0.99 | 2.28 | 0.84 |
| ELONATION AT BREAK, % | | | | |
| MEDIAN | 486 | 460 | 449 | 319 |
| AVERAGE | 478 | 468 | 470 | 321 |
| STANDARD DEVIATION | 18 | 38 | 35 | 22 |
| 50% MODULUS, MPa | | | | |
| MEDIAN | 1.63 | 2.08 | 1.81 | 1.50 |
| AVERAGE | 1.65 | 2.14 | 1.80 | 1.52 |
| STANDARD DEVIATION | 0.09 | 0.17 | 0.09 | 0.06 |
| 100% MODULUS, MPa | | | | |
| MEDIAN | 2.78 | 3.54 | 3.07 | 2.28 |
| AVERAGE | 2.92 | 3.70 | 3.00 | 2.28 |
| STANDARD DEVIATION | 0.25 | 0.40 | 0.18 | 0.12 |
| 200% MODULUS, MPa | | | | |
| MEDIAN | 7.98 | 8.45 | 8.31 | 5.49 |
| AVERAGE | 8.44 | 8.73 | 7.99 | 5.48 |
| STANDARD DEVIATION | 0.88 | 0.95 | 0.67 | 0.42 |
| 300% MODULUS, MPa | | | | |
| MEDIAN | 15.55 | 14.44 | 15.89 | 10.83 |
| AVERAGE | 16.04 | 14.86 | 15.46 | 10.72 |
| STANDARD DEVIATION | 1.28 | 1.47 | 1.11 | 0.73 |

FIG. 24

TIRE PERFORMANCE PREDICTORS

| FORMULATION | A<br>N339 | B<br>LF FIL | E<br>N234 | E<br>N110 |
|---|---|---|---|---|
| G', STORAGE MODULUS AT -20C (Pa)<br>WINTER TRACTION (LOWER BETTER) | 7.19E+06 | 1.06E+07 | 7.85E+06 | 7.42E+06 |
| TAN DELTA AT -10°C<br>ICE TRACTION (HIGHER BETTER) | 0.364 | 0.389 | 0.387 | 0.375 |
| TAN DELTA AT 0°C<br>WET TRACTION (HIGHER BETTER) | 0.274 | 0.317 | 0.309 | 0.316 |
| TAN DELTA AT 30°C<br>ROLLING RESISTANCE (LOWER BETTER) | 0.223 | 0.255 | 0.246 | 0.276 |
| G', STORAGE MODULUS AT 30°C (Pa)<br>DRY HANDLING (HIGHER BETTER) | 3.52E+06 | 5.21E+06 | 3.93E+06 | 3.65E+06 |
| J", LOSS COMPLIANCE AT 30°C (1/Pa)<br>DRY TRACTION (HIGHER BETTER) | 6.02E-08 | 4.61E-08 | 5.90E-08 | 7.03E-08 |
| TAN DELTA AT 60°C<br>ROLLING RESISTANCE (LOWER BETTER) | 0.187 | 0.225 | 0.209 | 0.248 |
| G', STORAGE MODULUS AT 60°C (Pa)<br>DRY HANDLING (HIGHER BETTER) | 2.71E+06 | 3.83E+06 | 2.92E+06 | 2.60E+06 |

FIG. 25

DMA TIRE PERFORMANCE PREDICTORS - INDEXED TO A (N339)

| INDEXED SO HIGHER NUMBER EQUAL BETTER FORMANCE, PERFORMANCE INDICATORS WHERE LOWER NUMBERS = BETTER PERFORMANCE, FOR EXAMPLE ROLLING RESISTANCE WAS REVERSED | COMMENTS | GRAPH ID | A N339 | B LF FIL | E N234 | F N110 |
|---|---|---|---|---|---|---|
| G', STORAGE MODULUS AT -20C (Pa) WINTER TRACTION | REVERSED | WINTER TRACTION | 100 | 52 | 91 | 97 |
| TAN DELTA AT -10°C ICE TRACTION | AS IS | ICE TRACTION | 100 | 107 | 106 | 103 |
| TAN DELTA AT 0°C WET TRACTION | AS IS | WET TRACTION | 100 | 116 | 113 | 115 |
| TAN DELTA AT 30°C ROLLING RESISTANCE | REVERSED | FUEL ECONOMY 30C | 100 | 85 | 90 | 76 |
| G', STORAGE MODULUS AT 30°C (Pa) DRY HANDLING | AS IS | DRY HANDLING 30C | 100 | 148 | 112 | 104 |
| J", LOSS COMPLIANCE AT 30°C (1/Pa) DRY TRACTION | AS IS | DRY TRACTION | 100 | 76 | 98 | 117 |
| TAN DELTA AT 60°C ROLLING RESISTANCE | REVERSED | FUEL ECONOMY 60C | 100 | 80 | 88 | 68 |
| G', STORAGE MODULUS AT 60°C (Pa) DRY HANDLING | AS IS | DRY HANDLING 60C | 100 | 141 | 108 | 96 |
| DIN ABRASION TREADLIFE (LOWER BETTER) | REVERSED | TREADLIFE | 100 | 81 | 101 | 82 |
| TOTAL INDEX | | | 900 | 887 | 907 | 858 |
| AVERAGE INDEX | | | 100 | 99 | 101 | 95 |

FIG. 26

|  | 1<br>N234<br>TBBS 1.7<br>DPG 2.0 | 2<br>LF FIL<br>TBBS 1.7<br>DPG 2.0 | 6<br>LF FIL<br>TBBS 2.0<br>DPG 1.5 |
|---|---|---|---|
| BUNA VSL 4526-2 TDAE OIL EXETEND S-SBR | 103.12 | 103.12 | 103.12 |
| BUDENE 1207, S-SBR | 25 | 25 | 25 |
| N234 CARBON BLACK | 15 | | |
| LF FIL CARBON | | 15 | 15 |
| ULTASIL 7000 GR SILICA | 65 | 65 | 65 |
| Si 69 SILANE COUPLING AGENT | 6.5 | 6.5 | 6.5 |
| TDAE OIL | 7 | 7 | 7 |
| TOTAL phr 1st PASS | 221.62 | 221.62 | 221.62 |
| 2nd PASS | | | |
| 1st PASS | 221.62 | 221.62 | 221.62 |
| ZINC OXIDE CURE ACTIVATOR | 3 | 3 | 3 |
| STEARIC ACID ACTIVATOR | 1.5 | 1.5 | 1.5 |
| NOCHEK 4729A WAX | 2 | 2 | 2 |
| 6PPD ANTIOZONANT | 2 | 2 | 2 |
| TMQ | 0.5 | 0.5 | 0.5 |
| STRUKTOL ZB49 | 3 | 3 | 3 |
| TOTAL phr 2nd PASS | 233.62 | 233.62 | 233.62 |
| FINAL MIX PASS | | | |
| 2nd PASS | 233.62 | 233.62 | 233.62 |
| SULFUR CROSS-LINKER | 2 | 2 | 2 |
| TBBS ACCELERATOR | 1.7 | 1.7 | 2 |
| DPG ACCELERATOR | 2 | 2 | 1.5 |
| TOTAL phr FINAL PASS | 239.32 | 239.32 | 239.32 |

FIG. 28

| MDR RHEOMETER DATA: ASTM D5289-12 | | | |
|---|---|---|---|
| TECH PRO rheoTECH MDR | | | |
| 160C (320°F) 0.5°arc | | | |
| | 1<br>N234<br>TBBS 1.7<br>DPG 2.0 | 2<br>LF FIL<br>TBBS 1.7<br>DPG 2.0 | 6<br>LF FIL<br>TBBS 2.0<br>DPG 1.5 |
| MAXIMUM TORQUE, $M_H$, N*m | 1.64 | 1.62 | 1.68 |
| MAXIMUM TORQUE, $M_L$, N*m | 0.24 | 0.23 | 0.22 |
| CURE TIME, $t_{50}$, MINUTES | 4.56 | 4.07 | 5.04 |
| CURE TIME, $t_{90}$, MINUTES | 9 | 9 | 9.76 |
| SCORCH TIME, $T_S 2$, MINUTES | 3.07 | 2.78 | 3.07 |

| | 1<br>N234<br>TBBS 1.7<br>DPG 2.0 | 2<br>LF FIL<br>TBBS 1.7<br>DPG 2.0 | 6<br>LF FIL<br>TBBS 2.0<br>DPG 1.5 |
|---|---|---|---|
| SHORE A DUROMETER, POINTS | | SIMILAR | SIMILAR |
| MEDIAN | 63 | 63 | 65 |
| AVERAGE | 63 | 63 | 65 |
| STANDARD DEVIATION | 0.7 | 0.8 | 0.5 |
| TENSILE, MPa | | SLIGHTLY BETTER | SIMILAR |
| MEDIAN | 16.02 | 18.24 | 17.13 |
| AVERAGE | 15.37 | 17.50 | 17.17 |
| STANDARD DEVIATION | 2.12 | 1.69 | 0.34 |
| ELONGATION AT BREAK, % | | SIMILAR | SIMILAR |
| MEDIAN | 306 | 349 | 319 |
| AVERAGE | 306 | 338 | 322 |
| STANDARD DEVIATION | 28 | 29 | 8 |
| 50% MODULUS, MPa | | SIMILAR | SIMILAR |
| MEDIAN | 1.48 | 1.50 | 1.50 |
| AVERAGE | 1.47 | 1.49 | 1.52 |
| STANDARD DEVIATION | 0.03 | 0.04 | 0.04 |
| 100% MODULUS, MPa | | SIMILAR | SIMILAR |
| MEDIAN | 3.14 | 3.23 | 3.24 |
| AVERAGE | 3.14 | 3.21 | 3.21 |
| STANDARD DEVIATION | 0.03 | 0.09 | 0.09 |
| 200% MODULUS, MPa | | SIMILAR | SIMILAR |
| MEDIAN | 8.61 | 8.51 | 8.95 |
| AVERAGE | 8.59 | 8.56 | 8.87 |
| STANDARD DEVIATION | 0.05 | 0.12 | 0.20 |
| 300% MODULUS, MPa | | SIMILAR | SIMILAR |
| MEDIAN | 15.60 | 15.06 | 15.83 |
| AVERAGE | 15.60 | 15.06 | 15.71 |
| STANDARD DEVIATION | 0.04 | 0.14 | 0.23 |

FIG. 31

| HEAT-AGED PROPERTIES, AIR-OVEN, ASTM D 573-04 (2015) | | | |
|---|---|---|---|
| AGED 168 hrs. @ 70°C AIR OVEN | | | |
| DIE C DUMBBELLS TESTED AT 20 in/min. | | | |
| | 1<br>N234<br>TBBS 1.7<br>DPG 2.0 | 2<br>LF FIL<br>TBBS 1.7<br>DPG 2.0 | 6<br>LF FIL<br>TBBS 2.0<br>DPG 1.5 |
| SHORE A DUROMETER, POINTS | | | |
| MEDIAN | 67 | 67 | 67 |
| AVERAGE | 67 | 67 | 67 |
| STANDARD DEVIATION | 0.0 | 0.5 | 0.5 |
| | | SIMILAR | SIMILAR |
| POINT CHANGE | 4 | 4 | 2 |
| TENSILE, MPa | | | |
| MEDIAN | 16.10 | 15.93 | 16.85 |
| AVERAGE | 15.97 | 16.01 | 16.83 |
| STANDARD DEVIATION | 1.47 | 1.14 | 0.98 |
| | | WORSE | SIMILAR |
| % CHANGE | 0.5 | -13.6 | -1.6 |
| ELONGATION AT BREAK, % | | | |
| MEDIAN | 263 | 267 | 283.00 |
| AVERAGE | 264 | 270 | 281.00 |
| STANDARD DEVIATION | 19 | 15 | 12 |
| % CHANGE | -14.1 | -23.5 | -11.3 |
| 50% MODULUS, MPa | | | |
| MEDIAN | 1.76 | 1.83 | 1.78 |
| AVERAGE | 1.77 | 1.83 | 1.78 |
| STANDARD DEVIATION | 0.06 | 0.03 | 0.04 |
| 100% MODULUS, MPa | | | |
| MEDIAN | 3.99 | 2.10 | 3.96 |
| AVERAGE | 3.99 | 4.18 | 3.94 |
| STANDARD DEVIATION | 0.17 | 0.11 | 0.10 |
| 200% MODULUS, MPa | | | |
| MEDIAN | 10.94 | 10.90 | 10.83 |
| AVERAGE | 10.89 | 10.87 | 10.76 |
| STANDARD DEVIATION | 0.28 | 0.17 | 0.19 |

*FIG. 32*

| DMA TIRE PERFORMANCE PREDICTORS<br>TEMPERATURE SWEEP, 10 Hz FREQUENCY<br>5% STRAIN, SHEAR MODE | 1<br>N234<br>TBBS 1.7<br>DPG 2.0 | 2<br>LF FIL<br>TBBS 1.7<br>DPG 2.0 | 6<br>LF FIL<br>TBBS 2.0<br>DPG 1.5 |
|---|---|---|---|
| G', STORAGE MODULUS AT -20C (Pa)<br>WINTER TRACTION (LOWER BETTER) | 8.54E+06 | 8.28E+06 | 8.63E+06 |
| TAN DELTA AT -10°C<br>ICE TRACTION (HIGHER BETTER) | 0.829 | 0.826 | 0.835 |
| TAN DELTA AT 0°C<br>WET TRACTION (HIGHER BETTER) | 0.544 | 0.533 | 0.548 |
| TAN DELTA AT 30°C<br>ROLLING RESISTANCE (LOWER BETTER) | 0.207 | 0.195 | 0.200 |
| G', STORAGE MODULUS AT 30°C (Pa)<br>DRY HANDLING (HIGHER BETTER) | 2.00E+06 | 1.92E+06 | 1.94E+06 |
| J", LOSS COMPLIANCE AT 30°C (1/Pa)<br>DRY TRACTION (HIGHER BETTER) | 9.93E-08 | 9.80E-08 | 9.90E-08 |
| TAN DELTA AT 60°C<br>ROLLING RESISTANCE (LOWER BETTER) | 0.125 | 0.114 | 0.115 |
| G', STORAGE MODULUS AT 60°C (Pa)<br>DRY HANDLING (HIGHER BETTER) | 1.58E+06 | 1.53E+06 | 1.54E+06 |

FIG. 33

| DMA TIRE PERFORMANCE PREDICTORS - INDEXED TO 1 (N234) | | | | | |
|---|---|---|---|---|---|
| INDEXED SO HIGHER NUMBER EQUAL BETTER FORMANCE, PERFORMANCE INDICATORS WHERE LOWER NUMBERS = BETTER PERFORMANCE, FOR EXAMPLE ROLLING RESISTANCE WAS REVERSED | COMMENTS | GRAPH ID | 1 N234 TBBS 1.7 DPG 2.0 | 2 LF FIL TBBS 1.7 DPG 2.0 | 6 LF FIL TBBS 2.0 DPG 1.5 |
| G', STORAGE MODULUS AT -20C (Pa) WINTER TRACTION | REVERSED | WINTER TRACTION | 100 | 103 | 99 |
| TAN DELTA AT -10°C ICE TRACTION | AS IS | ICE TRACTION | 100 | 100 | 101 |
| TAN DELTA AT 0°C WET TRACTION | AS IS | WET TRACTION | 100 | 98 | 101 |
| TAN DELTA AT 30°C ROLLING RESISTANCE | REVERSED | FUEL ECONOMY 30C | 100 | 106 | 103 |
| G', STORAGE MODULUS AT 30°C (Pa) DRY HANDLING | AS IS | DRY HANDLING 30C | 100 | 96 | 97 |
| J", LOSS COMPLIANCE AT 30°C (1/Pa) DRY TRACTION | AS IS | DRY TRACTION | 100 | 99 | 100 |
| TAN DELTA AT 60°C ROLLING RESISTANCE | REVERSED | FUEL ECONOMY 60C | 100 | 109 | 108 |
| G", STORAGE MODULUS AT 60°C (Pa) DRY HANDLING | AS IS | DRY HANDLING 60C | 100 | 97 | 97 |
| TOTAL INDEX | | | 800 | 807 | 806 |
| AVERAGE INDEX | | | 100 | 101 | 101 |

CARBON AND ELASTOMER INTEGRATION

RELATED APPLICATIONS

The application claims the benefit of: 1) U.S. Provisional Patent Application No. 62/472,058 filed on Mar. 16, 2017, and entitled "Carbon and Elastomer Integration"; 2) U.S. Provisional Patent Application No. 62/581,533 filed on Nov. 3, 2017, and entitled "Carbon and Elastomer Integration"; and 3) U.S. Provisional Patent Application No. 62/630,179 filed on Feb. 13, 2018, and entitled "Carbon and Elastomer Integration"; all of which are hereby incorporated by reference for all purposes.

BACKGROUND

Rubber products, tires and seals are made by compounding or mixing fillers, such as carbon black and silica, into rubber, which is then vulcanized. The rubber products typically contain 20-30% by weight carbon black as a reinforcing filler, where the percentage and type of carbon black, the type of rubber used (e.g., natural, synthetic), and additional additive materials and chemicals are varied to customize the properties of the finished product. For vehicle tires, additional structural properties are introduced by embedding cords and by using different types of elastomer compounds in the tread, side wall and interior lining. Carbon black—also known in the industry as, for example, acetylene black and furnace black—is a type of amorphous carbon and is produced by combusting petroleum. A manufacturer, such as a tire manufacturer, typically receives its raw materials (e.g., rubber, carbon black, etc.) from different sources. Carbon black is a light and hard-to-handle material, which drives the tire industry to require the carbon to be densified, i.e. pelletized, so that it can be handled more easily. Pelletizing also facilitates mixing of the carbon black when added to the elastomer compound. In order to pelletize the carbon, additives are usually required, which contaminate the carbon.

SUMMARY

In some embodiments, a compound comprises an elastomer material, a filler material, at least one additive material, and at least one accelerant material. The filler material comprises a graphene-based carbon material. The graphene-based carbon material comprises graphene comprising up to 15 layers, carbon aggregates having a median size from 1 to 50 microns, a surface area of the carbon aggregates of at least 50 $m^2/g$, when measured via a Brunauer-Emmett-Teller (BET) method with nitrogen as the adsorbate, and no seed particles.

In some embodiments, the graphene-based carbon material is a nano-mixed graphene-based carbon material. In some embodiments, the graphene-based carbon material is a functionalized graphene-based carbon material.

In some embodiments, a G' storage modulus at −20° C. of the compound, as measured by ASTM D5992-96 (2011), is less than 9 MPa; a tan delta at −10° C. of the compound, as measured by ASTM D5992-96 (2011), is greater than 0.8; a tan delta at 0° C. of the compound, as measured by ASTM D5992-96 (2011), is greater than 0.5; a tan delta at 30° C. of the compound, as measured by ASTM D5992-96 (2011), is less than 0.25; a G' storage modulus at 30° C. of the compound, as measured by ASTM D5992-96 (2011), is greater than 1.5 MPa; a J" loss compliance at 30° C., as measured by ASTM D5992-96 (2011), is greater than 9E-8 1/Pa; a tan delta at 60° C. of the compound, as measured by ASTM D5992-96 (2011), is less than 0.15; and/or a G' storage modulus at 60° C. of the compound, as measured by ASTM D5992-96 (2011), is greater than 1.5 MPa.

In some embodiments, a method of producing an elastomer compound comprises providing a reactor, providing a hydrocarbon process gas into the reactor, performing hydrocarbon cracking of the hydrocarbon process gas in the reactor to produce a graphene-based carbon material, and mixing an elastomer material with at least one filler material, at least one additive material, and at least one accelerant material. The filler material comprises the graphene-based carbon material. The graphene-based carbon material comprises graphene having up to 15 layers, carbon aggregates having a median size from 1 to 50 microns, a surface area of the carbon aggregates of at least 50 $m^2/g$, when measured via a Brunauer-Emmett-Teller (BET) method with nitrogen as the adsorbate, and no seed particles.

In some embodiments of the methods, the reactor is a thermal reactor or a microwave reactor. In some embodiments, the graphene-based carbon material is a functionalized graphene-based carbon material or a nano-mixed graphene-based carbon material, and the hydrocarbon cracking in a reactor further comprises providing a second material into the reactor.

In some embodiments of the above methods, the hydrocarbon cracking process and the mixing an elastomer material with at least one filler material, at least one additive material, and at least one accelerant process are performed at the same site.

BRIEF DESCRIPTION OF THE DRAWINGS

FIG. 2 shows ASTM classifications of some carbon black materials from the prior art.

FIG. 3 shows a cross-section of a radial tire structure, with the circled components indicating areas where the present graphene-based carbon integrated materials can be used, in accordance with some embodiments.

FIG. 6 shows a table of the formulations of an elastomer compound containing graphene-based carbon materials compared to an elastomer compound containing conventional carbon black materials, in accordance with some embodiments.

FIGS. 7 and 8 show physical properties of an elastomer compound containing graphene-based carbon materials compared to an elastomer compound containing conventional carbon black materials, in accordance with some embodiments.

FIG. 9 shows a table of the formulations of an elastomer compound containing graphene-based carbon materials compared to an elastomer compound containing conventional carbon black materials, in accordance with some embodiments.

FIG. 10 shows a table of some of the key parameters measured during mixing of an elastomer compound containing graphene-based carbon materials compared to an elastomer compound containing conventional carbon black materials, in accordance with some embodiments.

FIG. 11 shows a table of physical properties of an elastomer compound containing graphene-based carbon materials compared to an elastomer compound containing conventional carbon black materials, in accordance with some embodiments.

FIG. 12 shows a table of physical properties after heat-aging of an elastomer compound containing graphene-based carbon materials compared to an elastomer compound containing conventional carbon black materials, in accordance with some embodiments.

FIG. 13 shows a table of dynamic viscoelastic properties of an elastomer compound containing graphene-based carbon materials compared to an elastomer compound containing conventional carbon black materials, in accordance with some embodiments.

FIG. 14 shows a table of dynamic viscoelastic properties of an elastomer compound containing graphene-based carbon materials normalized to an elastomer compound containing conventional carbon black materials, in accordance with some embodiments.

FIG. 16 shows a table of the formulations of elastomer compounds containing graphene-based carbon materials compared to an elastomer compound containing conventional carbon black materials, in accordance with some embodiments.

FIG. 17 shows a table of the mixing parameters and observations from the mixing for elastomer compounds containing graphene-based carbon materials compared to an elastomer compound containing conventional carbon black materials, in accordance with some embodiments.

FIG. 18 shows a table of some of the key parameters measured during mixing of elastomer compounds containing graphene-based carbon materials compared to an elastomer compound containing conventional carbon black materials, in accordance with some embodiments.

FIG. 19 shows a table of physical properties of elastomer compounds containing graphene-based carbon materials compared to an elastomer compound containing conventional carbon black materials, in accordance with some embodiments.

FIG. 20 shows a table of the formulations of an elastomer compound containing graphene-based carbon materials compared to elastomer compounds containing conventional carbon black materials, in accordance with some embodiments.

FIG. 21 shows a table of the mixing parameters and observations from the mixing for an elastomer compound containing graphene-based carbon materials compared to an elastomer compound containing conventional carbon black materials, in accordance with some embodiments.

FIG. 24 shows a table of physical properties of an elastomer compound containing graphene-based carbon materials compared to elastomer compounds containing conventional carbon black materials, in accordance with some embodiments.

FIG. 25 shows a table of dynamic viscoelastic properties of an elastomer compound containing graphene-based carbon materials compared to elastomer compounds containing conventional carbon black materials, in accordance with some embodiments.

FIG. 26 shows a table of dynamic viscoelastic properties of an elastomer compound containing graphene-based carbon materials and elastomer compounds containing conventional carbon black materials, normalized to an elastomer compound containing conventional carbon black materials, in accordance with some embodiments.

FIG. 28 shows a table of the formulations of elastomer compounds containing graphene-based carbon materials compared to an elastomer compound containing conventional carbon black materials, in accordance with some embodiments.

FIG. 31 shows a table of physical properties of elastomer compounds containing graphene-based carbon materials compared to an elastomer compound containing conventional carbon black materials, in accordance with some embodiments.

FIG. 32 shows a table of physical properties after heat-aging of elastomer compounds containing graphene-based carbon materials compared to an elastomer compound containing conventional carbon black materials, in accordance with some embodiments.

FIG. 33 shows a table of dynamic viscoelastic properties of elastomer compounds containing graphene-based carbon materials compared to an elastomer compound containing conventional carbon black materials, in accordance with some embodiments.

FIG. 34 shows a table of dynamic viscoelastic properties of elastomer compounds containing graphene-based carbon materials normalized to an elastomer compound containing conventional carbon black materials, in accordance with some embodiments.

DETAILED DESCRIPTION

Figure 1B:
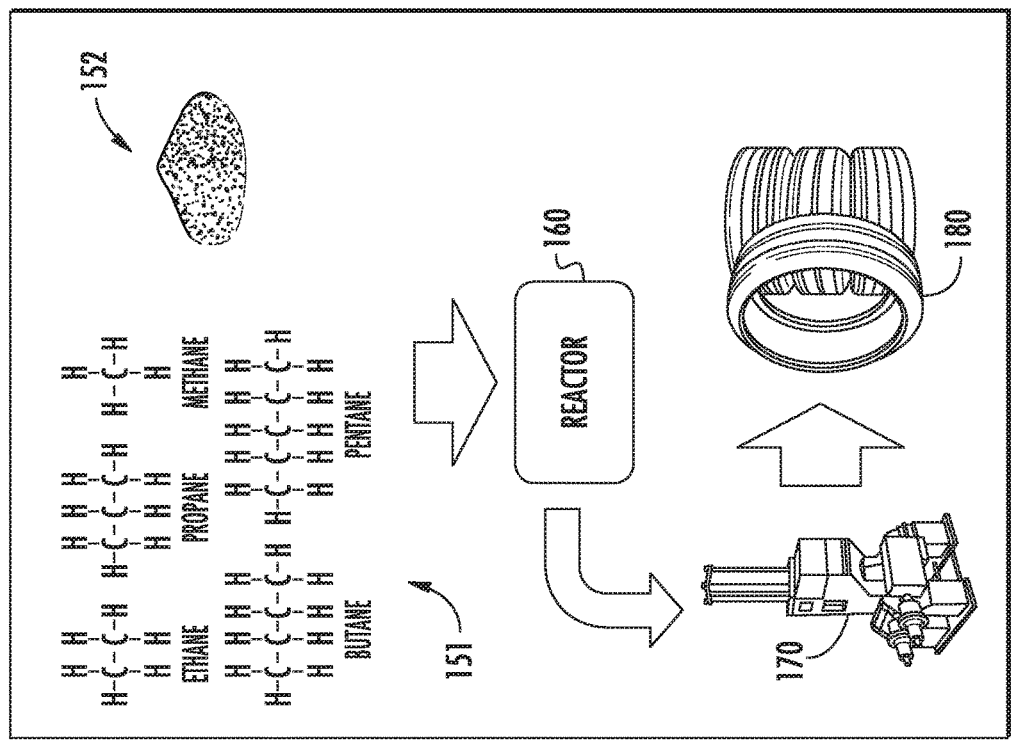
FIG. 1B shows an example simplified schematic of a carbon material production chain, in accordance with some embodiments.

Graphene-based carbon materials are described herein, which can be used as reinforcing fillers for elastomer compounds. In some embodiments, the graphene-based carbon materials include other materials, either by attaching the other materials species (e.g., atoms or compounds) to the surfaces of the carbon materials, or by intimate mixing of the other materials with the carbon materials. The processing conditions of the graphene-based carbon materials, and optionally the composition of the other materials included in the particles, can change the properties of the present carbon materials. The present carbon materials enable tuning of the properties of reinforced elastomers, since the properties of the present carbon materials can influence the processing and/or properties of elastomers containing these materials.

The ability to integrate rubber (both natural and synthetic rubber) with various materials (e.g., silica, carbon black, sulfur, etc.) in industrial mixers of conventional mixing technology is limited. This conventional macro-mixing technology uses various chemicals to bind materials together, such as using silane to bind the silica/carbon to the elastomer. Additionally, the transportation of carbon black materials can be costly.

In contrast, the present materials and methods, in some embodiments, involve direct incorporation of graphene-based carbon materials into the production of elastomers, without needing the carbon materials to be altered. For example, the present materials do not need to be pelletized or compressed in order to densify the material for transportation, although they can be in some embodiments. The present graphene-based carbon materials have properties that enable them to be used as substitutes for conventional carbon blacks in making elastomer compounds, such as rubber materials for dynamic and static systems. In some embodiments, the graphene-based carbon materials are produced in a reactor with or without the addition of various materials (e.g., silicon, hydrogen gas, ammonia, hydrogen sulfide, metals, halogens), and integrated into an elastomer formulation. In some embodiments, the graphene-based carbon materials are produced by hydrocarbon cracking in the reactor, where embodiments include thermal reactors and microwave plasma reactors. Because these types of reactors are typically individual units that are much smaller than a carbon black manufacturing plant, the embodiments enable on-site carbon material production. Thus, in some embodiments, the graphene-based carbon material is produced at the same site where it is to be used, e.g., at an elastomer production facility.

On-site mixing alleviates the need for transporting the carbon raw materials to an elastomer production site, which consequently eliminates the need to pelletize the carbon for the said purpose of transportation. Since the carbon does not need to be pelletized, there is no need to use additives to form the carbon pellets. As shall be described herein, the present materials can be tailored to provide desired physical properties of the finished elastomer. There are also environmental advantages of not pelletizing the carbon, such as reducing the amount of water and energy required in the carbon production processes.

Figure 1A:
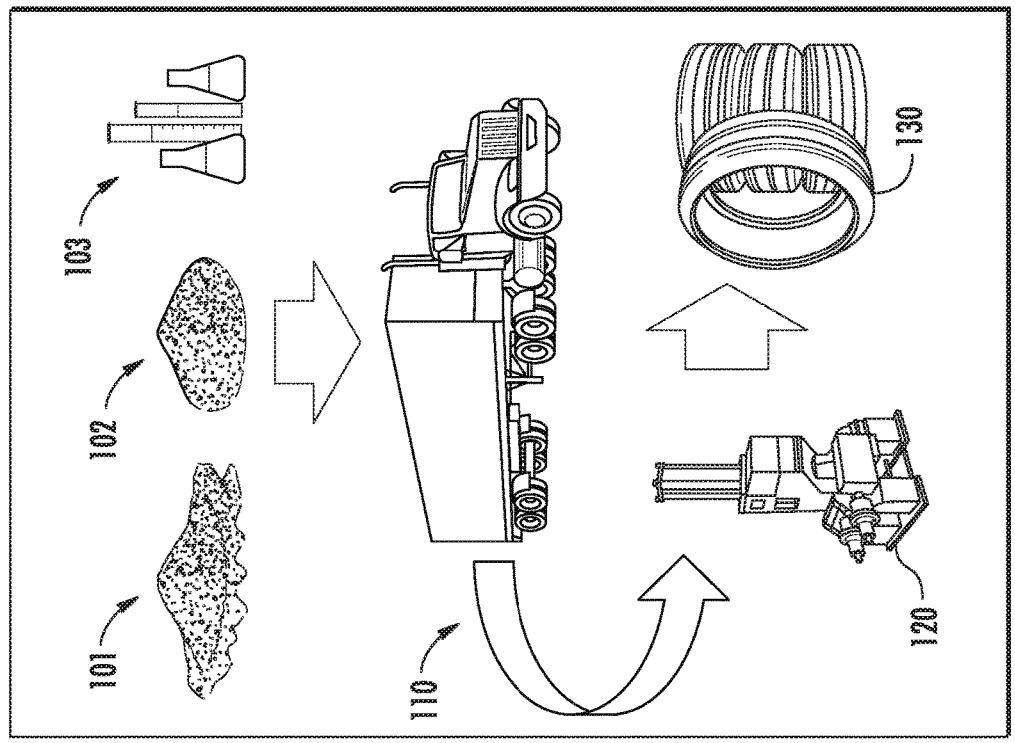
FIG. 1A shows a simplified schematic of a conventional carbon material production chain.

FIG. 1A shows a simplified schematic of a conventional carbon material production chain, in comparison to FIG. 1B, which is an example of a carbon material production chain of the present embodiments. In conventional technology, as illustrated in FIG. 1A, raw materials such as carbon black 101, silica 102, and other chemicals 103 are transported 110 to a manufacturing facility 120 where they are formulated into an elastomer compound and then processed into a finished product, such as tires 130. A conventional tire supply includes the preparation of raw materials (e.g., rubber bales, carbon filler, textiles, steel and other additives), building the tire components (including extruding elastomer compounds for the tread and sidewalls), and then building the tire 130 (including curing the tire, and inspecting the finished tire). In some embodiments of the present materials and methods as illustrated in FIG. 1B, the carbon particle production, the mixing of the elastomer compounds, and optionally building the finished product (e.g., automobile tires), can be done on-site. In some embodiments, nano-mixing of materials is also performed on-site. In the specific example shown in FIG. 1B, hydrocarbons 151 and silica 152 are mixed (i.e., integrated together) on-site in a reactor 160 at a manufacturing facility 170, then integrated with elastomer raw materials (e.g, rubber) to produce an elastomer compound, and then processed into a finished product such as tires 180. The differentiation between FIGS. 1A and 1B exemplifies some possible benefits of the present technology described above, such as eliminating the need for transporting the difficult to handle carbon black materials and reducing energy consumption by integrating materials together during the carbon production process. In other embodiments, the conventional supply chain shown in FIG. 1A can be used in conjunction with the present graphene-based carbon materials. In such embodiments, the carbon materials are produced at one site, and then the carbon materials and other component materials are transported to a manufacturing facility where they are formulated into an elastomer compound and then processed into a finished product, such as tires.

Another benefit of using the present graphene-based carbon materials is the improved purity compared to carbon black. In some cases, the impurities in carbon black (e.g., residual oil) require the carbon to be labeled as carcinogenic. In some embodiments, the present graphene-based carbon materials have lower volatile organic compounds (VOCs) than carbon black, and do not result in residual oil on the surface of the produced elastomer material. In other cases, the present graphene-based carbon materials have a lower concentration of residual hydrocarbons (e.g., polycyclic aromatic hydrocarbons) compared to carbon black, resulting in less residual oil on the surface of the produced elastomer material. The carbon materials described herein also contain low concentrations of contaminants (e.g., ash, metals, and other elemental contaminants) compared to conventionally processed carbon black or graphene. Also, there are minimal $CO_2$, $NO_x$, and $SO_x$, emissions as production by-products. All these benefits result in the present carbon materials being safer to handle and more environmentally friendly than the conventional carbon black that is used for elastomers.

The reduced concentration of impurities of the present graphene-based carbon materials compared to carbon black is also a benefit for processing the carbon materials (e.g., carbon post-processes, and elastomer compounding). For example, conventional carbon black processing equipment can require specialized systems to process the toxic carbon black particles. In contrast, specialized systems are not needed to process the present non-toxic or low toxicity materials. In some cases, conventional carbon black will contaminate processing equipment, and therefore is unable to be processed by some facilities. In some embodiments, the present materials with lower concentrations of impurities would not be restricted from being processed by uncontaminated processing equipment.

Graphene-Based Carbon Materials

There are three properties that affect the ability of a particular carbon material to reinforce elastomers: surface area, structure, and surface activity. In addition, impurities, such as coke, ash and moisture can be important to the effectiveness of a carbon material filler in an elastomer. Surface area refers to the total area of the carbon material surface, including that which is available to interact with the elastomer. Particle size and shape can affect the surface area. Smaller carbon particles (e.g., less than 100 nm in average diameter) typically fuse together to form larger aggregates (e.g., 1-10 microns average diameter). Structure describes the shape of the aggregate. The structure can be affected by the number of particles fused together and the configuration of the particles within the aggregate. For example, aggregates with larger numbers of particles can have complex shapes with large void volumes created. The structure can affect the degree of mixing of the carbon and the polymer (e.g., voids can be filled with the polymer), which can affect the properties of the elastomer/carbon compound. Surface activity refers to the strength of the surface interaction between the carbon filler material and the polymer. Surface activity can impact the dispersion properties of the carbon materials within the elastomer. Compound mechanical properties such as tensile strength, tear strength, and abrasion resistance can be affected by surface area of the carbon filler material. Other compound mechanical properties such as viscosity, shrinkage, and modulus can be affected by the structure of the carbon filler material. Surface area also can affect some compound mechanical properties such as hysteresis. Structure can also affect flex fatigue and abrasion resistance in reinforced elastomeric compounds. Surface activity can affect compound mechanical properties as well, such as modulus, hysteresis, and abrasion resistance.

Several tests can be used to measure the surface area and the structure of carbon black. The most common measurements are iodine adsorption (e.g., using ASTM D1510) and oil absorption (e.g., using ASTM 2414, Method B). The resulting metrics are the iodine absorption number, which is a measure of the surface area of the carbon material, and the dibutyl phthalate absorption (DBP) number, which is a measure of the structure of the carbon material.

FIG. 2 shows ASTM classifications of some conventional carbon black materials with properties that are in the range of some of the graphene-based materials described herein. As described below (and throughout this disclosure), the materials incorporated into, and the processing conditions of, the present graphene-based carbon materials can be changed to tune the physical properties of the particles produced. In some embodiments, the graphene-based materials described herein have an iodine adsorption number from 20 to 160, and oil absorption numbers from 50 to 180. For example, a graphene-based material described herein has an iodine adsorption number of 110 and an oil absorption number of 92, which is a similar surface area and structure as conventional N125, N219 and N299 (values listed in FIG. 2). For another example, a graphene-based material described herein has an iodine adsorption number of 46 and an oil absorption number of 75, which is a similar surface area and structure as conventional N660, N762, N772 and N774 (FIG. 2). These results suggest that the graphene-based carbon materials described herein can be suitable replacements for several grades of conventional carbon black.

There are a number of methods and materials that can be used to tune the surface area, structure, and surface activity of the carbon materials described herein (e.g., the graphene-based carbon materials).

In some embodiments, the surface area, structure, and surface activity of the carbon materials described herein are tuned by functionalizing the carbon materials. Functionalization of the carbon materials refers to adding elements, functional groups, or molecules to the carbon materials. In some embodiments, the elements, functional groups, or molecules are covalently bonded to the carbon atoms in the carbon material. In some embodiments, the elements, functional groups, or molecules are physically adsorbed into the carbon porosity of the carbon particles and/or aggregates. The functionalization reactions can occur in situ (i.e., as the carbon materials are being produced via hydrocarbon cracking in the reactor), or can occur in one or more post-processing steps, or can occur in a combination of in situ and post-processing steps. Elastomeric compounds that incorporate functionalized carbon materials described herein can benefit from a faster rate of cure, improved elastic moduli, improved abrasion resistance and improved electrical conductivity.

In some embodiments, the surface area, structure, and surface activity of the carbon materials described herein are tuned by nano-mixing the carbon particles within the carbon materials with particles of other materials. In some embodiments, particles of nano-mix additive materials can be beneficially integrated with the particles of the graphene-based carbon on a particle level, which shall be referred to as nano-mixing in this disclosure. The average diameter of the particles of the nano-mix additive material and the graphene-based carbon materials in the nano-mixture can be from 1 nm to 1 micron, or from 1 nm to 500 nm, or from 1 nm to 100 nm, or can be as small as 0.1 nm. In some embodiments, the nano-mix additive material and the graphene-based carbon material are chemically bound, or are physically bound, together in the nano-mixture. The nano-mixing involves introducing nano-mix additives during the hydrocarbon cracking process such that the nano-mix additive material is integrated into the graphene-based carbon material as the carbon material is produced, rather than combining a carbon raw material with an additive in a later process as in conventional methods (e.g., the macro-mixing mentioned above). For example, the resulting nano-mixed carbon materials of the present embodiments can contain particles of silica, ZnO, and/or metals. The nano-mix additive material can be introduced into the reactor as a gas, liquid, or colloidal dispersion. As an example, silica or silicon can be input into the reactor along with a hydrocarbon process gas (or other carbon-containing process material such as a liquid alcohol) to produce silica in combination with carbon materials and/or silicon wrapped in or coated with graphene, graphene-based carbon materials, and/or other carbon allotropes.

In some embodiments, an elastomer compound comprises an elastomer material and a filler material, the filler material containing a graphene-based carbon material, and silica. In some embodiments, the majority of the filler material is either graphene-based carbon material or silica. In some embodiments, the ratio of silica to the graphene-based carbon material in the elastomer compound is from 10:1 to 1:1, or from 20:1 to 1:1, or from 100:1 to 1:1. Examples of nano-mixed materials in such embodiments include solid inorganic materials coated in organic materials (e.g., silicon coated with graphene), and composite materials with interlayers of organic/inorganic materials (e.g., a silica or silicon core with a layer of carbon encapsulating the silicon, coated with an additional inorganic layer). By introducing the nano-mix additives during the hydrocarbon cracking process, the materials are integrated at a nano-scale, rather than needing coupling agents to bond silica and carbon together. The present nano-mixed carbon materials enable reduced energy consumption for production of rubber or other elastomers. Less energy is needed for mixing materials, since some materials are integrated together. In some embodiments, the carbon particles and the nano-mix additive particles in a nano-mixed carbon material have average diameters of less than 1 micron, or less than 100 nm, or less than 10 nm. Elastomeric compounds that incorporate nano-mixed carbon materials described herein can benefit from a faster rate of cure, improved elastic moduli, improved abrasion resistance and improved electrical conductivity.

In some embodiments, particulate, liquid and/or gaseous materials can be input into the reactor along with a hydrocarbon process gas (or other carbon-containing process material such as a liquid alcohol) to produce carbon materials that are nano-mixed with other materials and/or functionalized carbon materials. The produced mixed carbon and/or functionalized carbon materials can contain graphene-based carbon materials and/or other carbon allotropes, in different embodiments.

For example, by incorporating and/or by adding liquids or gases containing S, liquids or gases containing Si, hydrogen, hydrogen sulfide, silane gas, and/or ammonia gas or liquid into the reactor along with a hydrocarbon process gas, the reactor system can produce functionalized carbon materials with H, S, Si and/or N incorporated into the carbon materials. Elastomeric compounds that incorporate the functionalized carbon materials described herein (e.g., with improved structures, and including H, S and/or N) can benefit from a faster rate of cure, improved elastic moduli, improved abrasion resistance and improved electrical conductivity. The incorporation of liquids or gases containing S, liquids or gases containing Si, $H_2$ gas, $H_2S$ gas, silane gas, and/or ammonia gas or liquid during the hydrocarbon cracking carbon particle formation process can create carbon particles with improved surface area, structure, and/or surface activity.

In another example, adding aromatic compounds into the reactor along with a hydrocarbon process gas can produce functionalized carbon materials with the aromatic compounds incorporated into the carbon materials. Some examples of aromatic compounds are compounds including benzene rings, pyridine rings, furan rings, thiophene rings, and/or pyrrole rings, such as benzene and derivatives of benzene, naphthalene, and azulene. In some embodiments, the aromatic compounds can break down, decompose, and/or crack or partially crack during the hydrocarbon cracking carbon particle formation process, forming reaction products. In some cases, these reaction products can functionalize, or nano-mix with the carbon materials being formed. For example, the aromatic compounds can form other hydrocarbons with high boiling points, and these high boiling point hydrocarbons can condense on the particle surfaces, affecting the surface activity. In another example, these reaction products can become bound to the carbon surfaces while the particles and aggregates are being formed, which can affect the surface area, structure and the surface activity of the resulting functionalized carbon materials. The incorporation of aromatic compounds during the hydrocarbon cracking carbon particle formation process can create carbon particles with improved surface area, structures and/or surface activity.

In another example, adding one or more oils into the reactor along with a hydrocarbon process gas can produce functionalized carbon materials with the oil incorporated into the carbon materials. Similar to the example in the preceding paragraph, the oil can partially or fully crack and the products can be incorporated in and/or can condense on the surface of the produced carbon materials.

In another example, adding metals, such as particles, gases or liquids containing S, Si, Na, K, B, Cr, Ca, Sr, Mg, Zn, Ga, Rb, Cs, B, Mn, alkali metals and other metals, into the reactor along with a hydrocarbon process gas can produce functionalized and/or nano-mixed carbon materials with the metals incorporated into the carbon materials. The incorporation of metals during the hydrocarbon cracking carbon particle formation process can create carbon particles with improved surface area, structures and/or surface activity. In some embodiments, alkali metals can be incorporated into the functionalized graphene-based carbon materials and the alkali metals functions as a coupling agent to improve the adhesion between the carbon materials and the elastomer materials in a compound.

In another example, adding halogens, such as particles, gases or liquids containing F, Cl, Br, I, and other halogens, into the reactor along with a hydrocarbon process gas can produce functionalized carbon materials with the halogens incorporated into the carbon materials. The incorporation of halogens during the hydrocarbon cracking carbon particle formation process can create carbon particles with improved surface area, structures and/or surface activity.

In another example, adding particles, such as oxides (e.g., silica, zinc oxide, titanium dioxide) or metals, into the reactor along with a hydrocarbon process gas can produce nano-mixed carbon materials with the particles of the nano-mix additive and the particles of the carbon materials forming aggregates together. The incorporation of nano-mix additive particles during the hydrocarbon cracking carbon particle formation process can create nano-mixed carbon particles with improved surface area, structures and/or surface activity.

In another example, adding oxygen-containing reactants or oxidizing reactants into the reactor along with a hydrocarbon process gas can produce functionalized carbon materials with oxygen incorporated into the carbon materials. Some examples of oxygen-containing or oxidizing reactants are ozone, hydrogen peroxide, potassium hydroxide, potassium chloride, hydrochloric acid, nitric acid, chromic acid, permanganates and diazonium salts. The oxygen-containing or oxidizing materials can be added to the reactor in concentrations of the reactive species in the oxygen-containing or oxidizing materials (e.g., O, K, Cl, etc.) to the carbon in the hydrocarbon process gas from 5 ppm to 100 ppm, or 5 ppm to 30 ppm, or greater than 5 ppm, or greater than 15 ppm. The incorporation of oxygen-containing reactants or oxidizing reactants during the hydrocarbon cracking carbon particle formation process can create carbon particles with improved surface area, structures and/or surface activity. Oxidized carbon materials tend to slow the cure time of a reinforced elastomer. Therefore, incorporating oxidized carbon materials into a reinforced elastomer compound can enable the tuning of the cure time, which can improve the resulting mechanical properties of the cured compound.

In some embodiments, the carbon materials described herein (e.g., graphene-based carbon materials) contain engineered surfaces, such as preferentially exposed crystal planes, graphitic edges, and/or crystallite edges. In some embodiments, these engineered surfaces are the result of the particle synthesis conditions within the reactor, additives into the reactor that functionalize and/or nano-mix with the particles during formation, or post-processing.

In some embodiments, the carbon materials used in the filler material are described in U.S. patent application Ser. No. 15/711,620, entitled "Seedless Particles with Carbon Allotropes," which is assigned to the same assignee as the present application, and is incorporated herein by reference as if fully set forth herein for all purposes. In some embodiments, the compounds contain graphene-based carbon materials that comprise a plurality of carbon aggregates, each carbon aggregate having a plurality of carbon nanoparticles, each carbon nanoparticle including graphene, with no seed (i.e., nucleation or core) particles. The graphene in the graphene-based carbon material has up to 15 layers. A percentage of carbon to other elements, except hydrogen, in the carbon aggregates is greater than 99%. A median size of the carbon aggregates is from 1 to 50 microns. A surface area of the carbon aggregates is at least 50 m$^2$/g, when measured using a Brunauer-Emmett-Teller (BET) method with nitrogen as the adsorbate. The carbon aggregates, when compressed, have an electrical conductivity greater than 500 S/m, such as up to 20,000 S/m, or up to 90,000 S/m.

In some embodiments, compounds contain graphene-based carbon materials that comprise a plurality of carbon aggregates, each carbon aggregate having a plurality of carbon nanoparticles, each carbon nanoparticle including graphene and multi-walled spherical fullerenes, with no seed particles. The graphene in the graphene-based carbon material has up to 15 layers. A Raman spectrum of the graphene-based carbon material comprising the multi-walled spherical fullerenes, using 532 nm incident light, has: a D-mode peak, a G-mode peak, and a D/G intensity ratio less than 1.2. A percentage of carbon to other elements, except hydrogen, in the carbon aggregates is greater than 99%. A median size of the carbon aggregates is from 1 to 100 microns. A surface area of the carbon aggregates is at least 10 m$^2$/g, when measured using a BET method with nitrogen as the adsorbate. The carbon aggregates, when compressed, have an electrical conductivity greater than 500 S/m, such as up to 20,000 S/m, or up to 90,000 S/m.

In some embodiments, compounds contain graphene-based carbon materials that comprise a plurality of carbon aggregates, each carbon aggregate having a plurality of carbon nanoparticles, each carbon nanoparticle including a mixture of graphene and at least one other carbon allotrope, with no seed (i.e., nucleation or core) particles. The graphene in the graphene-based carbon material has up to 15 layers. A percentage of carbon to other elements, except hydrogen, in the carbon aggregates is greater than 99%. A median size of the carbon aggregates is from 1 to 100 microns. A surface area of the carbon aggregates is at least 10 m$^2$/g, when measured using a BET method with nitrogen as the adsorbate. The carbon aggregates, when compressed, have an electrical conductivity greater than 100 S/m, or greater than 500 S/m, such as up to 20,000 S/m, or up to 90,000 S/m.

In some embodiments, the carbon materials used in the filler material are produced using microwave plasma reactors and methods, such as any appropriate microwave reactor and/or method described in U.S. Pat. No. 9,812,295, entitled "Microwave Chemical Processing," or in U.S. Pat. No. 9,767,992, entitled "Microwave Chemical Processing Reactor," which are assigned to the same assignee as the present application, and are incorporated herein by reference as if fully set forth herein for all purposes.

In some embodiments, the carbon materials used in the filler material are described in U.S. Pat. No. 9,862,606 entitled "Carbon Allotropes," which is assigned to the same assignee as the present application, and is incorporated herein by reference as if fully set forth herein for all purposes.

In some embodiments, the carbon materials used in the filler material are produced using thermal cracking apparatuses and methods, such as any appropriate thermal apparatus and/or method described in U.S. Pat. No. 9,862,602, entitled "Cracking of a Process Gas," which is assigned to the same assignee as the present application, and is incorporated herein by reference as if fully set forth herein for all purposes.

In some embodiments, the carbon material used in the filler has a ratio of carbon to other elements, except hydrogen, greater than 99%, or greater than 99.5%, or greater than 99.7%, or greater than 99.9%, or greater than 99.95%.

In some embodiments, the surface area of the carbon material used in the filler, when measured using the Brunauer-Emmett-Teller (BET) method with nitrogen as the adsorbate (i.e., the "BET method using nitrogen", or the "nitrogen BET method") or the Density Functional Theory (DFT) method, is from 50 to 1500 m$^2$/g, or from 50 to 1000 m$^2$/g, or from 50 to 550 m$^2$/g, or from 50 to 450 m$^2$/g, or is from 50 to 300 m$^2$/g, or from 100 to 300 m$^2$/g, or from 50 to 200 m$^2$/g, or from 50 to 150 m$^2$/g, or from 60 to 110 m$^2$/g, or from 50 to 100 m$^2$/g, or from 70 to 100 m$^2$/g.

In some embodiments, the carbon materials used in the filler, when compressed (e.g., into a disk, pellet, etc.), and optionally annealed, have an electrical conductivity greater than 500 S/m, or greater than 1000 S/m, or greater than 2000 S/m, or from 500 S/m to 20,000 S/m, or from 500 S/m to 10,000 S/m, or from 500 S/m to 5000 S/m, or from 500 S/m to 4000 S/m, or from 500 S/m to 3000 S/m, or from 2000 S/m to 5000 S/m, or from 2000 S/m to 4000 S/m, or from 1000 S/m to 5000 S/m, or from 1000 S/m to 3000 S/m.

In some embodiments, the carbon materials used in the filler, when compressed (e.g., into a disk, pellet, etc.), and optionally annealed, have thermal conductivity from 10 W/(m*K) to 5000 W/(m*K), or from 10 W/(m*K) to 1500 W/(m*K), or from 10 W/(m*K) to 100 W/(m*K), or from 1 W/(m*K) to 1000 W/(m*K).

The surface area, structure and/or surface activity of the carbon materials described herein (e.g., graphene-based carbon materials with or without functionalization and/or nano-mixing) can be tuned by changing the parameters during the carbon particle production. For example, the input materials (i.e., reactants) to the reactor can affect the surface area, structure and/or surface activity of the produced carbon materials. Some examples of input materials are gaseous hydrocarbons such as methane, and liquid alcohols such as isopropyl alcohol. In another example, the residence time within the reactor can affect the allotropes of carbon formed as well as the size of the particles and the size and the shape (i.e., structure) of the aggregates formed. In some embodiments, the residence time is affected by the flow rate of the input materials into the reactor. Some other examples of process parameters that can affect the surface area of the carbon material are reaction temperature, gas velocity, and reactor pressure. Additionally, the flow dynamics (i.e., laminar flow or turbulent flow) within the reactor can affect the produced carbon materials structures. The patents and patent applications incorporated by reference above provide examples of carbon materials (e.g., graphene-based carbon materials) with desirable surface areas and structures, and systems and methods for producing the present graphene-based carbon materials.

Returning to FIG. 2, this figure shows a partial list of conventional carbon materials, and some properties characterizing these materials according to ASTM standards. The properties of the graphene-based carbon materials described herein can be tuned such that they can be direct replacements for all grades of ASTM carbon classifications for tires, including but not limited to the grades shown in FIG. 2. More specifically, the graphene-based carbon materials (including the functionalized and the nano-mixed carbon materials) described herein can be tuned such that they can be direct replacements for N339 through N110 ASTM carbon classifications for tires. For example, in the case of graphene-based carbon materials produced using microwave reactors, the microwave processing parameters can be changed to affect which carbon allotropes form, and the production rate of each, which will affect the properties of the graphene-based carbon materials and the properties of the compounds incorporating those materials. Some non-limiting examples of microwave processing parameters that can be changed to affect the properties of the graphene-based carbon materials produced are precursor material flow rate, microwave parameters (e.g., energy, power, pulse rate), chamber geometry, reaction temperature, the presence of a filament, and the precursor and supply gas species utilized. In addition to being direct replacements for carbon materials in tires, the graphene-based carbon materials described herein can be direct replacements for carbon fillers in other elastomeric compounds as well.

In some embodiments, the species that are added into the reactor to functionalize or nano-mix with the carbon particles being produced are input into the reactor in the zone where the carbon particles and/or aggregates are being formed, or are input into the reactor downstream from the zone where the carbon particles and/or aggregates are being formed. For example, a functionalizing gas, such as $H_2S$, can be input into the reactor zone where the carbon particles and/or aggregates are being formed, and the constituents of the functionalizing gas, such as S, are incorporated into the carbon particle as they are being formed. In that case, the functionalizing gas can affect the surface area, structure and surface activity of the carbon particles, by being incorporated into each graphitic layer as the carbon particles are forming. In another example, a functionalizing gas, such as ozone, can be input into the reactor zone downstream from where the carbon particles and/or aggregates are being formed. In that case, the functionalizing gas can affect the surface area, structure and surface activity of the carbon particles, by affecting the carbon particles and/or agglomerates after they are formed. In the case of ozone, this can be accomplished by etching and/or pitting the surface of the formed carbon particles and/or aggregates, thereby increasing their surface area.

In some embodiments, the carbon materials used in the filler material are produced using reactors with multiple reactor chambers. In some embodiments, one or more of the reactor chambers is a thermal reactor chamber and one or more of the chambers is a microwave plasma reactor chamber. In different embodiments, the multiple reactor chambers can be configured in parallel with one another, in series with one another, or in a combination of parallel and series with one another. In some embodiments, one of the chambers is configured to form graphene-based carbon particles with particular properties, those particles are transferred to a second chamber, and the second chamber is configured to form graphene-based carbon materials on and/or around the particles with different properties. In other embodiments, a first chamber is configured to form graphene-based carbon particles with particular properties, and a second chamber is configured to form graphene-based carbon particles with different properties, and the outlets of the two chambers are connected (e.g., in a "T" connection) such that the first set of particles and the second set of particles are formed separately and then subsequently mixed together after formation.

In some embodiments, the carbon materials used in the filler material are produced using reactors with multiple reactor chambers, and one of the chambers is used to process a nano-mix additive material (e.g., to form nano-mix additive particles from input process gases or liquids). The processed nano-mix additive material can then be transferred to a subsequent chamber where a process material (e.g., a hydrocarbon gas) is cracked to form nano-mixed graphene-based carbon materials.

In some embodiments, the carbon materials used in the filler material are produced using reactors with multiple reactor chambers, and one or more reactor chambers are used to functionalize the graphene-based carbon materials, the nano-mix additive materials, and/or the nano-mix graphene-based carbon materials. For example, a reactor can contain three chambers. The first chamber in this example can form nano-mix material particles (e.g., forming silica particles by cracking silane gas). The second chamber in this example can functionalize the nano-mix material particles (e.g., by adding a coupling agent molecule onto the silica particles). The third chamber in this example can form graphene-based carbon nano-mixed with the functionalized silica particles (e.g., by cracking a hydrocarbon process gas). For another example, a fourth chamber can be added to the three-chamber system in the previous example, where the fourth chamber additionally functionalizes the nano-mixed graphene-based carbon materials (e.g., by adding a second coupling agent molecule to the exposed graphene-based carbon surfaces of the nano-mixed particles).

The surface area, structure and surface activity of the carbon materials and/or aggregates described herein can also be tuned using post-processing. In some embodiments, the functionalization or mixing of the carbon materials (e.g., graphene-based carbon materials) with other species is done using post-processing, rather than processes within the reactor. In some embodiments, the carbon materials and/or aggregates (e.g., containing graphene) described herein are produced and collected, and no post-processing is done. In other embodiments, the carbon materials and/or aggregates described herein are produced and collected, and some post-processing is done. Some examples of post-processing include mechanical processing, such as ball milling, grinding, attrition milling, micro-fluidizing, jet milling, and other techniques to reduce the particle size without damaging the carbon allotropes contained within. Some examples of post-processing include exfoliation processes such as shear mixing, chemical etching, oxidizing (e.g., Hummer method), thermal annealing, doping by adding elements during annealing (e.g., S, and N), steaming, filtering, and lypolizing, among others. Some examples of post-processing include sintering processes such as SPS (Spark Plasma Sintering, i.e., Direct Current Sintering), Microwave, and UV (Ultra-Violet), which can be conducted at high pressure and temperature in an inert gas. In some embodiments, multiple post-processing methods can be used together or in series. In some embodiments, the post-processing will produce functionalized carbon nanoparticles or aggregates described herein.

In some embodiments, the surface area of the carbon aggregates after post-processing (e.g., by mechanical grinding, milling, or exfoliating), when measured using the nitrogen Brunauer-Emmett-Teller (BET) (i.e., the BET method with nitrogen as the adsorbate) or the Density Functional Theory (DFT) method, is from 50 to 1500 m$^2$/g, or from 50 to 1000 m$^2$/g, or from 50 to 550 m$^2$/g, or from 50 to 450 m$^2$/g, or from 50 to 300 m$^2$/g, or from 100 to 300 m$^2$/g, or from 50 to 200 m$^2$/g, or from 50 to 150 m$^2$/g, or from 60 to 110 m$^2$/g, or from 50 to 100 m$^2$/g, or from 70 to 100 m$^2$/g.

In some embodiments, the carbon materials and/or aggregates described herein are produced and collected, and subsequently additional elements or compounds are added, thereby changing the surface area, structure and/or surface activity. For example, sulfur can be added in a post-process to increase the surface area of the carbon materials and/or aggregates by forcing the carbon layers to separate. For example, adding sulfur can increase the surface area by 2 or 3 times compared with the material without sulfur. Another method to increase the surface area is through oxidation post-processes. The methods described herein, e.g., using sulfur, can produce particles with high surface areas that are conductive.

In some embodiments, the surface area of the carbon materials and/or aggregates after subsequent processing that adds additional elements (e.g., sulfur), when measured using the nitrogen Brunauer-Emmett-Teller (BET) or the Density Functional Theory (DFT) method, is from 50 to 1500 m$^2$/g, or from 50 to 1000 m$^2$/g, or from 50 to 550 m$^2$/g, or from 50 to 450 m$^2$/g, 50 to 300 m$^2$/g, or from 100 to 300 m$^2$/g, or from 50 to 200 m$^2$/g, or from 50 to 150 m$^2$/g, or from 60 to 110 m$^2$/g, or from 50 to 100 m$^2$/g, or from 70 to 100 m$^2$/g.

Elastomers Containing Graphene-Based Carbon Materials

Although embodiments shall be described for applications in tire manufacturing, the embodiments can be utilized in any manufacturing process relating to or associated with production of elastomer compounds. Embodiments include elastomer compounds that are made of an elastomer raw material (or an elastomer material) and a filler material, where the filler material includes carbon materials (e.g., the graphene-based carbon materials, carbon black, etc.), silica, and other reinforcing filler materials. In some embodiments, a graphene-based carbon material makes up a majority of the filler material. Some examples of elastomeric materials are synthetic rubber, natural rubber, styrene-butadiene rubber (SBR), Standard Malaysia Rubber Grade L (SMRL), nitrile rubber, silicone rubber, and fluoroelastomers. The graphene-based carbon material comprises graphene, such as at least 5% graphene, or at least 10% graphene. In some embodiments, the graphene-based carbon material contains graphene and at least one carbon allotrope other than the graphene, and the ratio of the graphene to the carbon allotrope other than graphene is from 1:100 to 10:1, 1:20 to 10:1, or from 1:10 to 10:1. In some embodiments, the additional carbon allotrope is amorphous carbon, carbon black, multi-walled spherical fullerenes, carbon nanotubes, or graphite. In some embodiments, the graphene-based carbon material comprises graphene, such as at least 5% graphene, or at least 10% graphene, and may also include multi-walled spherical fullerenes. The graphene-based carbon material is a replacement for conventional carbon black, such that the filler materials of the present embodiments contain less carbon black than conventional elastomer compounds. For example, less than 10% of the filler material can be carbon black. Embodiments also include methods of producing an elastomer compound, where hydrocarbon cracking is performed in a reactor to produce a graphene-based carbon material. In some embodiments, the graphene-based material contains graphene, and/or multi-walled spherical fullerenes, and/or amorphous carbon. An elastomer raw material (or an elastomer material) is mixed with a filler material, where the graphene-based carbon material is a majority of the filler material for the elastomer compound.

In some embodiments, more than one type of filler material is included in an elastomer compound. For example, a carbon filler material and a non-carbon filler material (e.g., silica) can be mixed into an elastomer compound. For another example, more than one type of carbon filler material can be used, such as more than one type of the present graphene-based carbon materials, and the present graphene-based carbon materials mixed with conventional carbon black. In some embodiments, it is advantageous to mix more than one type of filler material to gain the benefits of each type of filler material. For example, a filler material that has a high structure (e.g., as measured by DBP Number) can shorten the cure time of the compound, and a filler material with a high surface area can improve the tear strength of the compound.

In some embodiments, the percentage of graphene of the present graphene-based carbon materials can be at least 5%, or at least 10%, or at least 20%, or up to 100% graphene.

In some embodiments, elastomer formulations contain an elastomer and a filler material containing a carbon material. The elastomer formulations can include a viscosity modifier or a sulfur cross-linker. Additionally, other additives can be included in the elastomer compound. Some non-limiting examples of other additives that can be added to elastomers are TDAE oil, zinc oxide, stearic acid, antioxidants or antiozonants such as 6PPD, a wax material such as Nochek® 4729A wax, TMQ, and sulfur. Additionally, elastomer often include accelerators (e.g., TBBS, also known as N-tert-butyl-2-benzothiazyl sulfonamide or N-tert-butyl-benzothiazole sulfonamide), which promote the formation of the elastomeric compound from the constituent components. In some embodiments, all of the additives are mixed into the elastomer compounds in one stage, or in more than one stage.

In some embodiments, some of the additives can be incorporated with the carbon materials through either a carbon functionalization approach or a nano-mixing approach as described above. There are several advantages of integrating additives with the carbon materials, including achieving better mixing of the additives with the carbon materials, achieving more desirable surface activity by incorporating the additive during the carbon particle formation, and reducing the total number of process steps required.

In addition to the examples above, there are several other types of additives and fillers that can be included in reinforced elastomeric compounds. Some non-limiting examples of fillers that can be included in reinforced elastomer compounds are degradants (e.g., ground calcium carbonate and ground coal), diluents (e.g., precipitated calcium carbonate and soft clays), semi-reinforcing fillers (e.g., titanium dioxide and zinc oxide), and reinforcing fillers (e.g., carbon materials, silica, magnesium oxide and thermosetting resins). Some non-limiting examples of plasticizers that can be included in reinforced elastomer compounds are petroleum-based plasticizers (e.g., paraffinic, naphthenic or aromatic oils), and non-petroleum-based plasticizers (e.g., glutarates and adipates). Some non-limiting examples of process aids that provide lubrication either at the surface of the elastomer, or in the bulk of the elastomer, that can be included in reinforced elastomer compounds are fatty acid esters, fatty acid amides, organosilicones and waxes. Some non-limiting examples of antidegradants that can be included in reinforced elastomer compounds are antioxidants (e.g., amines and phenols), antiozonants (amines, and quinolines), heat stabilizers, flex agents, light stabilizers, metal ion agents, and non-gel agents.

Due to the surface area, structure and surface activity of the graphene-based carbon materials described herein, elastomers containing these materials can use less accelerator than conventional elastomer compounds, in some embodiments. In other words, compounds containing the graphene-based carbon materials described herein can use less accelerator, or minimize the use of accelerator (e.g., TBBS, or DPG (diphenylguanidine)) and achieve the same cure time as compounds containing conventional carbon materials. This is advantageous for a number of reasons, including the toxicity of the various chemicals used as accelerators, namely DPG which has stringent regulations surrounding its use. In some embodiments, the concentration of DPG in the compounds containing the graphene-base carbon materials described herein (including those compounds containing silica and those without silica) is less than 2 PHR (parts per hundred rubber), or less than 1 PHR, or less than 0.5 PHR, or is about zero.

When elastomers are vulcanized and mixed with reinforcing agents such as carbon particles, the progression of the vulcanization can be characterized. One such method for characterizing the progression of the vulcanization is using a rheometer-based measurement (e.g., ASTM D5289-12). The stiffness (and viscosity) of an elastomer increases as the vulcanization progresses, and the stiffness can be measured in situ (e.g., using a rheometer). Some of the metrics obtained in such measurements are the maximum and minimum torque of the rheometer (i.e., a measure of the viscosity), the cure time and the scorch time. The maximum torque is a measure of the stiffness of the cured elastomer compound, and the minimum torque is a measure of the stiffness of the uncured elastomer compound. Several factors can contribute to the maximum and minimum torques, such as the species of elastomer used, the characteristics and concentration of any reinforcing fillers, and the types and concentrations of accelerants used. In some measurements the test is completed when the recorded torque reaches either an equilibrium or maximum value. The cure time can then be characterized by a given change in the measured torque. For example, the time at which 50% of the cure has taken place (e.g., $t_{50}$, or $tc_{50}$) can be determined from the time when the torque reaches 50% of either an equilibrium or maximum value. Similarly, the time at which 90% of the cure has taken place (e.g., $t_{90}$, or $tc_{90}$) can be determined from the time when the torque reaches 90% of either an equilibrium or maximum value. The scorch time is a metric that relates to the time required for vulcanization to begin, for example the time at which the torque to rise 2 units above the minimum torque value (e.g., $t_s2$).

Properties of Elastomers with Graphene-Based Carbon Fillers

The graphene-based carbon materials described herein can be incorporated into compounds to produce tires with advantageous properties, including but not limited to low rolling resistance (rolling resistance is related to fuel economy), high mileage, high winter traction, high ice traction, high wet traction, high fuel economy, high dry handling, high dry traction, high dry handling, high treadlife, and/or high static discharge. In some cases, the physical (e.g., surface area, structure, surface activity, particle size) and/or electrical properties (e.g., electrical conductivity) of the graphene-based carbon materials are responsible for the improved properties of the compound containing the carbon materials. For example, the high surface area of the graphene-based carbon materials is responsible for the high tan delta values (at low temperature) of the compounds containing the carbon materials, which is predictive of tires with good ice and wet traction. As a second example, the high electrical conductivity of the graphene-based carbon materials is responsible for the high static discharge of the compounds containing the carbon materials (and tires produced from the compounds).

Elastomers produced for tire applications typically undergo a suite of tests in order to characterize the ability of the elastomer materials to be processed, the physical properties of the elastomers, and the predicted performance in tire applications.

The degree of dispersion of particulate fillers (e.g., carbon reinforcing fillers) in elastomeric compounds can be characterized using optical light microscope methods where the image from a sample is compared to a set of standards. One such measurement is the Phillips Dispersion Rating. In this measurement, a sample is prepared (e.g., by cutting with a razor blade), imaged under specific lighting conditions, and compared to a standard scale. The more visible non-uniformities observed (e.g., macro-scale agglomerates of particles), the worse the dispersion is, and the lower the Phillips Dispersion Rating. The Phillips Dispersion Rating uses a 10-point scale where a 10 is the least number of non-uniformities observed (i.e., the best dispersion) and a rating of 1 corresponds to the most number of non-uniformities observed (i.e., the worst dispersion).

The physical properties of an elastomer compound (e.g., durometer hardness, tensile strength, elongation at break and modulus at different extensions) can also be measured, for example using ASTM D412-16, and ASTM D2240-15. The change in physical properties upon accelerated aging (e.g., heat-aging) can also be measured, for example using ASTM D573-04 (2015). Tear strength is another physical property that can be measured, for example, using ASTM D624-00 (2012). The physical properties of an elastomer compound (e.g., durometer hardness, tensile strength, elongation at break, modulus at different extensions and tear strength) can be influenced by many factors, such as the species of elastomer used, and the characteristics and concentration of any reinforcing fillers.

The abrasion resistance of an elastomer is another important characteristic in many applications. The abrasion loss can be measured, for example using DIN 53 516 and ASTM D5963-04 (2015) testing standards. These tests typically include pressing an elastomer sample to the surface of a rotating drum with an abrasive sheet using a well-defined force. The abrasion resistance of an elastomer compound can be influenced by many factors including the species of elastomer used, and the characteristics and concentration of any reinforcing fillers.

The compression set of elastomers is a measure of the permanent deformation remaining after an applied force is removed. The compression set can be measured, for example using ASTM D395-16e1, Method B testing standard. These tests typically include the prolonged application of a compressive stress, the removal of the stress, and a measurement of the deformation of the sample. The compression set characteristics of an elastomer compound can be influenced by many factors including the species of elastomer used, and the characteristics and concentration of any reinforcing fillers.

The dynamic viscoelastic properties of a reinforced elastomer are commonly used to predict the performance of the elastomer in tire applications. For example, the dynamic viscoelastic properties can be measured using ASTM D5992-96 testing standards. Some common metrics used are G' storage modulus, tan delta and J" loss compliance at different temperatures. Each metric relates to a different tire performance characteristic. For example, tan delta at higher temperatures such as 30° C. and 60° C. are a good predictors of rolling resistance. Higher tan delta values indicate higher hysteresis and therefore higher rolling resistance and poorer fuel economy. The G' storage modulus at low temperatures such as −20° C. is a good predictor of winter traction, and the G' at higher temperatures such as 30° C. is a good predictor of dry handling. Compounds with higher stiffness give higher dry handling because the tread compound is stiffer when the tire is cornering through a curve. Dry traction, on the other hand, is quite different from dry handling. A softer more pliable compound gives better dry traction because it conforms more to the surface of the road and gives more contact area. Compounds with higher tan delta (higher hysteresis) tend to be better for dry traction. Higher J" loss compliance at 30° C. is also a good predictor of higher dry traction. Ice and wet traction performance are predicted by higher tan delta (higher hysteresis) at lower temperatures of −10° C. (ice) and 0° C. (wet) because the lower temperatures are equivalent to high frequencies which are seen with traction.

Two other dynamic materials properties, which are used to characterize reinforced elastomers are the Mullins Effect and the Payne Effect. The Mullins Effect and the Payne Effect can be measured, for example using ASTM 5992-96 (2011), whereby the modulus versus the dynamic strain of a sample is measured in a first sweep, and then repeated in a second sweep. The Mullins Effect is a measure of the difference between the G' storage modulus at 0.001% strain in the first sweep and the G' at 0.001% strain in a second sweep. The Mullins Effect is related to the dynamic stress-softening that is observed between the first and second strain sweeps, which can be due to the polymer-filler matrix being pulled apart during the first strain sweep and not having time to re-form. The Payne Effect is a measure of the difference between the G' storage modulus at 0.001% strain in the first sweep and the G' at 0.05% strain in a second sweep. A lower Payne Effect can be indicative of better filler dispersion because filler particles are finer and more evenly distributed throughout the polymer with less chance to re-agglomerate. The Payne Effect is typically seen in filled rubber compounds, and not in gum compounds.

The properties of the elastomeric compounds incorporating the graphene-based carbon materials described herein (e.g., as determined using the above tests) can be used as predictors of the performance of a vehicle tire manufactured from the compound. For example, a high rheometer maximum torque during mixing combined with a high durometer hardness value and high modulus values predict that the graphene-based carbon materials have desirable reinforcement properties, which are advantageous in tread grade carbon in tires (e.g., the graphene-based carbon materials can replace tire filler carbon materials with lower ASTM N classifications, such as N234 and N110). Elastomeric compounds incorporating the graphene-based carbon materials described herein can also be produced with high hardness for use in monorail tires, for example.

In some embodiments, the compound containing the graphene-based carbon materials described herein has a median Shore A Durometer Hardness, as measured by ASTM D2240-15, from 70 to 80, or from 55 to 80. In some embodiments, the compound containing the graphene-based carbon materials described herein has a median tensile strength, as measured by ASTM D412-16, from 10 MPa to 30 MPa, or from 15 MPa to 20 MPa, or from 20 MPa to 35 MPa. In some embodiments, the compound containing the graphene-based carbon materials described herein has a median elongation at break, as measured by ASTM D412-16, from 400% to 500%, or from 300% to 400%, or from 200% to 525%. In some embodiments, the compound containing the graphene-based carbon materials described herein has a median 50% modulus, as measured by ASTM D412-16, from 1.5 MPa to 2.5 MPa, or from 1.0 MPa to 2.0 MPa. In some embodiments, the compound containing the graphene-based carbon materials described herein has a median 100% modulus, as measured by ASTM D412-16, from 2 MPa to 4 MPa, or from 1.75 MPa to 4 MPa. In some embodiments, the compound containing the graphene-based carbon materials described herein has a median 200% modulus, as measured by ASTM D412-16, from 7 MPa to 9 MPa, or from 5 MPa to 9 MPa. In some embodiments, the compound containing the graphene-based carbon materials described herein has a median 300% modulus, as measured by ASTM D412-16, from 13 MPa to 16 MPa, or from 10 MPa to 17 MPa.

The combinations of properties of the compound incorporating the graphene-based carbon materials can be predictors of the performance of an automobile tire manufactured from the compound. For example, the high rheometer maximum torque during mixing combined with the high Shore Hardness values and the high modulus values predict that the graphene-based carbon materials have desirable reinforcement properties, which are advantageous in tread grade carbon in tires (e.g., the graphene-based carbon materials can replace tire filler carbon materials with lower ASTM N classifications, such as N234 and N110).

In some embodiments, the compound containing the graphene-based carbon materials described herein has a median tear strength, as measured by ASTM D624-00 (2012), from 60 kN/m to 70 kN/m, or from 60 kN/m to 110 kN/m. The high surface area of the present graphene-based materials can be responsible for the tear strength of the present compounds being comparable to or greater than the tear strength of compounds using conventional carbon filler. In the cases where functionalized graphene-based materials are used, then the functionalization may also improve the tear strength of the present compounds compared to the tear strength of compounds using conventional carbon filler.

In some embodiments, the compound containing the graphene-based carbon materials described herein has a median abrasion loss, as measured by ASTM D412-16, from 70 mm$^3$ to 100 mm$^3$ or 80 mm$^3$ to 90 mm$^3$. The structure of the present graphene-based materials (e.g., geometries with high aspect ratios), or the smaller particle size of the present graphene-based materials compared to conventional carbon black materials can be responsible for the abrasion resistance of the present compounds being comparable to or greater than the abrasion resistance of compounds using conventional carbon filler.

In some embodiments, the compound containing the graphene-based carbon materials described herein has a Phillips Dispersion Rating from 6 to 10, or from 8 to 10. The smaller particle size of the present graphene-based materials can be responsible for the dispersion of the particles in the present compounds being comparable to or better than the dispersion of conventional carbon filler in elastomer compounds. In the cases where functionalized graphene-based materials are used, then the functionalization may also improve the dispersion of the particles in the present compounds compared to the dispersion of conventional carbon filler in elastomer compounds.

In some embodiments, the compound containing the graphene-based carbon materials described herein has a compression set, as measured by ASTM D395-16e1, Method B from 20% to 30%, or from 25% to 30%. The high surface area and/or the structure of the present graphene-based materials can be responsible for the compression set of the present compounds being comparable to or greater than the tear compression set of compounds using conventional carbon filler. In the cases where functionalized graphene-based materials are used, then the functionalization may also improve the compression set of the present compounds compared to the compression set of compounds using conventional carbon filler.

In some embodiments, the compound containing the graphene-based carbon materials described herein have electrical resistivity, as measured by ASTM ASTM D257-14, from $1\times10^{13}$ Ω-cm to $5\times10^{14}$ Ω-cm, or from $5\times10^{13}$ Ω-cm to $5\times10^{14}$ Ω-cm, or $1\times10^{14}$ Ω-cm to $1\times10^{15}$ Ω-cm. The improvements in electrical resistivity can be attributed directly to the higher electrical conductivity of the present graphene-based carbon filler.

In some embodiments, the compound containing the graphene-based carbon materials described herein have thermal conductivity from 0.1 W/(m*K) to 10 W/(m*K), or from 0.1 W/(m*K) to 5 W/(m*K), or from 0.1 W/(m*K) to 1 W/(m*K), or from 0.1 W/(m*K) to 0.5 W/(m*K). The improvements in thermal conductivity can be attributed directly to the higher thermal conductivity of the present graphene-based carbon filler.

In some embodiments, the compound containing the graphene-based carbon materials described herein has a G' storage modulus at −20° C., as measured by ASTM D5992-96 (2011), from 5 MPa to 12 MPa, or from 8 MPa to 9 MPa, or less than 9 MPa. In some embodiments, the compound containing the graphene-based carbon materials described herein has a tan delta at −10° C., as measured by ASTM D5992-96 (2011), from 0.35 to 0.40, or from 0.35 to 1.0, or from 0.8 to 0.9, or greater than 0.8. In some embodiments, the compound containing the graphene-based carbon materials described herein has a tan delta at 0° C., as measured by ASTM D5992-96 (2011), from 0.3 to 0.35, or from 0.3 to 0.6, or from 0.5 to 0.6, or greater than 0.5. In some embodiments, the compound containing the graphene-based carbon materials described herein has a tan delta at 30° C., as measured by ASTM D5992-96 (2011), from 0.1 to 0.3, or from 0.15 to 0.25, or less than 0.25. In some embodiments, the compound containing the graphene-based carbon materials described herein has a G' storage modulus at 30° C., as measured by ASTM D5992-96 (2011), from 1 MPa to 6 MPa, or from 5 MPa to 6 MPa, or from 1.5 MPa to 2.5 MPa, or greater than 1.5 MPa. In some embodiments, the compound containing the graphene-based carbon materials described herein has a J" loss compliance at 30° C., as measured by ASTM D5992-96 (2011), from 4E-8 1/Pa to 1E-7 1/Pa, or from 9E-8 1/Pa to 1E-7 1/Pa, or greater than 9E-8 1/Pa. In some embodiments, the compound containing the graphene-based carbon materials described herein has a tan delta at 60° C., as measured by ASTM D5992-96 (2011), from 0.1 to 0.3, or from 0.10 to 0.15, or less than 0.15. In some embodiments, the compound containing the graphene-based carbon materials described herein has a G' storage modulus at 60° C., as measured by ASTM D5992-96 (2011), from 1 MPa to 4 MPa, or from 3 MPa to 4 MPa, or from 1 MPa to 2 MPa, or greater than 1.5 MPa. All the properties described in this paragraph are believed to be from carbon structure.

In some embodiments, the compound containing the graphene-based carbon materials described herein have a Mullins Effect, as measured by ASTM 5992-96 (2011), from $1\times10^4$ to $1\times10^6$, or from $5\times10^4$ to $5\times10^5$. In some embodiments, the compound containing the graphene-based carbon materials described herein have a Payne Effect, as measured by ASTM 5992-96 (2011), from $1\times10^5$ to $1\times10^7$, or from $1\times10^5$ to $5\times10^6$. The ability of the present graphene-based materials to dissipate energy (e.g., heat) can be responsible for the Mullins Effect and/or Payne Effect of the present compounds being comparable to or greater than the Mullins Effect and/or Payne Effect of compounds using conventional carbon filler.

The properties of the graphene-based carbon materials and the elastomers described herein indicate that the present graphene-based carbon materials can be used as direct replacements for many conventional carbon tire fillers. In some embodiments, the present graphene-based carbon materials are more reinforcing than many conventional carbon tire fillers, can reduce the need for environmentally hazardous accelerants (e.g., TBBS and DPG), and/or are compatible with silica in elastomeric compounds (e.g., for use in "green tires").

FIG. 3 is a cross-section of a conventional radial tire structure, with the circled components indicating areas where the present graphene-based carbon integrated materials can be used. Example areas include, but are not limited to, sidewalls, tread, liner and carcass. Different types of rubber compounds are typically used in different areas, where the tread requires higher grade materials (i.e., lower N number, with higher properties such as abrasion resistance) than the other areas of the tire. Different formulations of the present elastomer compounds can be used for areas such as, but not limited to, the treads, sidewalls and carcass.

Due to the properties of elastomer compounds containing the graphene-based carbon materials described herein, these compounds can be used in tires for various industries, such as tires for automotive, aerospace, other aircraft, passenger tires, off-road equipment, earth-mover type vehicles, racing tires, and all other/similar industrial applications that use tires.

Additionally, the present elastomer compounds with graphene-based carbon can be used in various applications besides tires. For example, fluoroelastomers (FKM) are another possible application of the present graphene-based carbon materials, such as for aerospace applications and other extreme high or low temperature environments. Since the graphene-based carbon has very little, if any, sulfur upon production, it is an attractive substitute for the conventional carbon that is used for FKM. Hydrogenated nitrile butadiene rubber (HNBR) is another area of application, where the present graphene-based carbons can be a direct replacement for standard carbon blacks—such as for oil field applications, and other abrasive environments. The present reinforced elastomer compounds can also be used in applications such as door seals, gaskets, anti-vibration applications, energy dampening applications, hoses, conveyor belts, engine belts, and many others.

EXAMPLES

The present embodiments include compounds comprising an elastomer material, a filler material, at least one additive material, and at least one accelerant material. The filler material comprises a graphene-based carbon material. The graphene-based carbon material comprises graphene comprising up to 15 layers, carbon aggregates having a median size from 1 to 50 microns, a surface area of the carbon aggregates of at least 50 m$^2$/g, when measured via a Brunauer-Emmett-Teller (BET) method with nitrogen as the adsorbate, and no seed particles.

The additive material may be, for example, a material selected from the group consisting of: a silane coupling agent, an oil, a zinc oxide material, a stearic acid material, a wax material, a plasticizer, an antiozonant, an antioxidant, a viscosity modifier, and a sulfur cross-linker. The accelerant material may comprise, for example, N-tert-butyl-2-benzothiazyl sulfonamide. In other embodiments, the accelerant material may comprise N-tert-butyl-2-benzothiazyl sulfonamide and diphenylguanidine, where the concentration of N-tert-butyl-2-benzothiazyl sulfonamide is higher than the concentration of diphenylguanidine.

In some embodiments, the graphene-based carbon material is a nano-mixed graphene-based carbon material, where the nano-mixed graphene-based carbon material comprises a species selected from the group consisting of silica, zinc oxide, and titanium dioxide. In some embodiments, the graphene-based carbon material is a functionalized graphene-based carbon material, where the functionalized graphene-based carbon material comprises a species selected from the group consisting of H, O, S, N, Si, aromatic hydrocarbons, Sr, F, I, Na, K, Mg, Ca, Cl, Br, Mn, Cr, Zn, B, Ga, Rb and Cs.

Figure 36:
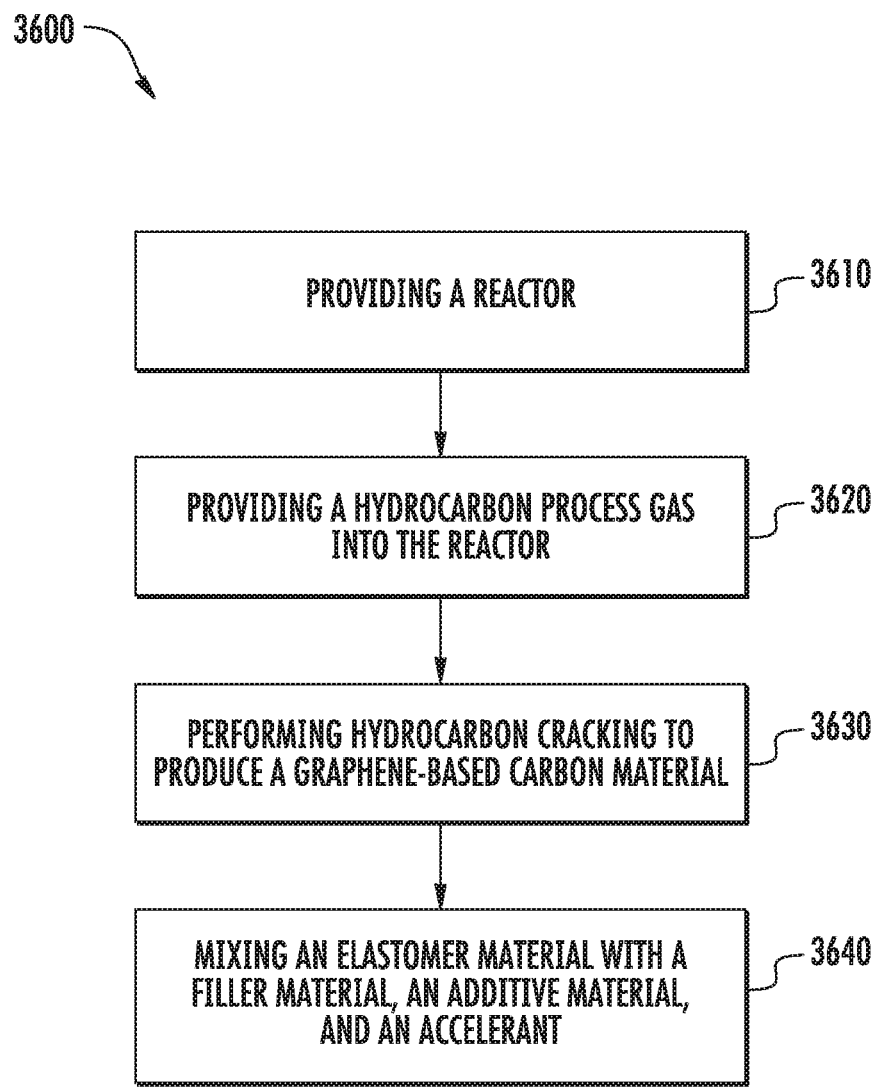
FIG. 36 shows a flowchart of an embodiment for producing an elastomer compound, in accordance with some embodiments.

The present embodiments also include methods of producing an elastomer compound. FIG. 36 is a flowchart 3600 of an embodiment comprising providing a reactor in step 3610 and providing a hydrocarbon process gas into the reactor at step 3620. Step 3630 involves performing hydrocarbon cracking of the hydrocarbon process gas in the reactor to produce a graphene-based carbon material. Step 3640 involves mixing an elastomer material with at least one filler material, at least one additive material, and at least one accelerant material. The filler material comprises the graphene-based carbon material. The graphene-based carbon material comprises graphene comprising up to 15 layers, carbon aggregates having a median size from 1 to 50 microns, a surface area of the carbon aggregates of at least 50 m$^2$/g, when measured via a Brunauer-Emmett-Teller (BET) method with nitrogen as the adsorbate, and no seed particles. The reactor may be a thermal reactor or a microwave reactor.

In some embodiments of the methods, the graphene-based carbon material is a nano-mixed graphene-based carbon material, and the hydrocarbon cracking in the reactor further comprises providing a second material into the reactor. In different embodiments, the second material provided into the reactor is selected from the group consisting of: liquids or gases comprising S, liquids or gases comprising Si; H$_2$ gas, H$_2$S gas, silane gas, ammonia gas, aromatic hydrocarbon compounds; particles, gases or liquids containing Na, K, B, Cr, Ca, Sr, Mg, Zn, Rb, Cs, Ga, and Mn; particles, gases or liquids containing F, Cl, Br, I, and other halogens; and oxygen-containing reactants, oxidizing reactants, ozone, hydrogen peroxide, potassium hydroxide, potassium chloride, hydrochloric acid, nitric acid, chromic acid, permanganates and diazonium salts.

In some embodiments of the methods, the graphene-based carbon material is a functionalized graphene-based carbon material, and the hydrocarbon cracking in the reactor further comprises inserting a hydrocarbon material into the reactor. The methods also include inserting a second material into the reactor, where the second material is selected from the group consisting of: H$_2$ gas, H$_2$S gas, silane gas, ammonia gas, aromatic hydrocarbon compounds; particles, gases or liquids containing Na, K, B, Cr, Ca, Sr, Mg, Zn, Ga, and Mn; particles, gases or liquids containing F, Cl, Br, I, and other halogens; and oxygen-containing reactants, oxidizing reactants, ozone, hydrogen peroxide, potassium hydroxide, potassium chloride, hydrochloric acid, nitric acid, chromic acid, permanganates and diazonium salts.

In some embodiments of the above methods, the hydrocarbon cracking process and the mixing an elastomer material with at least one filler material, at least one additive material, and at least one accelerant process are performed at the same site.

The examples below represent some embodiments of the present disclosure.

Example 1: Elastomer Compounds with Graphene-Based Materials

In this example, graphene-based carbon particles were produced using a thermal reactor. Elastomer compounds were also produced using the graphene-based carbon particles.

The thermal carbon (TC) materials were produced in a thermal reactor, as described herein. In this Example, the TC was a material comprised of multi-walled spherical fullerenes (MWSFs) and approximately 30% graphene.

Figures 4, 5:
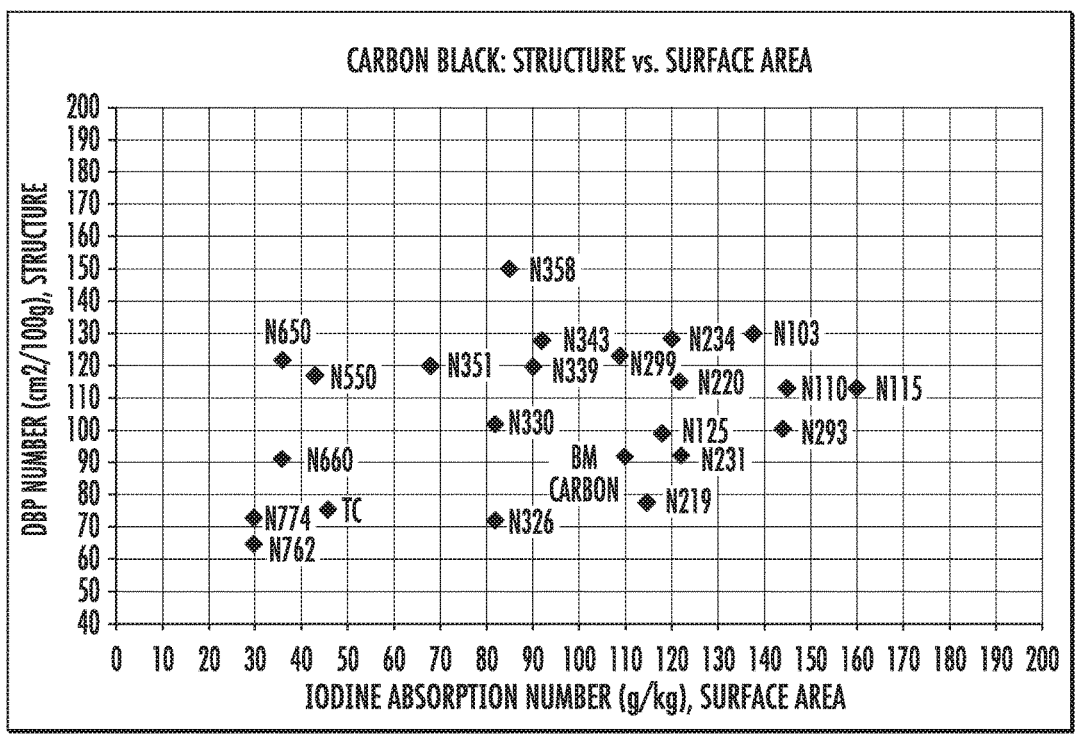
FIG. 4 shows analytical test results for graphene-based carbon materials, compared to conventional carbon black materials, in accordance with some embodiments.
FIG. 5 shows a graph of oil absorption number versus iodine adsorption number for graphene-based carbon materials compared to a range of conventional carbon black materials, in accordance with some embodiments.

FIG. 4 shows analytical test results for the TC materials, where values for conventional carbon black materials—grades N115, N330, N650, N110, N770 and N339—are also shown for comparison. The "Iodine Adsorption" measurements were performed using ASTM D1510 testing standard, and the "Oil Absorption" (i.e., DBP number) measurements were performed using ASTM 2414, Method B. The TC samples showed iodine adsorption and oil absorption properties similar to several of the standard materials. Thus, the data indicate that the present graphene-based carbon materials are a viable replacement for carbon black in rubber formulations. (Note, "BM Carbon" shall be described in reference to Example 2 below.)

FIG. 5 is a graph of oil absorption number versus iodine adsorption number for the TC samples of this Example compared to a range of conventional carbon black materials. As can be seen, TC is similar to N787, N762, N660. This graph also illustrates additional examples of carbon black grades (e.g., N234, N339, N220 and N110) with properties that could be achieved by tailoring the graphene-based carbon such as by customizing the graphene-based materials (e.g., by modifying the carbon particle processing conditions, functionalization, nano-mixing, and/or the percentage of graphene to other carbon allotropes such as MWSFs).

FIG. 6 describes the formulations of compounds containing an elastomer and carbon material in this Example. The "Control" sample contained Industry Reference Black No. 8 (IRB#8) filler and the "Tire Black Sample" contained the TC carbon filler of this Example. The elastomer is SBR 1500 and was incorporated at about 100 PHR (parts per hundred rubber). The carbon materials were incorporated at about 50 PHR in both samples. Additives were also added, as shown in FIG. 6 (e.g., the zinc oxide, sulfur, and stearic acid), and the types of additives and concentrations were kept constant between the two samples. The TBBS for both samples were accelerators, which promoted the formation of the elastomeric compound from the constituent components.

FIG. 7 shows physical properties of the "Control" and the "Tire Black Sample" of this Example. The physical properties tested include elongation, flexural modulus, tensile strength, and durometer hardness, using ASTM D 412-06a and D 2240 testing standards. In these tests, the ASTM die C dumbbells were tested at 20 inch/min crosshead speed, the dumbbells rested for 24 hours at 23° C. after curing and before testing, and the durometer values were taken at instantaneous readings. The tensile strength for a standard passenger tire is 3200-3900 psi. Note that IRB#8 is a high grade of carbon black material, so although the "Tire Black Sample" embodiment with the present graphene-based carbon material showed lower tensile strength than the control, the tensile strength of the test sample is in the range of some standard carbon black materials (e.g., N774 grade).

FIG. 8 shows test results of heat build-up for the "Control" and the "Tire Black Sample" of this Example. A Goodrich flexometer was used, per ASTM D623 Method A with a stroke of 175 inches and a speed of 180 cpm. The load for the heat build-up conditions was 143 psi. The "Tire Black Sample" ("Tire Black (1-110 G)") was compared to the "Control" sample. The test results show that the Tire Black (1-110 G) built up less heat than the conventional material, where the temperature rise was 42° F. for the test sample compared to 51° F. for the control. In general, a temperature rise of approximately 50° F. will cause properties of carbon to start to degrade, and reaching an actual temperature of approximately 200° F. will cause a tire to blow out. FIG. 8 demonstrates that tires made of the present materials result in better dissipation of heat, and consequently less chance of blowing out the tire.

The DIN abrasion of the "Control" and the "Tire Black Sample" of this Example was also tested. The testing was done using the DIN 53516 testing standard, with 40 rpm conditions and a 10 N load. The abrasion loss for the "Control" sample was 86 mm$^3$ and was 131 mm$^3$ for the "Tire Black Sample." The specific gravity for the "Control" sample was 1.142 and was 1.148 for the "Tire Black Sample." Note that IRB#8 is a high grade of carbon black material, so although the "Tire Black Sample" embodiment with the present graphene-based carbon material showed higher abrasion loss than the control, the abrasion loss of the test sample is in the range of some standard carbon black materials (e.g., N774 grade).

Example 2: Elastomer Compounds with Post-Processed Graphene-Based Materials

In this example, graphene-based carbon particles were produced using a thermal reactor and subsequently post-processed by mechanical grinding. The mechanical grinding was performed using a ball mill, which reduced the average size of the particles and increased the average particle surface area. Elastomer compounds were also produced using the post-processed graphene-based carbon particles.

To quantify the surface area and structure of the ball-milled carbon material, iodine adsorption measurements were performed using ASTM D1510 testing standard, and oil absorption (DBP) measurements were performed using ASTM 2414, Method B. The iodine adsorption number was 110.05 g/kg, and the oil absorption (DBP) was 91.7 cm$^3$/100 g. These results show that the surface area and structure were significantly increased over TC materials that were not post-processed (e.g., the thermal carbon measured in Example 1).

Referring back to FIG. 5, the oil absorption number versus iodine adsorption number for the "BM Carbon" samples of this Example are compared to a range of conventional carbon black materials. The "BM Carbon" sample contained the post-processed (ball-milled) carbon of this Example. As can be seen, BM Carbon is similar to N330, N219 and N125.

FIG. 9 describes the formulations of compounds containing an elastomer and carbon material in this Example. The "N339 Carbon Black" sample was the control sample and contained conventional carbon black N339. The elastomer for both samples was a mixture of 70 PHR Buna 4525-0 S-SBR and 30 PHR Budene 1207 or 1208 BR. The carbon filler materials were incorporated at about 55 PHR in both samples. Additives were also incorporated into these compounds (e.g., the TDAE oil, zinc oxide, stearic acid, 6PPD, Nochek 4729A wax, TMQ, and sulfur), and the types of additives and concentrations were kept constant between the two samples. The TBBS and DPG for both samples were accelerators, which promoted the formation of the elastomeric compound from the constituent components.

FIG. 10 describes some of the key parameters measured during mixing of the "N339 Carbon Black" control sample and the "BM Carbon" sample compounds in this Example, using methods described in ASTM D5289-12. The equipment and conditions used for these tests were Tech Pro rheoTECH MDR, at a temperature of 160° C. (320° F.) and 0.5° arc. The maximum and minimum torque experience during mixing, the "Cure Time, $t_{50}$" (time at which 50% of the cure has taken place), the "Cure Time, $t_{90}$" (time at which 90% of the cure has taken place), and the "Scorch Time, $t_s2$" (scorch time for viscosity to rise 2 units above the minimum torque value) are summarized in FIG. 10. The "BM Carbon" sample had lower maximum torque, and a slightly longer cure time than the control sample in this Example. Note that N339 grade of carbon black material has a somewhat higher structure than the post-processed carbon material in this Example (see FIG. 5). The higher structure of the N339 carbon black could account for the slightly shorter cure times and scorch times for the "N339 Carbon Black" control sample compared to the "BM Carbon" sample compounds.

FIG. 11 shows some examples of physical properties for the "N339 Carbon Black" control sample and the "BM Carbon" sample compounds in this Example, as produced (i.e., before heat aging). The tests in this Example were performed using methods described in ASTM D412-16 and ASTM D2240-15. The die C dumbbells in this Example were tested at 20 in/min. The Shore A durometer hardness and tensile strength were higher for the "N339 Carbon Black" control sample compared to the "BM Carbon" sample, indicating that the post-processed carbon in this Example was less reinforcing than the N339 carbon black. The peak strain (i.e. elongation) and moduli at different strains (i.e., 50%, 100%, 200% and 300% strain) were also higher for the "N339 Carbon Black" control sample compared to the "BM Carbon" sample in this Example.

FIG. 12 shows the same physical properties shown in FIG. 11 for the "N339 Carbon Black" control sample and the "BM Carbon" sample compounds in this Example, after heat aging for 168 hours at 70° C. in air. The "BM Carbon" material experienced larger magnitude changes in durometer hardness, tensile strength and elongation compared to the control sample, which indicates that the "BM Carbon" material was less stable than the control during heat aging.

The tear resistance of the "N339 Carbon Black" control sample and the "BM Carbon" sample compounds in this Example were also measured using ASTM D624-00 (2012) testing standard with a rate of 20 in/min. Three samples were measured for each. The average tear strength of the three "BM Carbon" samples was 29.67 kN/m (with a standard deviation of 2.60 kN/m) compared to an average of 76.96 kN/m (with a standard deviation of 2.73 kN/m) for the control samples.

The DIN abrasion of the "N339 Carbon Black" control sample and the "BM Carbon" sample compounds in this Example were also measured using DIN 53 516 (Withdrawn 2014) and ASTM D5963-04 (2015) testing standards with control abrasive Grade 184, and 40 rpm and 10 N load conditions. Three samples were measured for each. The average abrasion loss of the three "BM Carbon" samples was 153 mm$^3$ (with a standard deviation of 4 mm$^3$) compared to an average of 73 mm$^3$ (with a standard deviation of 2 mm$^3$) for the control samples.

The Phillips Dispersion Rating was also determined for the "N339 Carbon Black" control sample and the "BM Carbon" sample compounds in this Example. In these measurements, the samples were prepared for the tests by cutting with a razor blade, and pictures were taken at 30× magnification with an Olympus SZ60 Zoom Stereo Microscope interfaced with a PaxCam ARC digital camera and a Hewlett Packard LaserJet color printer. The pictures of the samples were then compared to a Phillips standard dispersion-rating chart having standards ranging from 1 (bad) to 10 (excellent). The Phillips Dispersion Rating for the "BM Carbon" sample was 8 compared to a value of 7 for the control samples.

Figure 15:
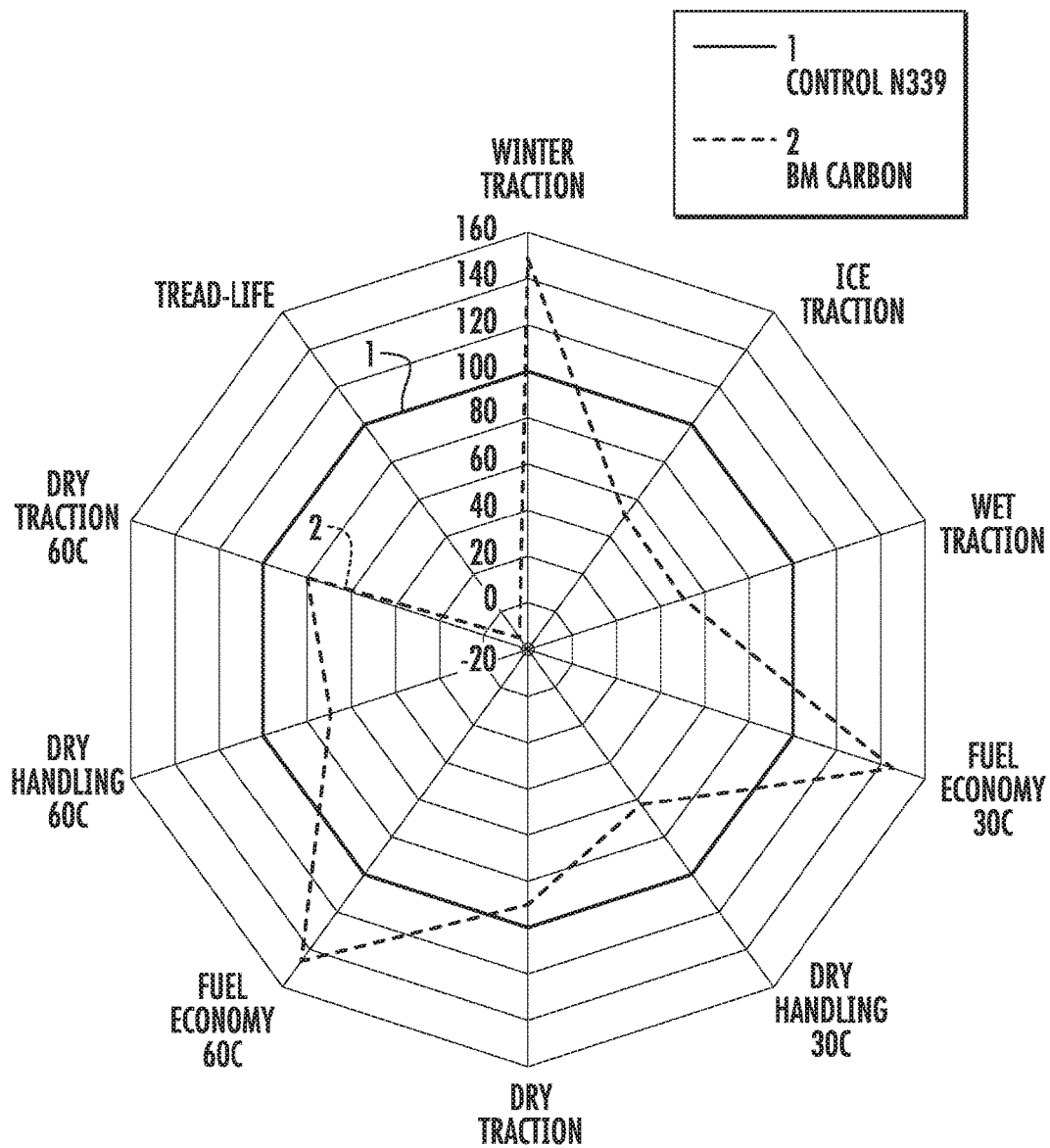
FIG. 15 shows a radar chart of dynamic viscoelastic properties of an elastomer compound containing graphene-based carbon materials normalized to an elastomer compound containing conventional carbon black materials, in accordance with some embodiments.

FIG. 13 shows dynamic viscoelastic properties of the "N339 Carbon Black" control sample and the "BM Carbon" sample compounds in this Example, measured using ASTM D5992-96 (2011). These measurements were performed in a temperature range from −20° C. to +70° C., with a strain of 5%, and a frequency of 10 Hz. The control sample was a stiffer/harder compound than the "BM Carbon" sample compound in this Example as indicated by higher G' elastic modulus values throughout the temperature sweep from −20° C. to +70° C. This measurement also correlates with the higher durometer level. Because of the higher stiffness level, tire predictors like snow traction (G' at −20° C.) and dry handling (G' at 30° C. and 60° C.) are higher for the control sample than for the "BM Carbon" sample. FIGS. 14 and 15 show the same data as FIG. 13, but normalized to the control sample. The predictors indicate that the "BM Carbon" sample would be worse for dry, ice and wet traction, dry handling and tread life, but better for winter traction and fuel economy (rolling resistance) compared to the control compound with conventional N339 carbon material.

The physical properties (e.g., tensile strength, modulus, tear resistance, durometer hardness) and the dynamic properties of the "BM Carbon" sample in this Example indicate that the post-processed graphene-base material in this Example may be used as a filler in rubber, but is not reinforcing enough to be used as a tread grade carbon black and in its present form. Dynamic viscoelastic testing also showed that the "BM Carbon" sample compound had low Payne and Mullins effects, which were similar to those of a gum compound.

Example 3: Elastomer Compounds with Graphene-Based Materials

In this Example, graphene-based carbon particles were produced using a microwave reactor system, as described herein. The particles produced by the microwave reactor were collected using a gas-solids separation system including a cyclone filter followed by a back-pulse filter. The temperatures within the cyclone filter and back-pulse filter were controlled, which controlled the amount of condensed hydrocarbons on the surface of the collected particles. Three different graphene-based carbon materials were produced using the microwave reactor in this Example: "LF CYC" were particles collected in the cyclone filter using a higher temperature (e.g., >300° C.), "LF CYC C6+" were particles collected in the cyclone filter using a lower temperature (e.g., <300° C.) in order to intentionally condense polycyclic aromatic hydrocarbons (PAHs) on the surface of the particles, and "LF FIL" were particles that were collected in the back-pulse filter. The "LF FIL" particles had somewhat higher structure and smaller particle size than both the "LF CYC" and "LF CYC C6+" particles. The PAHs condensed on the "LF CYC C6+" particles were intended to alter the surface activity of the particles compared to the "LF CYC" particles. Elastomer compounds were also produced using the graphene-based carbon particles.

FIG. 16 describes the formulations of compounds containing an elastomer and carbon material in this Example. Sample A was the control sample and contained conventional carbon black N339. Samples B, C and D contained the microwave reactor produced carbon of this Example. Sample B contained the "LF FIL" particles, sample C contained the "LF CYC" particles, and sample D contained the "LF CYC C6+" particles. The elastomer for all samples was SBR 1500, and was incorporated at 100 PHR. The carbon filler materials were incorporated at about 50 PHR in all samples. Additives were also incorporated into these compounds (e.g., the zinc oxide, sulfur, and stearic acid), and the types of additives and concentrations were kept constant between the two samples. The TBBS was the accelerator in all of the samples, which promoted the formation of the elastomeric compound from the constituent components.

FIG. 17 describes the mixing parameters for the compounds in this Example, and observations from the mixing. Similar mixing procedures were used for all four compounds in this Example. The mixing speed was 60 rpm for all of the compounds. One notable observation was that the graphene-based carbon materials of this Example (LF FIL, LF CYC, and LF CYC C6+) all dispersed well, but took longer to disperse than the N339 carbon black used in control Compound A.

FIG. 18 describes some of the key parameters measured during mixing of the compounds in this Example, using methods described in ASTM D5289-12. The equipment and conditions used for these tests were Tech Pro rheoTECH MDR, at a temperature of 160° C. (320° F.) and 0.5° arc. The maximum and minimum torque experience during mixing, the "Cure Time, $t_{50}$", the "Cure Time, $t_{90}$", and the "Scorch Time, $t_s2$" are summarized in FIG. 18. The experimental compounds B, C and D, including LF FIL, LF CYC and LF CYC C6+ material respectively, all had higher maximum torque and minimum torque than the control sample A, but had shorter cure times and scorch times than the control sample in this Example.

FIG. 19 shows some examples of physical properties for the control sample A ("N339") and experimental sample compounds (B "LF FIL," C "LF CYC" and D "LF CYC C6+") in this Example, as produced (i.e., before heat aging). The tests in this Example were performed using methods described in ASTM D412-16 and ASTM D2240-15. The Shore A durometer hardness was higher for all of the experimental samples than for the control sample. The tensile strength was higher for the control sample than the experimental samples. However, the tensile strength for the experimental sample B containing the LF FIL materials was only slightly lower than that of the control sample. The peak strain (i.e. elongation) was also similar for the control compound A and the experimental compound B. However, the peak strain for the experimental compounds C and D were lower than for the control. The moduli at different strains (i.e., 50%, 100%, 200% and 300% strain) were also similar or higher for the experimental compounds B, C and D compared to the control compound A.

The mixing observations and the physical properties (e.g., tensile strength, modulus, tear resistance, durometer hardness) of the experimental compound B containing the "LF FIL" material suggest that the "LF FIL" material is reinforcing enough to be used as a tread grade carbon black replacement in its present form. However, the "LF CYC" and "LF CYC C6+" did not perform as well as the "LF FIL" material. Not to be limited by theory, the higher structure and/or smaller particle size for the "LF FIL" carbon material compared to the "LF CYC" and "LF CYC C6+" could explain the improved performance of the "LF FIL" compounds in this Example.

Example 4: Elastomer Compounds with Graphene-Based Materials

In this Example, elastomer compounds were produced using the LF FIL graphene-based carbon particles from Example 3.

FIG. 20 describes several formulations of compounds containing an elastomer and carbon material. The elastomer is SBR 1500 and is incorporated at about 100 PHR (parts per hundred rubber). The carbon filler incorporated in the "B LF FIL" compound (i.e., the "B compound") is the graphene-based carbon material from Example 3. The carbon filler incorporated in the other samples ("A N339", "E N234", and "F N110") are different types of conventional carbon materials in accordance with ASTM standards. The "A N339" sample (i.e., the "A compound") contains N339 carbon, the "E N234" sample (i.e., the "E compound") contains N234 carbon, and the "F N110" sample (i.e., the "F compound") contains N110 carbon. The carbon materials are all incorporated at about 50 PHR. Additives were also incorporated as shown in FIG. 20 (e.g., zinc oxide, sulfur, and stearic acid), and the types of additives and concentrations were kept constant between all four samples. The TBBS was the accelerator in all of the samples, which promoted the formation of the elastomeric compound from the constituent components.

FIG. 21 describes the mixing parameters for the A compound and the B compound, and observations from the mixing. The same mixing procedure for the A compound was also used for the E compound and F compound. The mixing parameters for the B compound were also very similar. The mixing speed was 60 rpm for all of the compounds. Similar to the compound in Example 3, the LF FIL material dispersed well, but took longer to disperse than the N339 carbon black used in control Compound A.

Figures 22, 23:
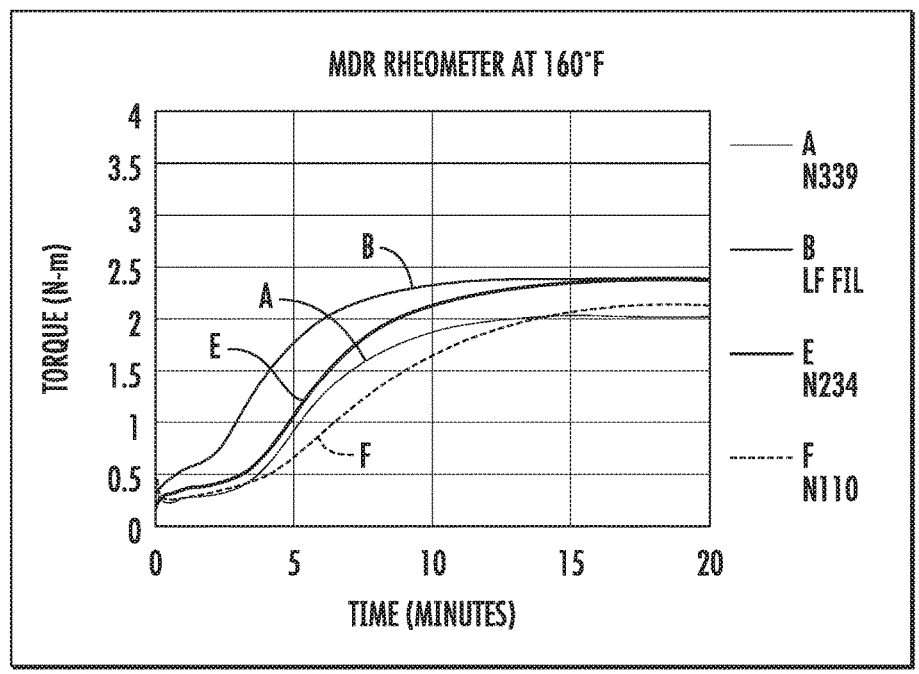
FIG. 22 shows a table of some of the key parameters measured during mixing of an elastomer compound containing graphene-based carbon materials compared to elastomer compounds containing conventional carbon black materials, in accordance with some embodiments.
FIG. 23 shows a graph of the torque during mixing of an elastomer compound containing graphene-based carbon materials compared to elastomer compounds containing conventional carbon black materials, in accordance with some embodiments.

FIGS. 22 and 23 describe some examples of the key parameters measured during mixing, using methods described in ASTM D5289-12. The equipment and conditions used for these tests were Tech Pro rheoTECH MDR, at a temperature of 160° C. (320° F.) and 0.5° arc. The rheometer data is summarized in FIG. 22, and the torque in N–m versus time during mixing is shown in FIG. 23. The maximum and minimum torques were similar for all of the samples tested, but the cure times and scorch time for Compound B containing the LF FIL material was substantially shorter than for the control samples A, E and F. The short Tc90 cure time is indicative of the potential for the LF FIL (and other graphene-based carbon materials described herein) to enable the use of less accelerator in elastomeric compounds containing these carbon materials.

FIG. 24 shows examples of physical properties of the A, B, E, and F compounds, measured using ASTM D412-16 and ASTM D2240-15. Compound B with the LF FIL material had higher Shore A Durometer hardness than the compounds containing the conventional N339, N234 and N110 carbon compounds. Compound B with the graphene-based carbon had a slightly lower tensile strength than the conventional N339, N234 and N110 carbon compounds, but it is within the standard deviation of the N234 compound. Compound B with the graphene-based carbon materials had similar elongation to the compounds containing the conventional N339 and N234 carbon materials. Compound B with the graphene-based carbon materials had modulus values similar to the compounds containing the conventional N339 and N234 carbon materials, and higher modulus values than the compound containing the conventional N110 carbon compound.

The tear resistance of Compound B containing LF FIL material and the control compounds in this Example were measured using ASTM D624-00 (2012) testing standard with a rate of 20 in/min. Three samples were measured for each. The average tear strength of the three Compound B samples was 65.10 kN/m (with a standard deviation of 0.24 kN/m) compared to averages of from 74.55 kN/m to 77.00 kN/m (with standard deviations from 0.44 to 1.74 kN/m) for the control samples.

The DIN abrasion of Compound B containing LF FIL material and the control compounds in this Example were measured using DIN 53 516 (Withdrawn 2014) and ASTM D5963-04 (2015) testing standards with control abrasive Grade 191, and 40 rpm and 10 N load conditions. Three samples were measured for each. The average abrasion loss of the three Compound B samples was 87 mm$^3$ (with a standard deviation of 2.6 mm$^3$) compared to averages from 78 mm$^3$ to 84 mm$^3$ (with standard deviations from 2.5 mm$^3$ to 9.9 mm$^3$) for the control samples.

The Phillips Dispersion Rating was also determined for Compound B containing LF FIL material and the control compounds in this Example. In these measurements, the samples were prepared for the tests by cutting with a razor blade, and pictures were taken at 30× magnification with an Olympus SZ60 Zoom Stereo Microscope interfaced with a PaxCam ARC digital camera and a Hewlett Packard LaserJet color printer. The pictures of the samples were then compared to a Phillips standard dispersion-rating chart having standards ranging from 1 (bad) to 10 (excellent). The Phillips Dispersion Rating for the Compound B sample was 9 compared to values from 6 to 7 for the control samples. Compound B with the graphene-based LF FIL carbon materials showed better dispersion than the N339, N234 and N110 compounds containing the conventional carbon materials. This was an unexpected result given that the LF FIL material used in Compound B was in powder form and not pelletized like the conventional carbon materials (N330, N234 and N110) in the compounds that Compound B was compared to.

FIG. 25 shows dynamic viscoelastic properties for Compound B containing LF FIL material and the control compounds in this Example, measured using ASTM D5992-96 (2011). These measurements were performed in a temperature range from −20° C. to +70° C., with a strain of 5%, and a frequency of 10 Hz.

Compound B with graphene-based carbon materials was a stiffer/harder compound than the control compounds (A, E and F) as indicated by higher G' elastic modulus values throughout the temperature sweep from −20° C. to +70° C. This measurement also correlates with the higher durometer hardness for Compound B compared to the control compounds in this Example. Because of the higher stiffness level, tire predictors like snow traction (G' at −20° C.) and dry handling (G' at 30° C. and 60° C.) are higher than the control compounds with the conventional carbon materials. The predictors also indicate that Compound B with the LF FIL materials would be worse for snow traction but better or comparable for dry handling than the compounds with conventional N339, N234 and N110 carbon materials.

Compound B with the LF FIL materials had similar low temperature tan delta values to the compounds with the conventional N234 and N110 carbon materials, which would predict similar ice and wet traction. Compound A, with the N339 conventional carbon materials had less hysteresis and lower low temperature tan delta values, which predicts lower traction.

Compound B with the graphene-based carbon materials is a stiffer, harder compound with lower J" which means it is predicted to have lower dry traction than the compounds containing the conventional N339, N234 and N110 carbon materials.

Compound B with the LF FIL materials had tan delta values similar to the compound with the conventional N234 carbon materials, indicating similar predicted fuel economy. The compound with the conventional N339 carbon material had lower tan delta values and is predicted to have the best fuel economy. The compound with the conventional N110 carbon material had the highest tan delta values and is predicted to have the poorest fuel economy.

Figure 27:
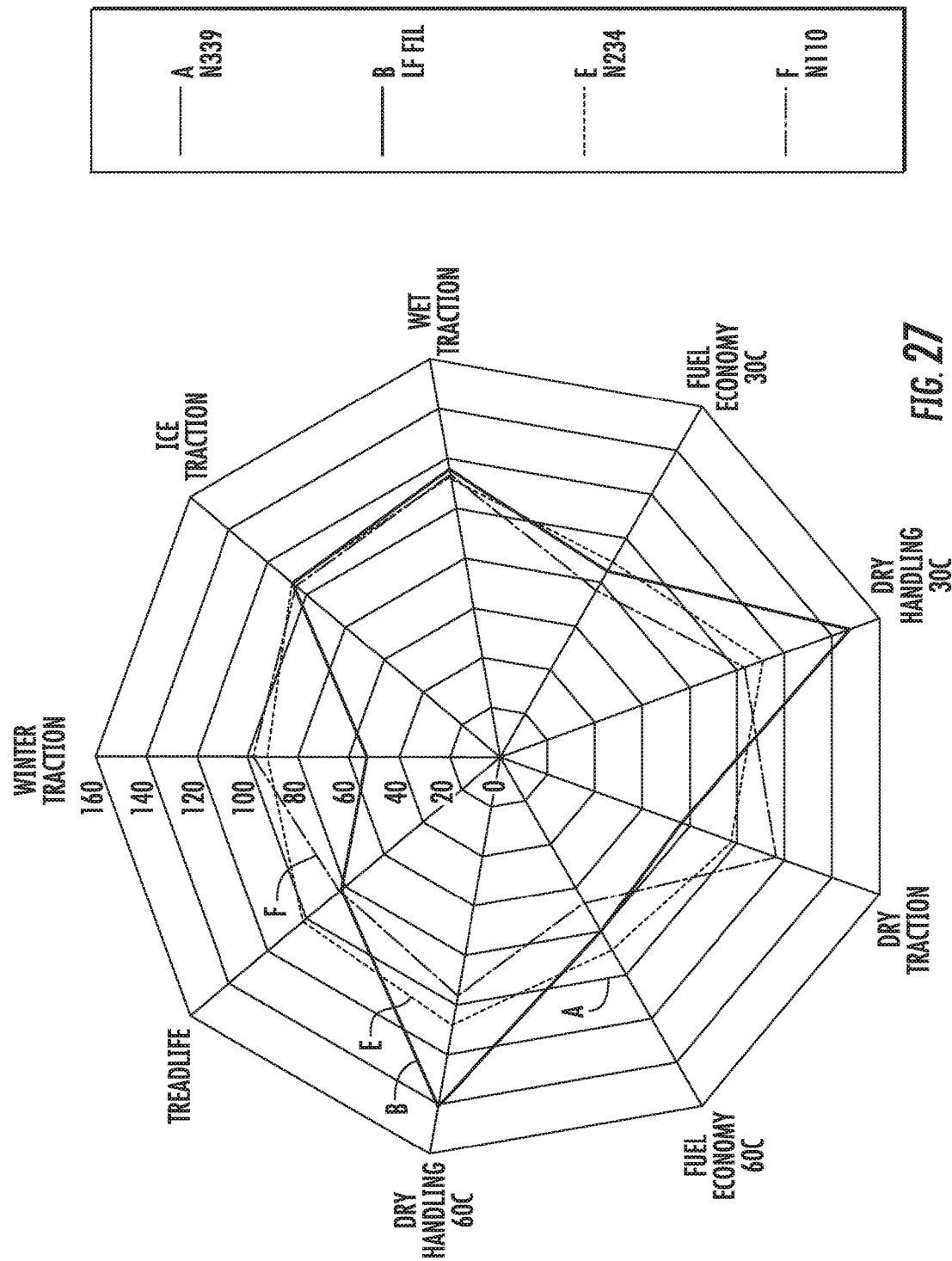
FIG. 27 shows a radar chart of dynamic viscoelastic properties of an elastomer compound containing graphene-based carbon materials and elastomer compounds containing conventional carbon black materials, normalized to an elastomer compound containing conventional carbon black materials, in accordance with some embodiments.

FIGS. 26 and 27 show the same data as FIG. 25, but normalized to the control Compound A containing the N339 carbon black material. Compared to the Compound A, the predictors indicate that the Compound B sample with LF FIL would be worse for winter traction, dry traction, and tread life, but comparable or better for ice traction, wet traction, fuel economy and dry handling.

The following is a comparison between Compound B containing the graphene-based LF FIL carbon materials and Compound A containing the conventional N234 carbon materials:

a. Compound B had shorter $t_s2$ scorch time along with a shorter $t_c90$ cure time. In general, short $t_s2$ scorch times can be an issue with processing in a rubber factory. However, the $t_s2$ time is a measurement at the curing temperature, in this case 160° C., which is much higher than typical rubber processing temperature (125° C.). The short $t_c90$ cure times are advantageous because it is an indication that lower concentrations of accelerator could be used.

b. Compound B had similar unaged physical properties (tensile, elongation, modulus, tear) to the compound containing the conventional N234 carbon materials but it was 4 points higher in Shore Hardness.

c. Compound B did not have significantly different DIN abrasion loss.

d. Compound B had better dispersion.

e. Compound B was higher for Shore Hardness, which is consistent with higher G' elastic modulus and stiffness in the dynamic viscoelastic testing. Because of the high stiffness the high G' at −20° C., tires made from the compound containing the graphene-based carbon materials could have poor snow traction. Similarly, the high stiffness affected the dry traction predictor (J" loss compliance) which indicated the possibility of poorer dry traction. The rolling resistance, ice and wet traction predictors (tan delta values) of the Compound B were similar to the compound containing the conventional N234 carbon materials. Finally, the higher stiffness of the compound containing the graphene-based carbon materials is an advantage for dry handling and the compound containing the graphene-based carbon materials was predicted to have better dry handling than the compound containing the conventional N234 carbon materials.

The physical properties (e.g., tensile strength, modulus, tear resistance, durometer hardness) and the dynamic properties of the Compound B indicate that the graphene-based LF FIL materials used in this Example is reinforcing enough to be used as a tread grade carbon black replacement in its present form. It should be noted that the formulation components and ratios, as well as the mixing parameters, were not optimized for the graphene-based carbon materials in this Example. It is therefore likely that the resulting properties, such as the stiffness and tire performance predictors, of the compounds containing the graphene-based carbon materials can be improved, and/or tuned, with optimization of the compound compositions and processing conditions.

Example 5: Elastomer Compounds with Graphene-Based Materials and Silica Reinforcing Fillers In this Example, elastomer compounds were produced using the LF FIL graphene-based carbon particles from Example 3 and silica reinforcing fillers.

FIG. 28 describes the formulations of three compounds that were produced, each containing an elastomer, carbon filler materials, silica filler materials, and varying amounts of additives and accelerants. The values in the chart in FIG. 28 are all in PHR. For all of the compounds, the elastomers are Buna VSL 4526-2 TDAE Oil extended S-SBR, incorporated at about 103 PHR, and Budene 1207, S-BR, incorporated at about 25 PHR. The carbon filler incorporated in the "1 N234 TBBS 1.7 DPG 2.0" compound ("Compound 1") is a conventional N234 carbon material. The carbon filler incorporated in the other two compounds—"2 LF FIL TBBS 1.7 DPG 2.0" ("Compound 2") and "6 LF FIL TBBS 2.0 DPG 1.5" ("compound 6")—is the LF FIL graphene-based carbon material of Example 3, and was produced in a microwave reactor. The carbon filler materials for all three compounds shown in FIG. 28 are incorporated at about 15 PHR. All three compounds also contain silica filler particles (Ultasil 7000 GR Silica), incorporated at about 65 PHR. Additives were also added as shown in FIG. 28 (e.g., Si 69 silane coupling agent, TDAE oil, zinc oxide cure activator, stearic acid activator, Nochek 4729A Wax, 6PPD Antiozonant, TMQ, Struktol ZB49, and sulfur cross-linker), and were kept constant between all four samples. The TBBS and DPG accelerators, however, were varied between the three samples. The TBBS accelerator was incorporated at 1.7 PHR for Compounds 1 and 2, and at 2 PHR for Compound 6. The DPG Accelerator is incorporated at 2 PHR for Compounds 1 and 2, and at 1.5 PHR for Compound 6. For all three compounds, the additives were added in several passes, as shown in FIG. 28, such that after the $1^{st}$ pass some of the additives were incorporated and the total PHR was about 222 PHR, after the $2^{nd}$ pass a second set of the additives were incorporated and the total PHR was about 234 PHR, and after the final pass all of the additives and accelerators were incorporated and the total final PHR was about 239 PHR. In this Example, Compound 6 used less DPG accelerator than Compounds 1 and 2. This was advantageous for a number of reasons, including the toxicity of DPG, which has stringent regulations surrounding its use.

Figures 29, 30:
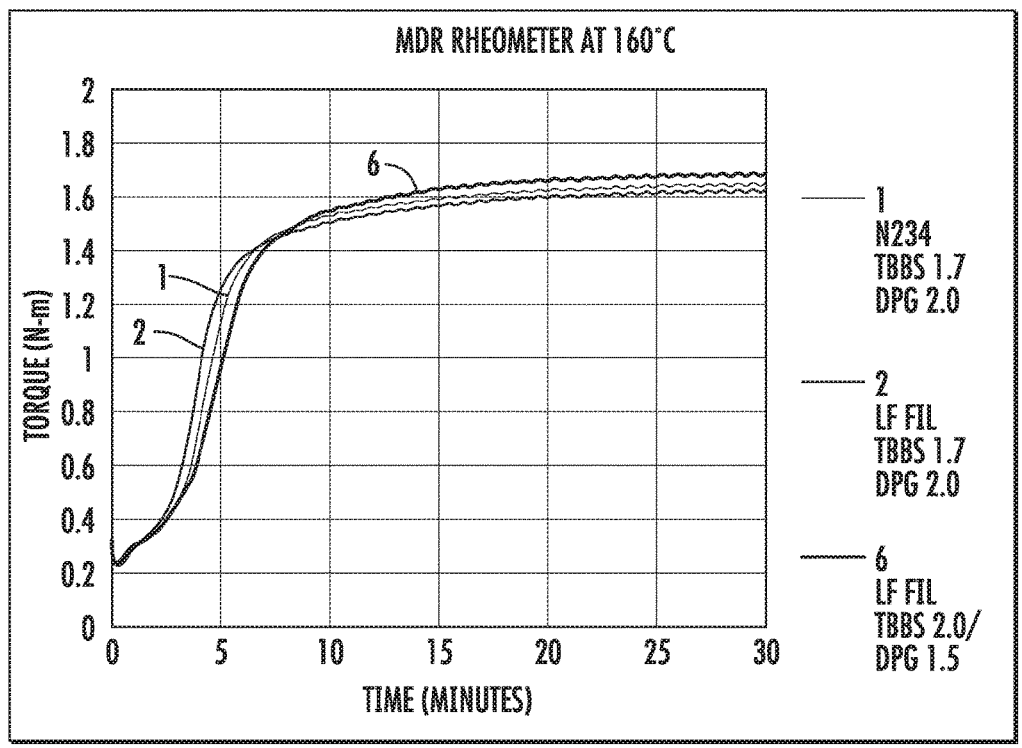
FIG. 29 shows a table of some of the key parameters measured during mixing of elastomer compounds containing graphene-based carbon materials compared to an elastomer compound containing conventional carbon black materials, in accordance with some embodiments.
FIG. 30 shows a graph of the torque during mixing of elastomer compounds containing graphene-based carbon materials compared to an elastomer compound containing conventional carbon black materials, in accordance with some embodiments.

FIGS. 29 and 30 describe some examples of the key parameters measured during mixing, using methods described in ASTM D5289-12. The equipment and conditions used for these tests were Tech Pro rheoTECH MDR, at a temperature of 160° C. (320° F.) and 0.5° arc. The rheometer data is summarized in FIG. 29, and the torque in N-m versus time during mixing is shown in FIG. 30. The maximum and minimum torques were very similar for all of the samples tested. The cure times and scorch times were also very similar between Compounds 1 and 2, and only slightly longer for Compound 6. The cure time results are noteworthy considering the lower concentration of DPG accelerant used in Compound 6.

FIG. 31 shows examples of physical properties of the 1, 2 and 6 compounds of this Example, measured using ASTM D412-16 and ASTM D2240-15. The physical properties between the three samples were all similar, with the one exception that the tensile strength of Compound 2 was slightly better than that of Compound 1 and 6.

FIG. 32 shows the same physical properties shown in FIG. 31 for Compounds 1, 2 and 6 in this Example, after heat aging for 168 hours at 70° C. in air. Compounds 2 and 6 showed similar durometer hardness changes upon heat aging. The change in tensile strength upon heat aging was slightly worse for Compound 2 compared to Compounds 1 and 6, but the tensile strength value after heat aging for Compound 2 was very similar to that of Compound 1. The change in elongation at break upon heat aging was also slightly worse for Compound 2 compared to Compounds 1 and 6, but the elongation at break value after heat aging for Compound 2 was very similar to that of Compound 1. The moduli changes upon heat aging were also similar for each of the three samples in this Example.

The tear resistance of the compounds in this Example were measured using ASTM D624-00 (2012) testing standard with a rate of 20 in/min. The average tear strength of Compound 1 was 53 kN/m (with a standard deviation of 8 kN/m), which was very similar to the average tear strength of Compound 2 at 53 kN/m (with a standard deviation of 2 kN/m). Compound 6 had a slightly lower average tear strength at 48 kN/m (with a standard deviation of 4 kN/m).

The compression set for the compounds in this Example were measured using ASTM D395-16e1, Method B. The conditions for these tests included aging button specimens for 72 hours at 70° C., using a deflection of 25%, and 0.5 hour recovery time. The average compression set for all three compounds was very similar, and was from 25.5% to 26.4% (with standard deviations from 1.1% to 3.5%).

The DIN abrasion of the compounds in this Example were measured using DIN 53 516 (Withdrawn 2014) and ASTM D5963-04 (2015) testing standards with control abrasive Grade 177, and 40 rpm and 10 N load conditions. Three samples were measured for each. The average abrasion loss of the three Compound 1 samples was 83.3 mm$^3$ (with a standard deviation of 6.8 mm$^3$). The two experimental compounds had slightly higher abrasion loss compared to the control Compound 1. Compound 2 had an average abrasion loss of 93.7 mm$^3$ (with standard deviation of 8.7 mm$^3$), and Compound 6 had an average abrasion loss of 97.7 mm$^3$ (with standard deviation of 0.6 mm$^3$).

Figure 35:
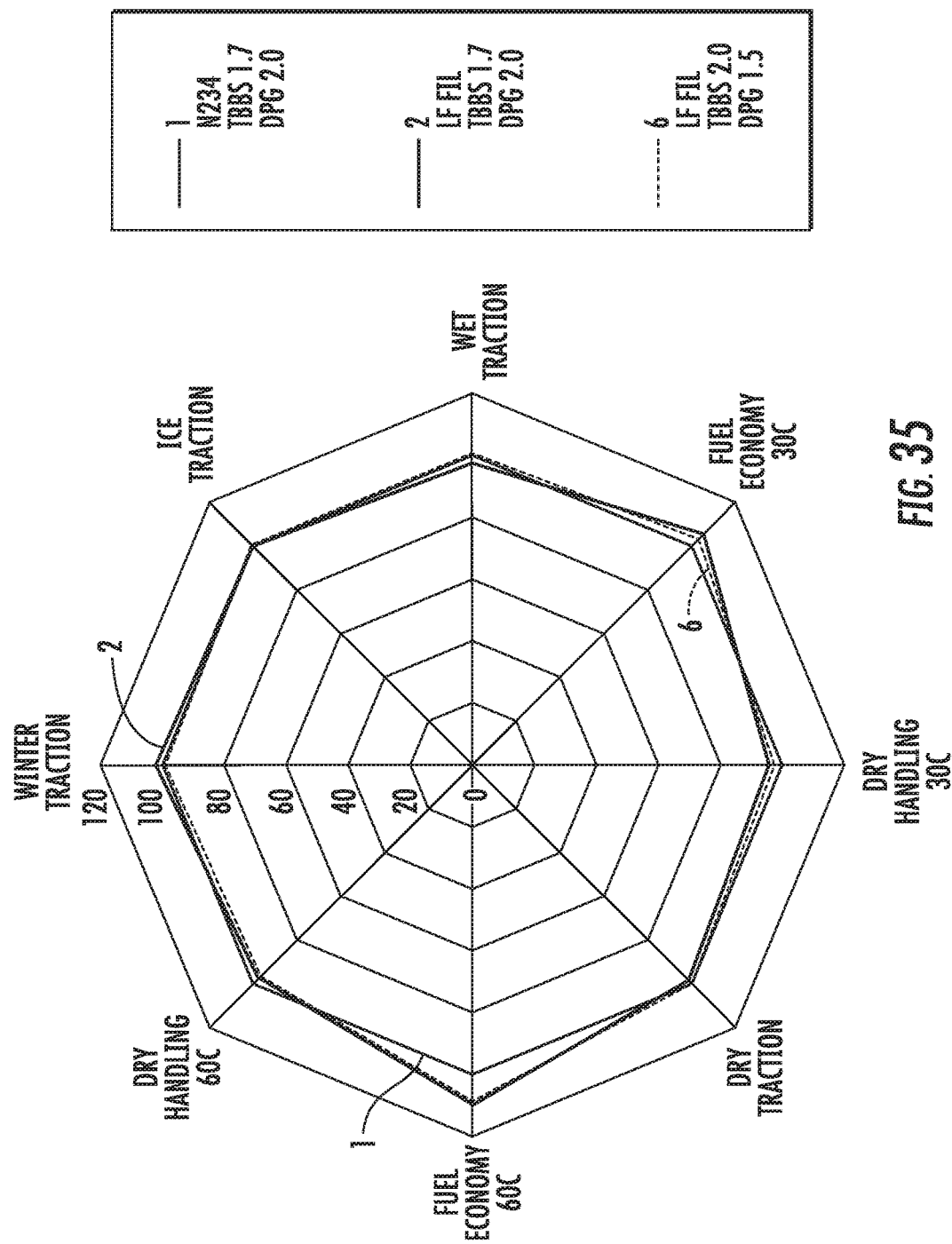
FIG. 35 shows a radar chart of dynamic viscoelastic properties of elastomer compounds containing graphene-based carbon materials normalized to an elastomer compound containing conventional carbon black materials, in accordance with some embodiments.

FIG. 33 shows dynamic viscoelastic properties for the compounds in this Example, measured using ASTM D5992-96 (2011). These measurements were performed in a temperature range from −20° C. to +70° C., with a strain of 5%, and a frequency of 10 Hz. FIGS. 34 and 35 show the same data as FIG. 33, but normalized to the control Compound 1 containing the N234 carbon black material. Significantly, the two experimental Compounds 2 and 6 in this Example had similar or better tire performance predictors compared to the control Compound 1.

Additionally, the Payne and Mullins Effects were measured for the compounds in this Example, using a strain sweep at 30° C., with a 10 Hz frequency in shear mode. The Payne Effect was similar for all three compounds, and was from $1.44\times10^6$ to $1.71\times10^6$. The Mullins Effect was also similar between Compound 1 ($2.49\times10^5$) and 2 ($2.64\times10^5$). The Mullins effect for Compound 6 was higher ($4.48\times10^5$). Not to be limited by theory, the similar Payne Effect for the three samples in this Example can indicate that the filler dispersion is similar between the three samples. Not to be limited by theory, the similar Mullins Effect between control Compound 1 and experimental Compound 2 in this Example can indicate that the interaction strength between the polymer and the filler matrix is similar between these two compounds.

The physical properties (e.g., tensile strength, modulus, tear resistance, durometer hardness) and the dynamic properties of the Compounds 2 and 6 indicate that the graphene-based LF FIL materials used in this Example is reinforcing enough to be used as a tread grade carbon black replacement in its present form when used in combination with a silica reinforcing filler. It should be noted that the formulation components and ratios, as well as the mixing parameters, were not optimized for the graphene-based carbon materials in this Example. It is therefore likely that the resulting properties, such as the stiffness and tire performance predictors, of the compounds containing the graphene-based carbon materials can be improved, and/or tuned, with optimization of the compound compositions and processing conditions.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A compound comprising:
    an elastomer material;
    a filler material;
    at least one additive material; and
    at least one accelerant material;
    wherein the filler material comprises a graphene-based carbon material, wherein the graphene-based carbon material comprises:
        carbon particles comprising graphene comprising up to 15 layers; and
        particles of a nano-mix additive;

wherein:
the particles of the nano-mix additive are integrated with the carbon particles on a particle level such that the particles of the nano-mix additive and the carbon particles form aggregates together; and
the aggregates have a median size from 1 to 50 microns.

2. The compound of claim 1, wherein the graphene-based carbon material comprises an electrical conductivity greater than 500 S/m when compressed and a surface area of the aggregates of at least 50 m$^2$/g, when measured via a Brunauer-Emmett-Teller (BET) method with nitrogen as the adsorbate.

3. The compound of claim 1, wherein the graphene-based carbon material further comprises at least one carbon allotrope other than the graphene, and a ratio of the graphene to the carbon allotrope other than graphene is from 1:100 to 10:1.

4. The compound of claim 3, wherein the carbon allotrope other than graphene comprises multi-walled spherical fullerenes.

5. The compound of claim 1, wherein the filler material further comprises silica, and a ratio of the silica to the graphene-based carbon material is from 10:1 to 1:1.

6. The compound of claim 1, wherein the elastomer material is selected from the group consisting of natural rubber and synthetic rubber.

7. The compound of claim 1, wherein the additive material comprises a material selected from the group consisting of: a silane coupling agent, an oil, a zinc oxide material, a stearic acid material, a wax material, a plasticizer, an antiozonant, an antioxidant, a viscosity modifier, and a sulfur cross-linker.

8. The compound of claim 1, wherein the accelerant material comprises N-tert-butyl-2-benzothiazyl sulfonamide.

9. The compound of claim 1, wherein the accelerant material comprises N-tert-butyl-2-benzothiazyl sulfonamide and diphenylguanidine, wherein a concentration of N-tert-butyl-2-benzothiazyl sulfonamide is higher than a concentration of diphenylguanidine.

10. The compound of claim 1, wherein the graphene-based carbon material is a functionalized graphene-based carbon material.

11. The compound of claim 10, wherein the functionalized graphene-based carbon material comprises a species selected from the group consisting of H, O, S, N, Si, aromatic hydrocarbons, Sr, F, I, Na, K, Mg, Ca, Cl, Br, Mn, Cr, Zn, B, Ga, Rb and Cs.

12. The compound of claim 1, wherein a Phillips Dispersion Rating of the compound is from 6 to 10.

13. The compound of claim 1, wherein a G' storage modulus at −20° C. of the compound, as measured by ASTM D5992-96 (2011), is from 5 MPa to 12 MPa.

14. The compound of claim 1, wherein a tan delta at −10° C. of the compound, as measured by ASTM D5992-96 (2011), is from 0.35 to 1.0.

15. The compound of claim 1, wherein a tan delta at 0° C. of the compound, as measured by ASTM D5992-96 (2011), is from 0.3 to 0.6.

16. The compound of claim 1, wherein a tan delta at 30° C. of the compound, as measured by ASTM D5992-96 (2011), is from 0.1 to 0.3.

17. The compound of claim 1, wherein a G' storage modulus at 30° C. of the compound, as measured by ASTM D5992-96 (2011), is from 1 MPa to 6 MPa.

18. The compound of claim 1, wherein a J" loss compliance at 30° C., as measured by ASTM D5992-96 (2011), is from 4E-8 1/Pa to 1E-7 1/Pa.

19. The compound of claim 1, wherein a tan delta at 60° C. of the compound, as measured by ASTM D5992-96 (2011), is from 0.1 to 0.3.

20. The compound of claim 1, wherein a G' storage modulus at 60° C. of the compound, as measured by ASTM D5992-96 (2011), is from 1 MPa to 4 MPa.

21. The compound of claim 1, wherein the particles of the nano-mix additive comprise interlayers of organic and inorganic materials.

22. The compound of claim 1, wherein the particles of the nano-mix additive comprise silica.

23. The compound of claim 1, wherein the particles of the nano-mix additive comprise silicon.

24. The compound of claim 1, wherein the particles of the nano-mix additive comprise ZnO.

25. The compound of claim 1, wherein the particles of the nano-mix additive comprise metals.

26. The compound of claim 1, wherein the particles of the nano-mix additive and the carbon particles have average diameters less than 100 nm.

27. The compound of claim 1, wherein:
the graphene-based carbon material is produced using a hydrocarbon cracking process;
the particles of the nano-mix additive are introduced during the hydrocarbon cracking process; and
the particles of the nano-mix additive are integrated with the carbon particles as the graphene-based carbon material is produced.

28. The compound of claim 1, wherein:
the graphene-based carbon material is produced using a hydrocarbon cracking process;
a nano-mix additive material is introduced during the hydrocarbon cracking process;
the nano-mix additive material forms the particles of the nano-mix additive; and
the particles of the nano-mix additive are integrated with the carbon particles as the graphene-based carbon material is produced.

29. The compound of claim 28, wherein the nano-mix additive material is introduced into the hydrocarbon cracking process as a gas, a liquid, or a colloidal dispersion.

30. A compound comprising:
an elastomer material;
a filler material;
at least one additive material; and
at least one accelerant material;
wherein:
the filler material comprises silica and a graphene-based carbon material, wherein the graphene-based carbon material comprises:
carbon particles comprising graphene comprising up to 15 layers; and
particles of a nano-mix additive;
wherein:
the particles of the nano-mix additive are integrated with the carbon particles on a particle level such that the particles of the nano-mix additive and the carbon particles form aggregates together; and
the aggregates have a median size from 1 to 50 microns;
a G' storage modulus at −20° C. of the compound, as measured by ASTM D5992-96 (2011), is less than 9 MPa;

a tan delta at −10° C. of the compound, as measured by ASTM D5992-96 (2011), is greater than 0.8;
a tan delta at 0° C. of the compound, as measured by ASTM D5992-96 (2011), is greater than 0.5;
a tan delta at 30° C. of the compound, as measured by ASTM D5992-96 (2011), is less than 0.25;
a G' storage modulus at 30° C. of the compound, as measured by ASTM D5992-96 (2011), is greater than 1.5 MPa;
a J" loss compliance at 30° C., as measured by ASTM D5992-96(2011), is greater than 9E-8 1/Pa;
a tan delta at 60° C. of the compound, as measured by ASTM D5992-96 (2011), is less than 0.15; and
a G' storage modulus at 60° C. of the compound, as measured by ASTM D5992-96(2011), is greater than 1.5 MPa.

* * * * *